April 7, 1942.  C. W. SPOHR ET AL  2,278,574
CONFECTION MAKING METHOD AND APPARATUS
Filed Dec. 23, 1940  36 Sheets-Sheet 4

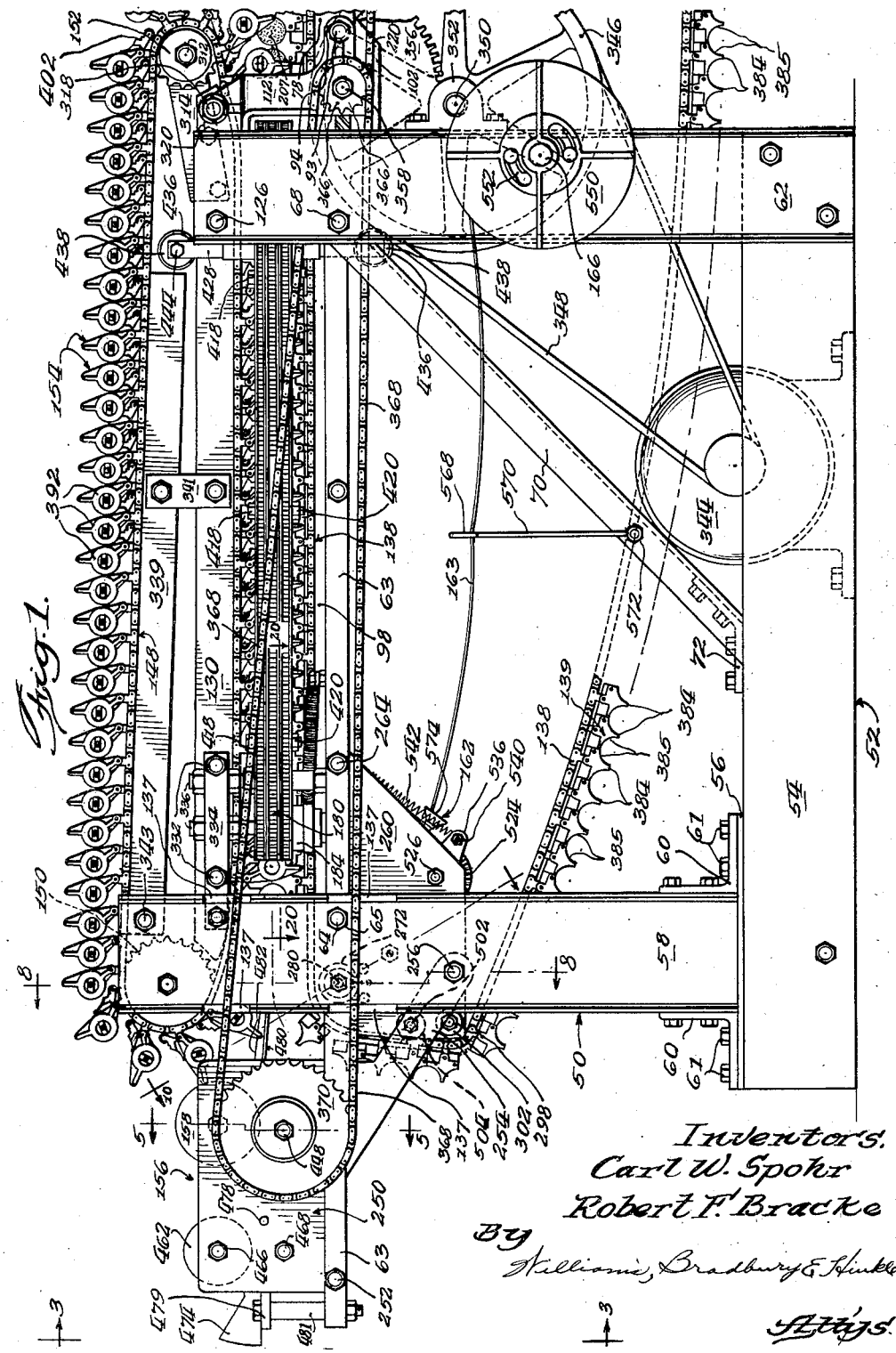

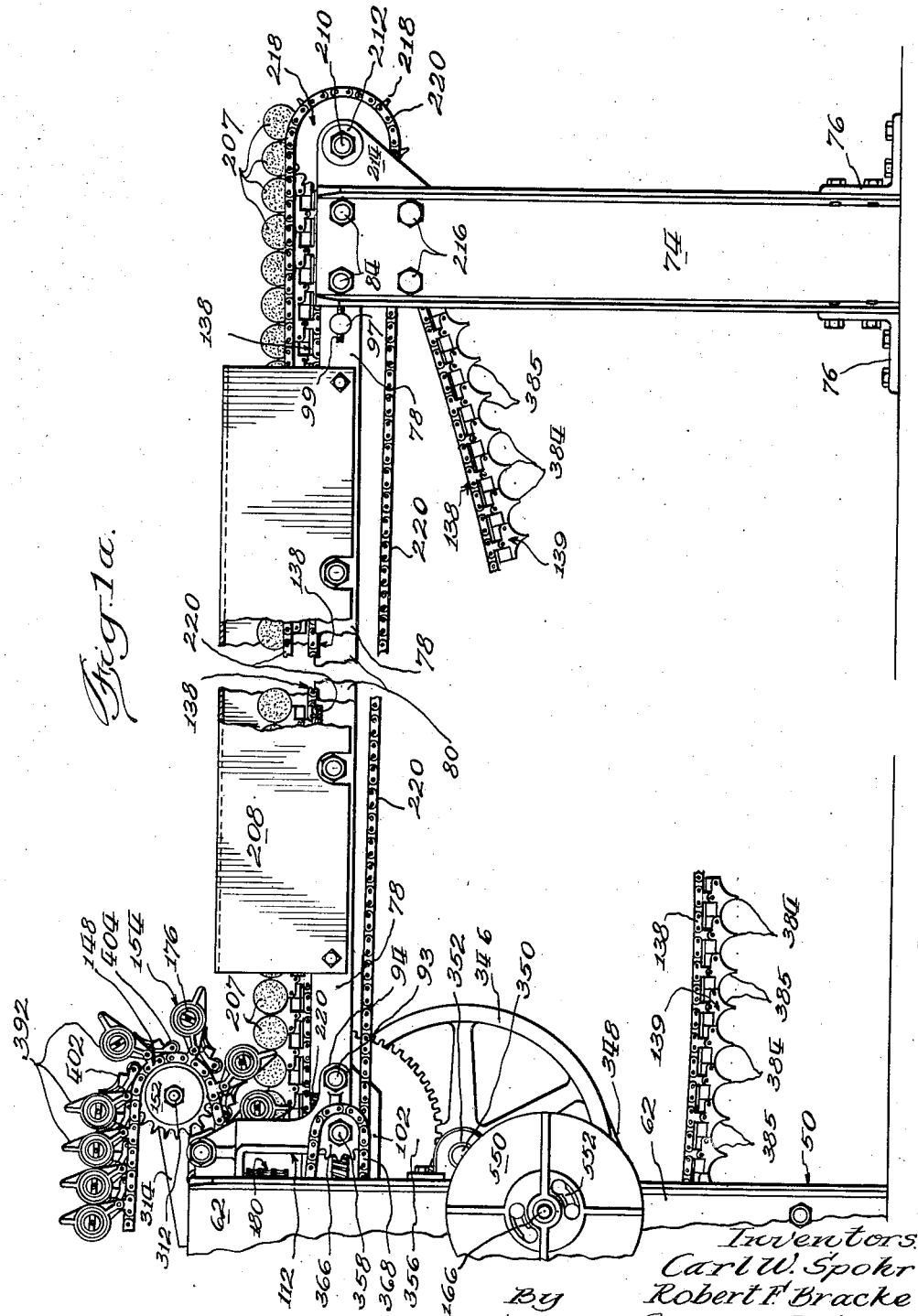

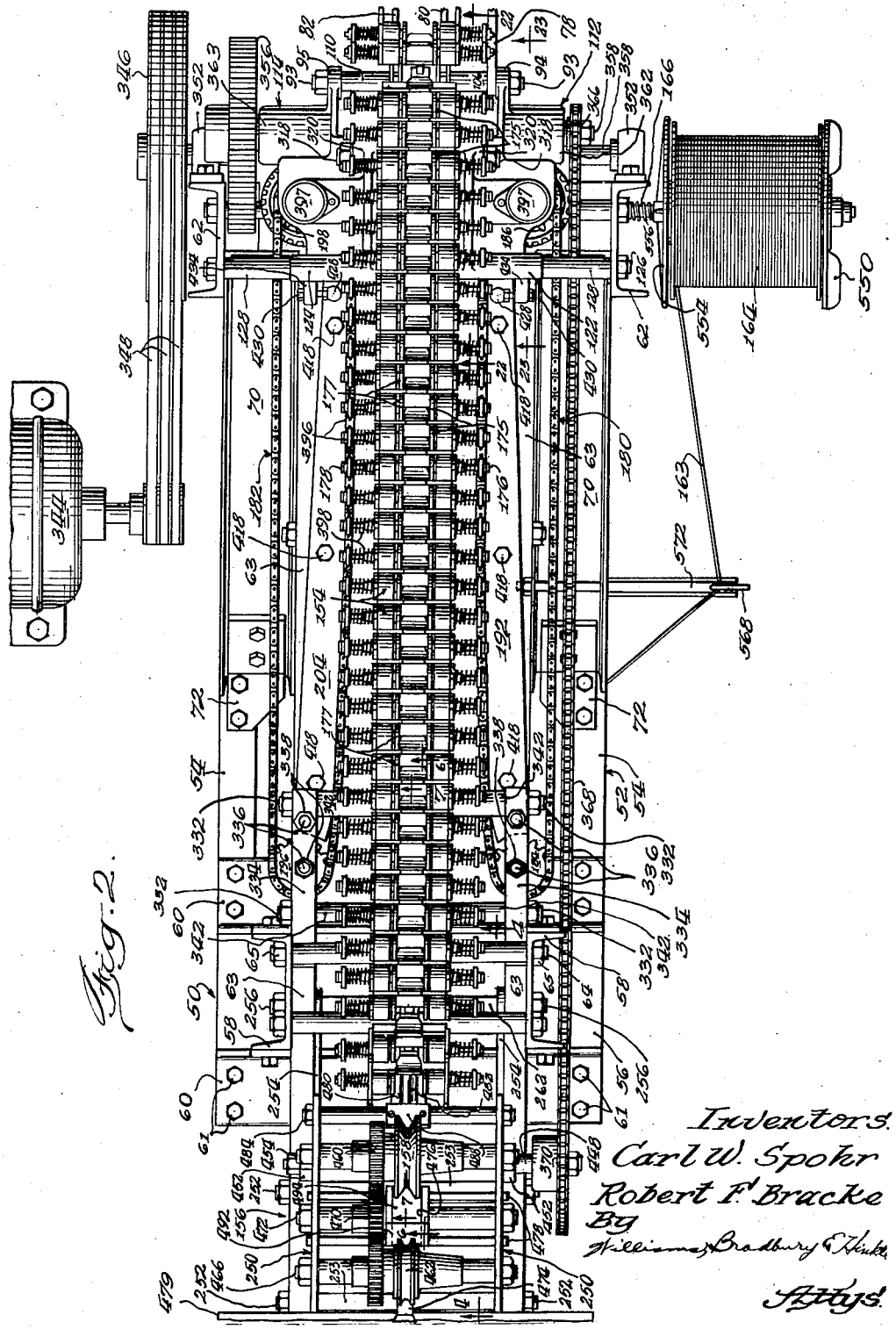

Fig. 2.a.

Inventors
Carl W. Spohr
Robert F. Bracke
By
Williams, Bradbury
& Hinkle
Attys.

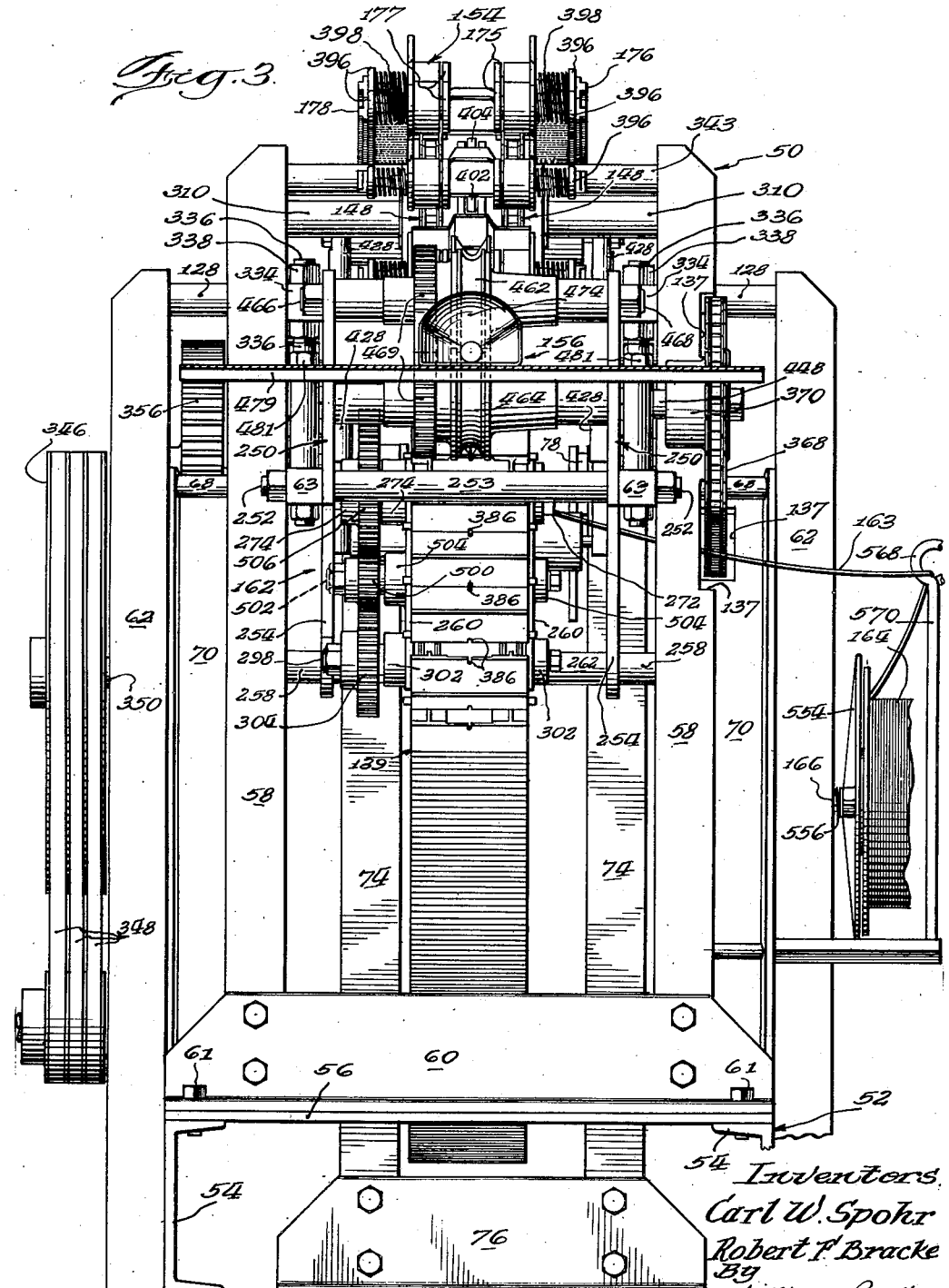

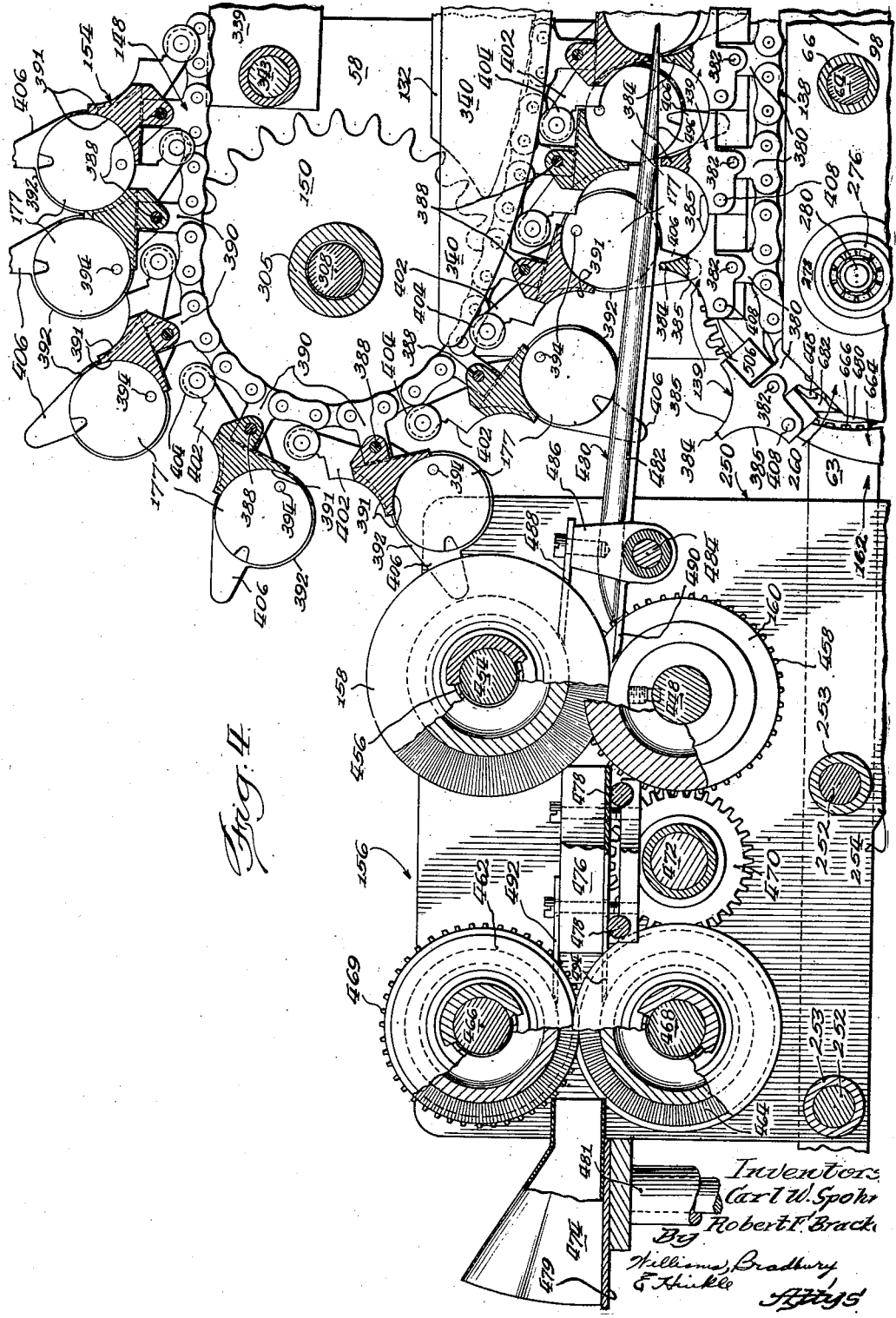

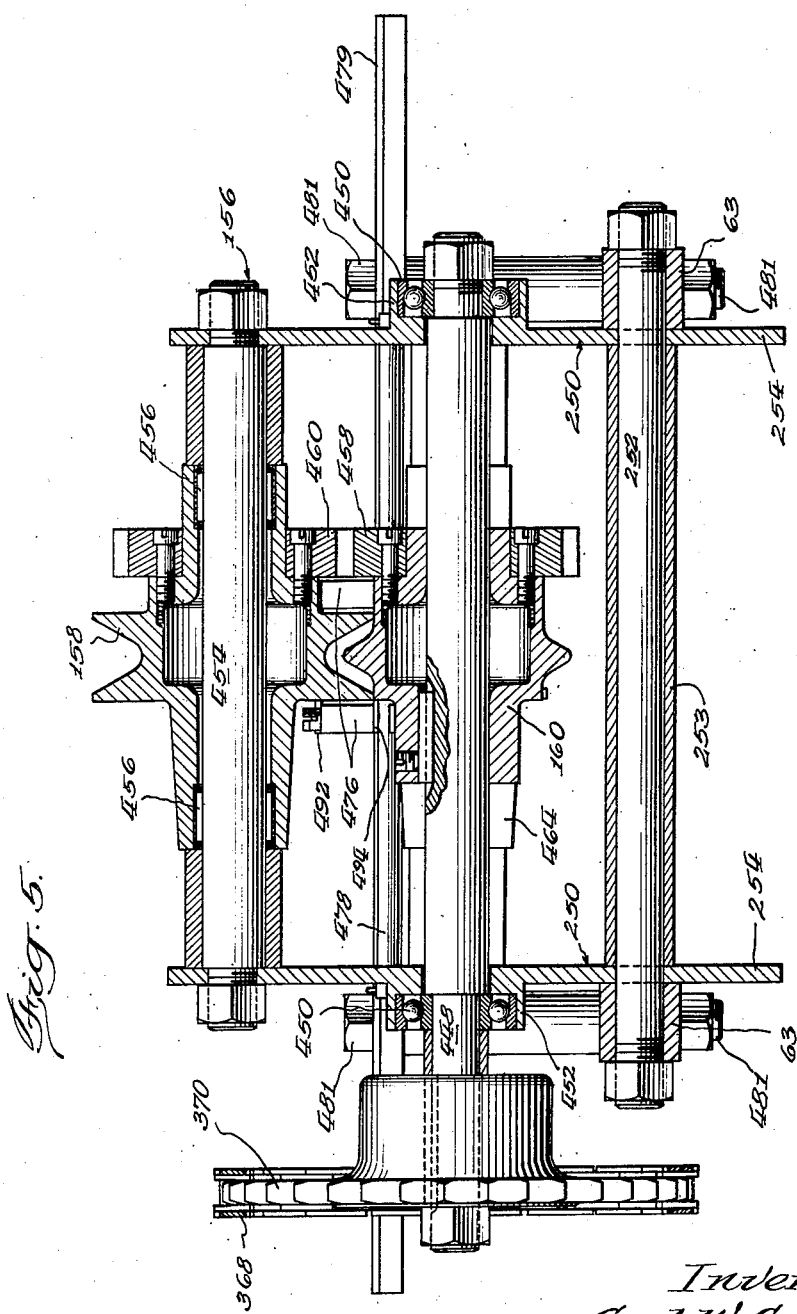

April 7, 1942.  C. W. SPOHR ET AL  2,278,574
CONFECTION MAKING METHOD AND APPARATUS
Filed Dec. 23, 1940   36 Sheets-Sheet 8

Inventors.
Carl W. Spohr
Robert F. Bracke
By
Williams, Bradbury & Hinkle
Attys

April 7, 1942.  C. W. SPOHR ET AL  2,278,574
CONFECTION MAKING METHOD AND APPARATUS
Filed Dec. 23, 1940  36 Sheets-Sheet 9

Inventors
Carl W Spohr
Robert F Bracke
By
Williams, Bradbury & Hinkle
Attys

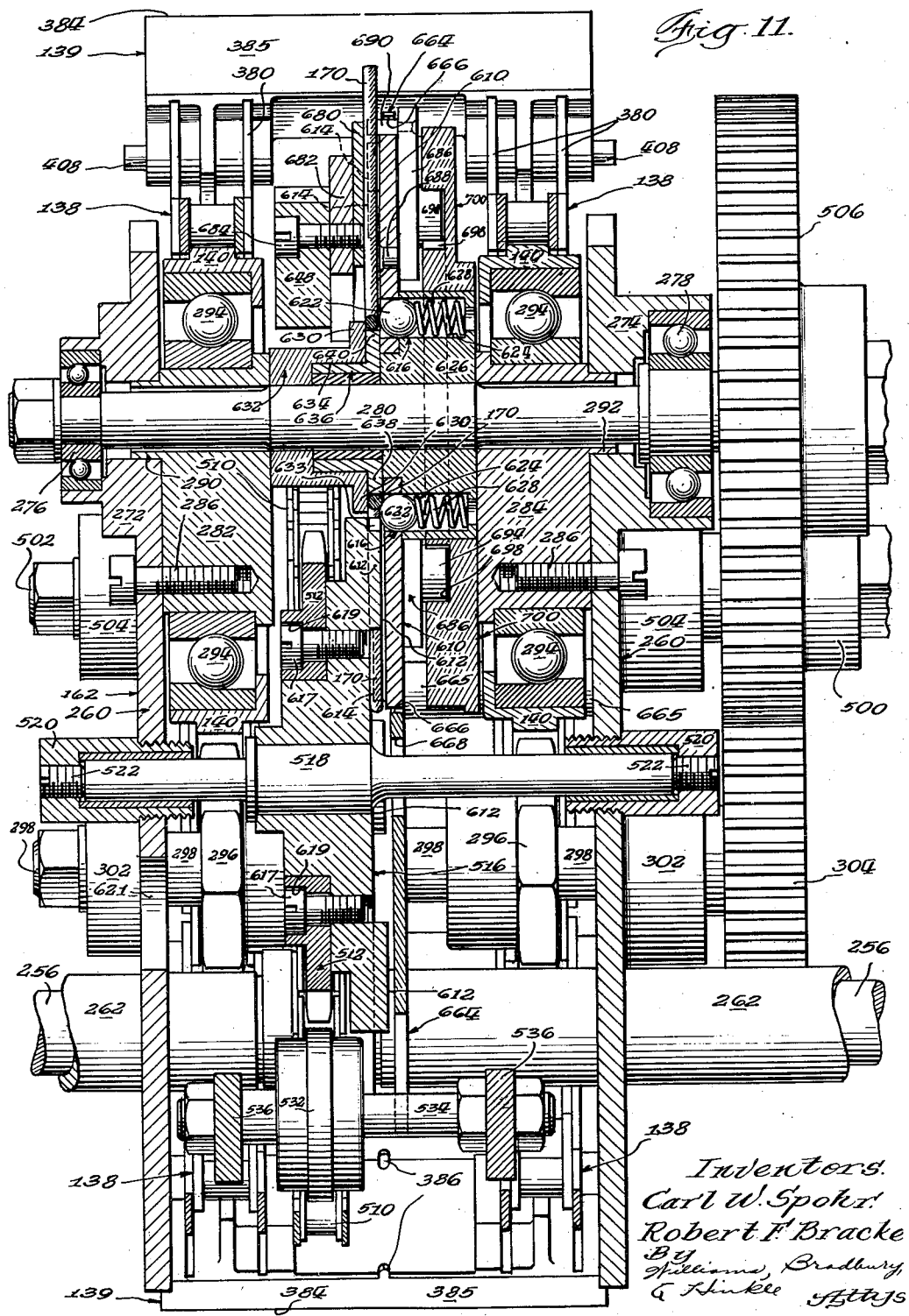

April 7, 1942.  C. W. SPOHR ET AL  2,278,574
CONFECTION MAKING METHOD AND APPARATUS
Filed Dec. 23, 1940  36 Sheets-Sheet 14
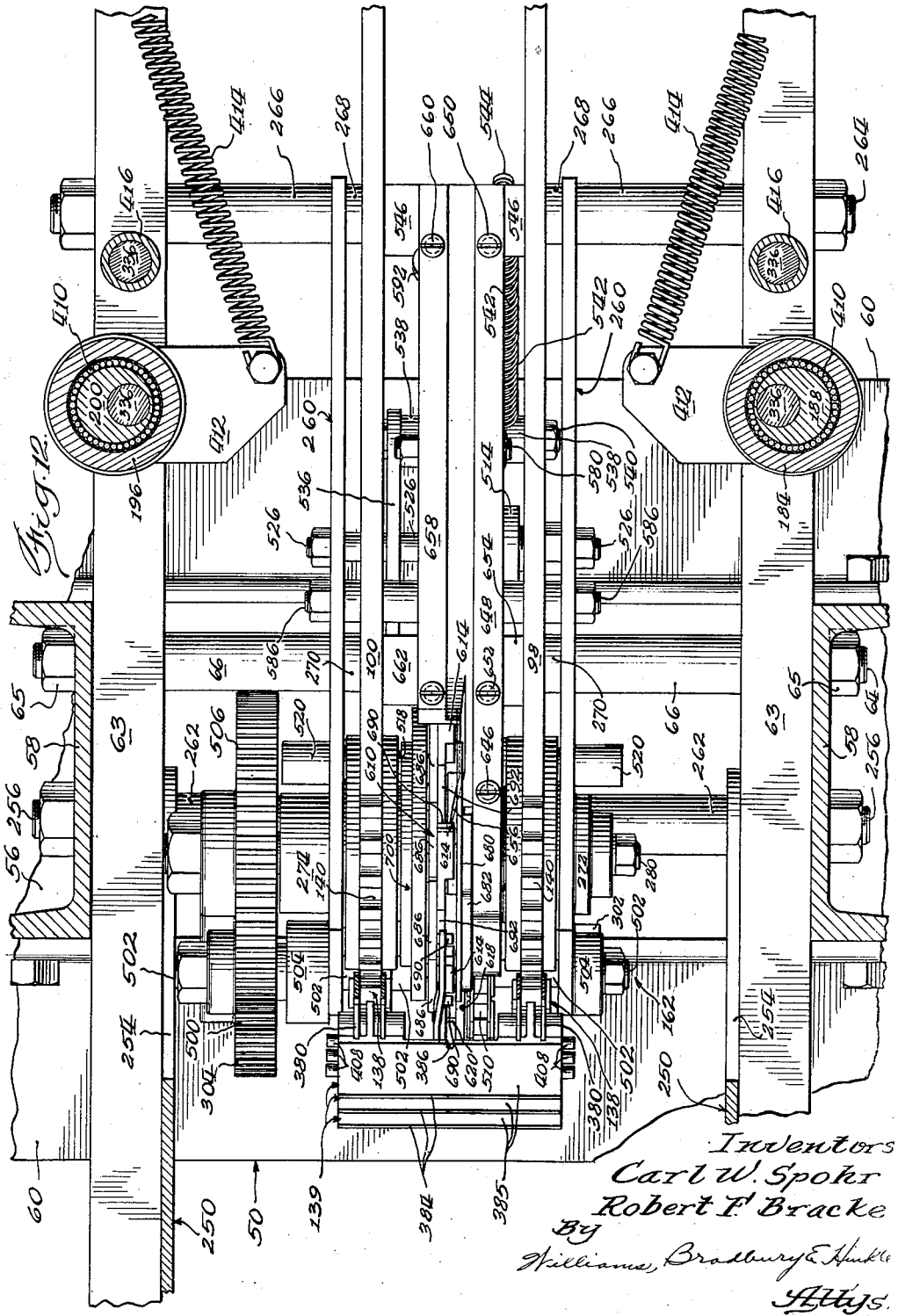
Inventors
Carl W. Spohr
Robert F. Bracke
By
Williams, Bradbury & Hinkle
Attys.

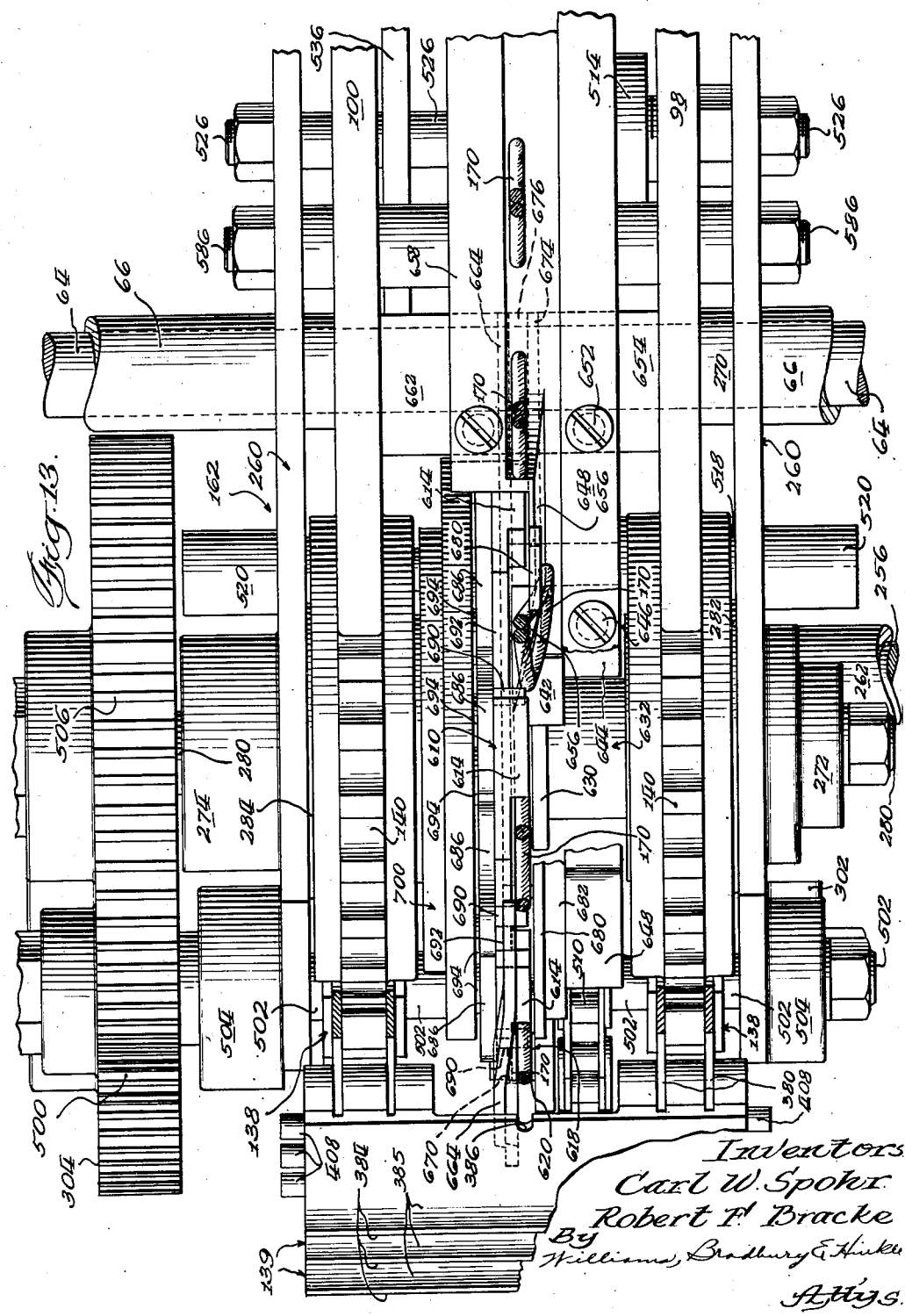

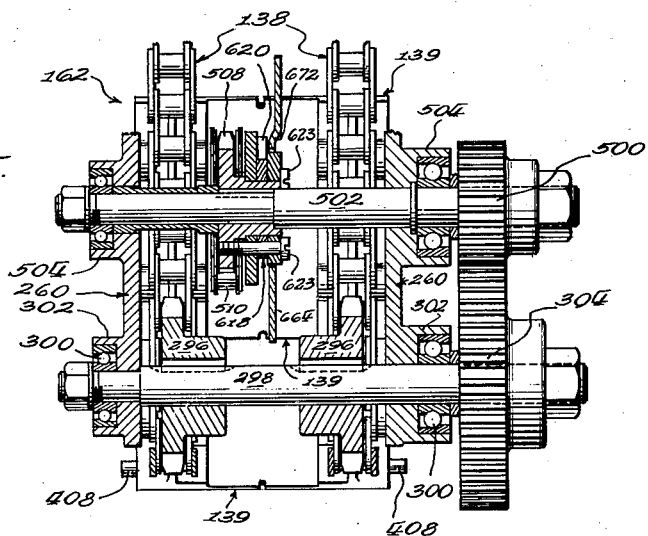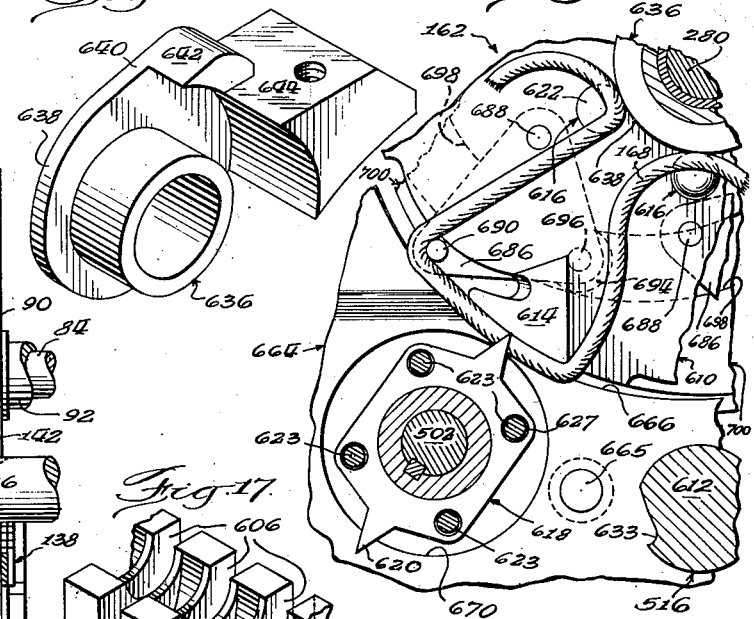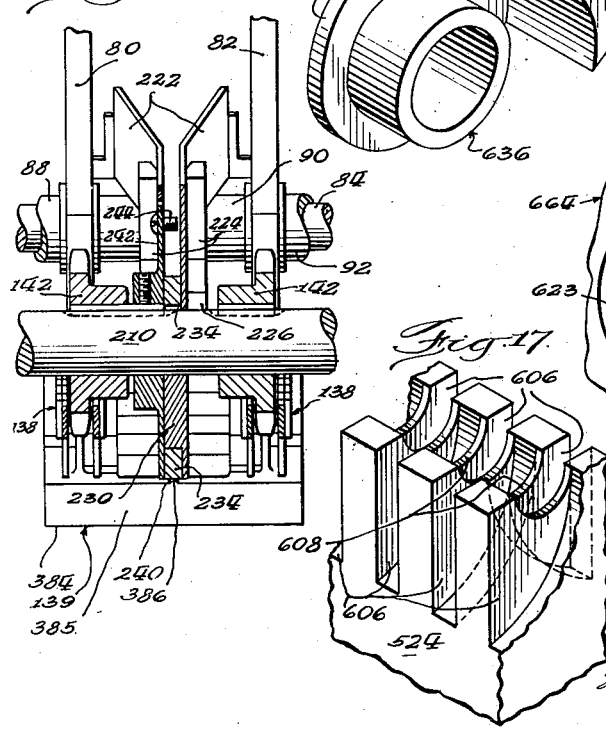

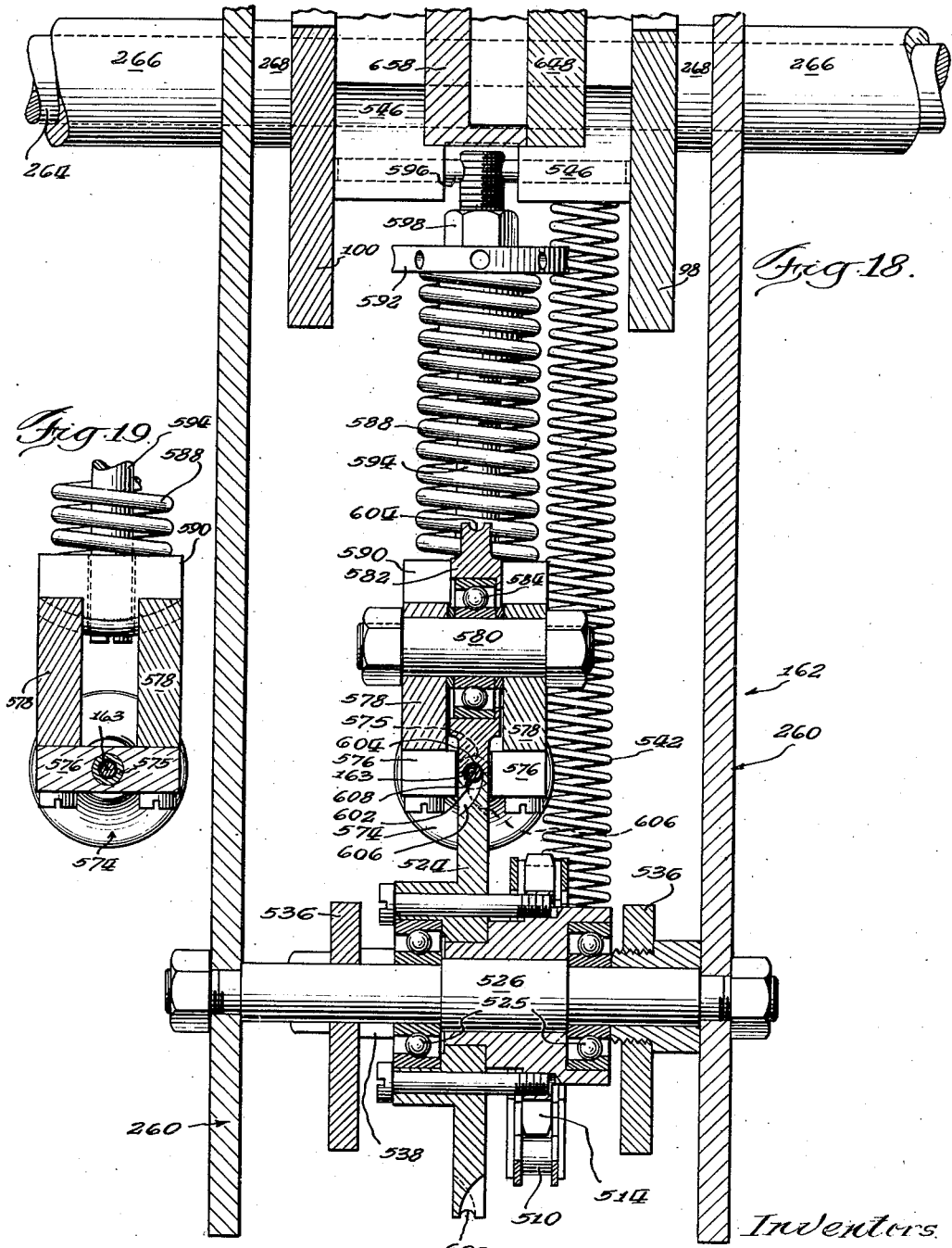

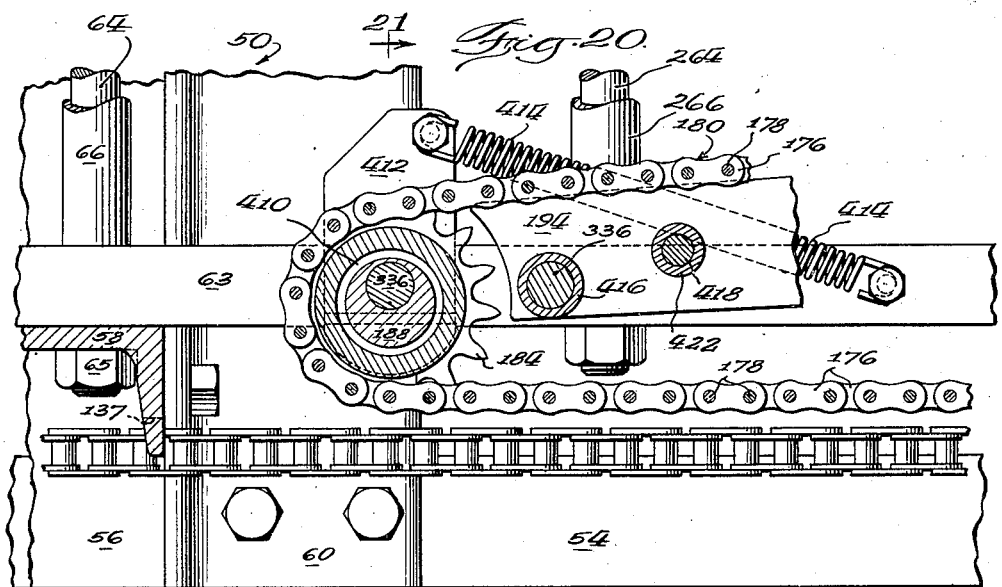
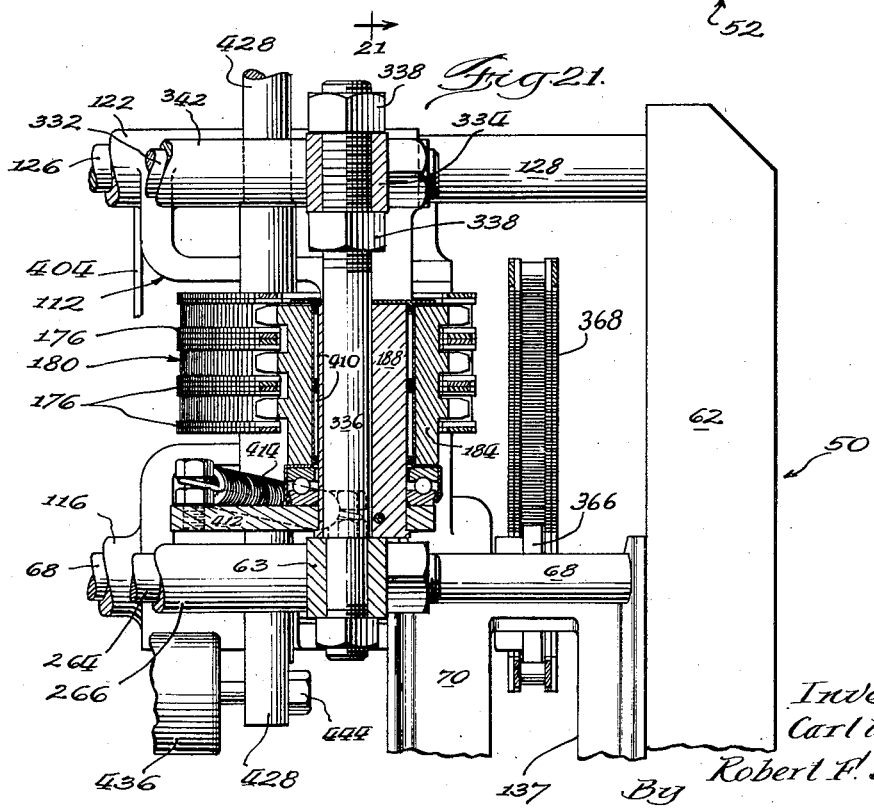

April 7, 1942. C. W. SPOHR ET AL 2,278,574
CONFECTION MAKING METHOD AND APPARATUS
Filed Dec. 23, 1940 36 Sheets-Sheet 19
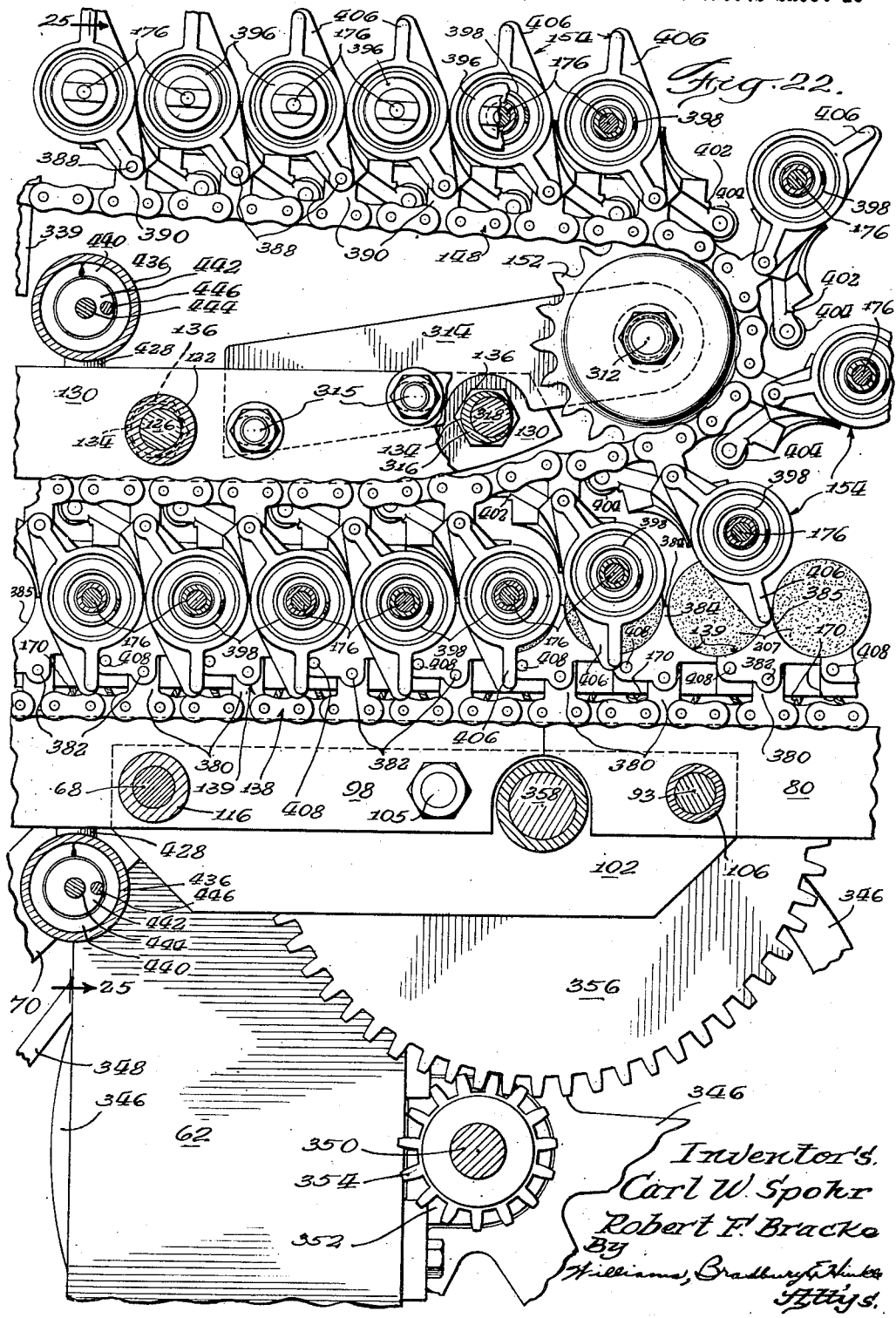

April 7, 1942.  C. W. SPOHR ET AL  2,278,574
CONFECTION MAKING METHOD AND APPARATUS
Filed Dec. 23, 1940   36 Sheets-Sheet 20
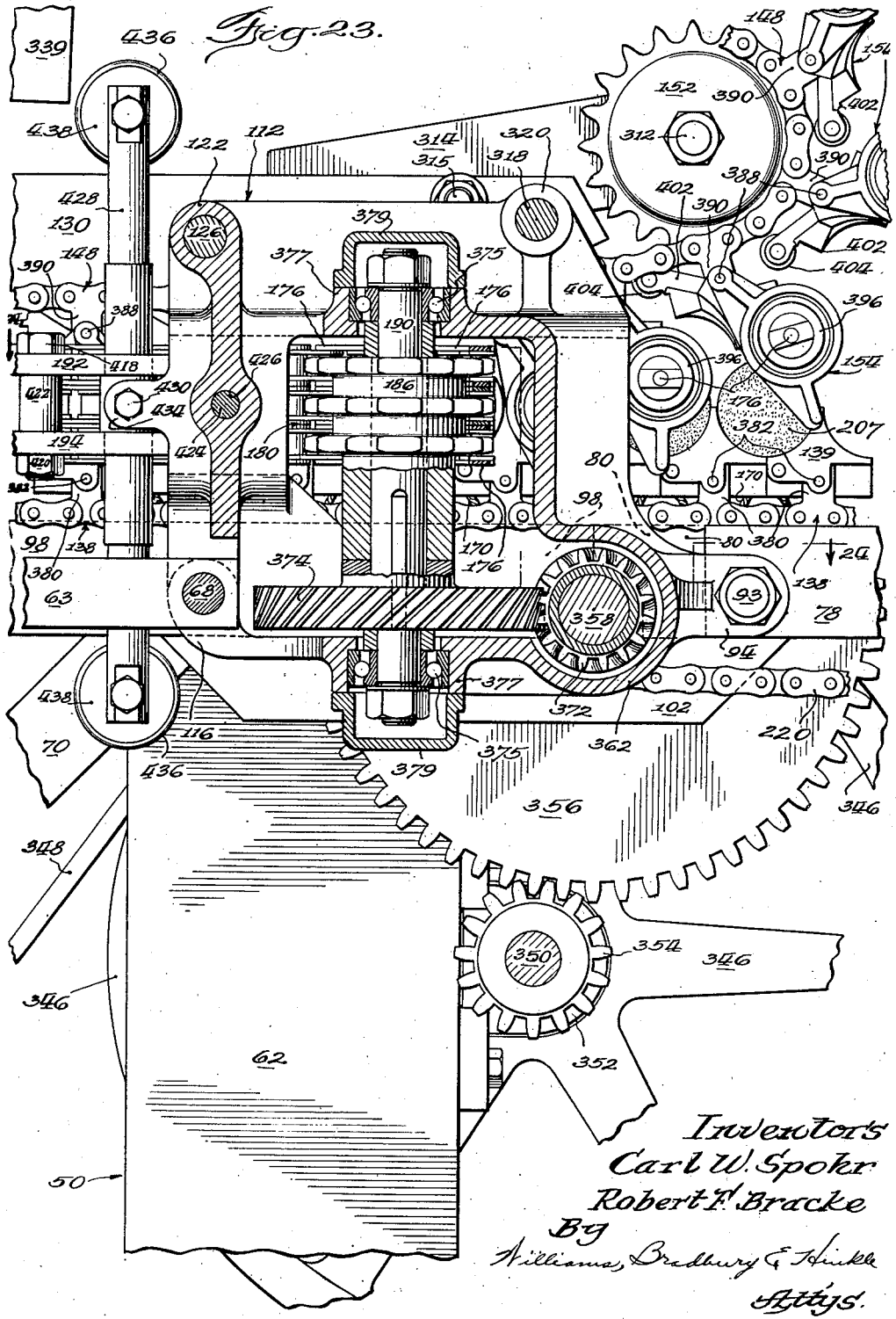

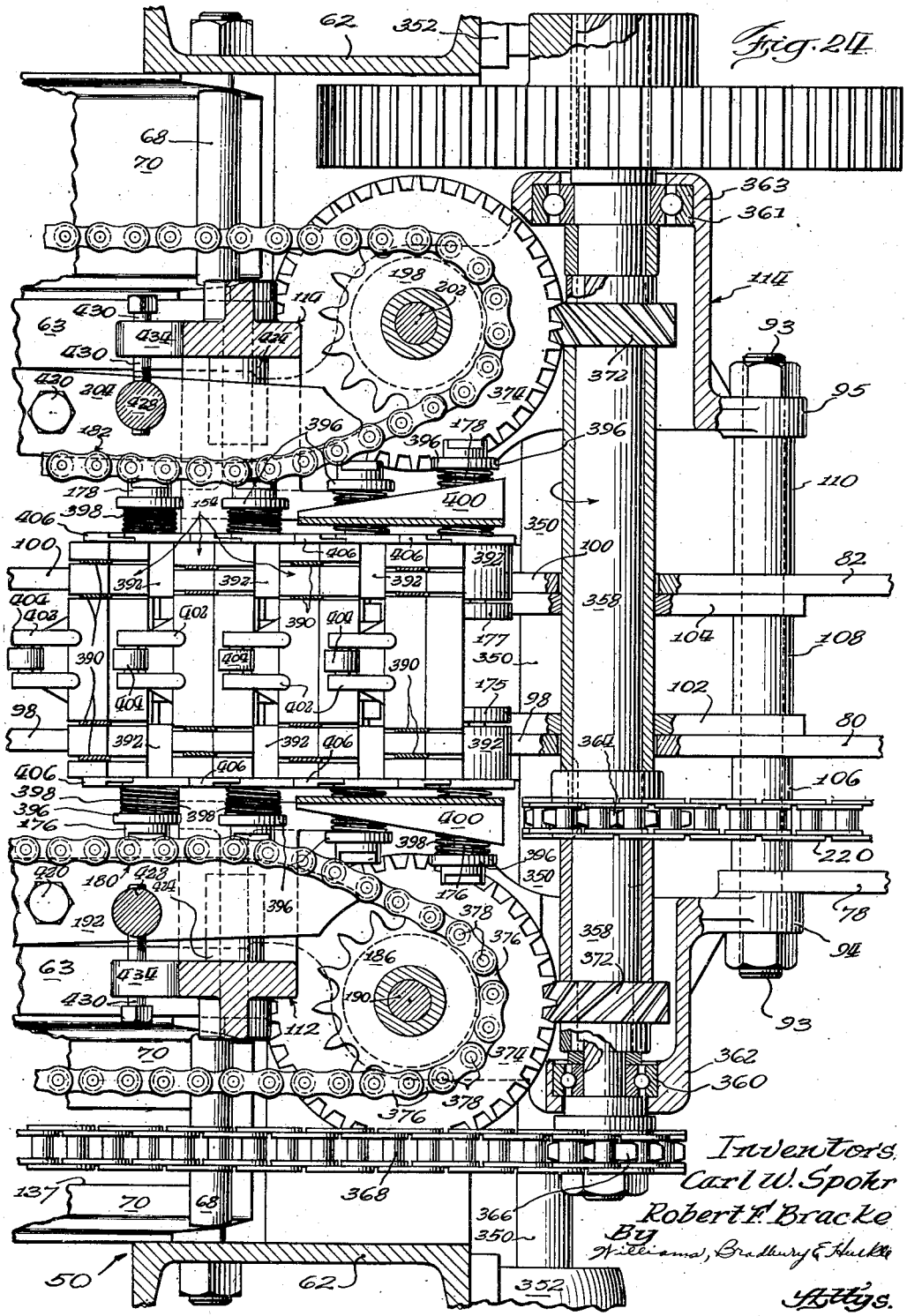

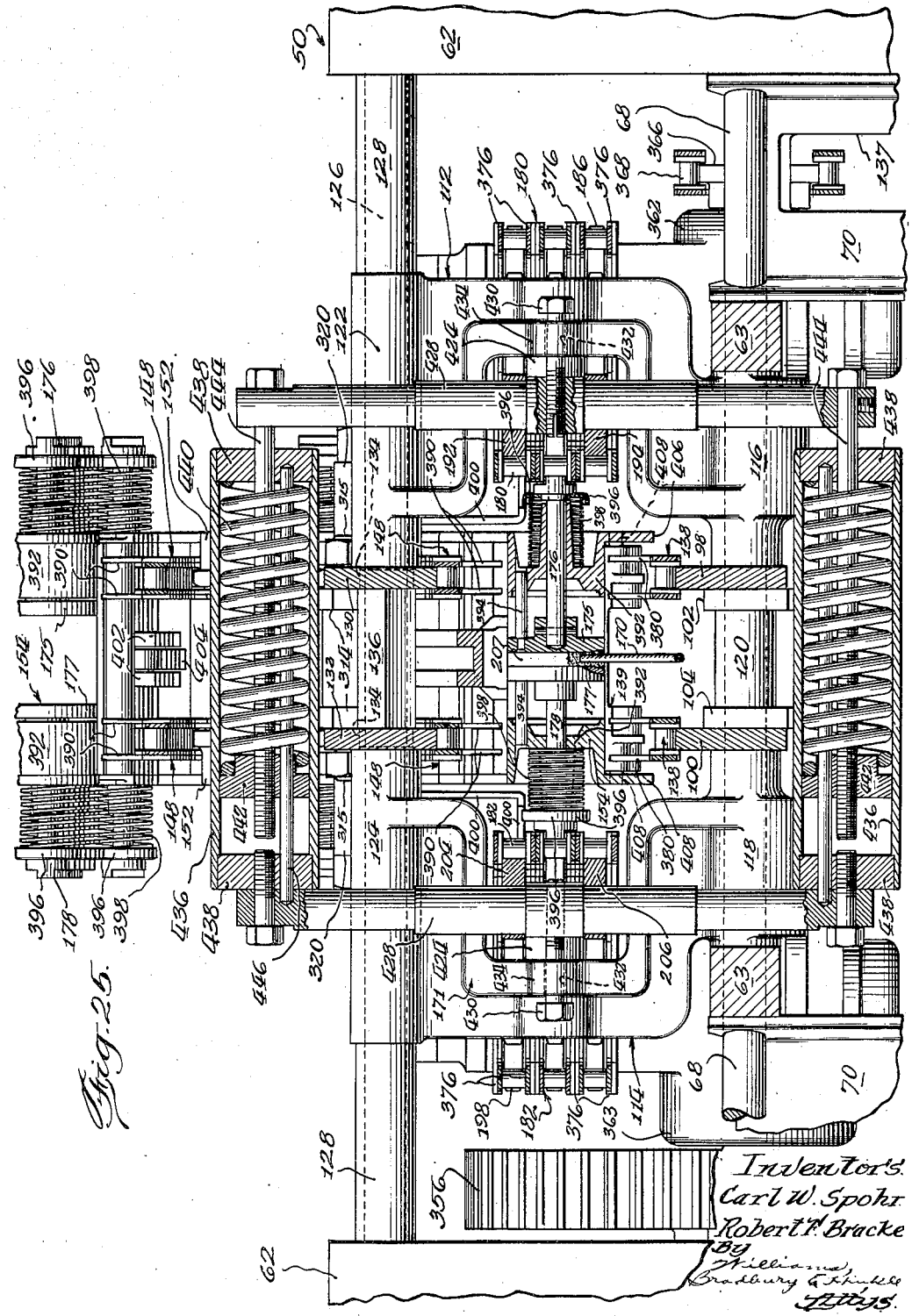

April 7, 1942.   C. W. SPOHR ET AL   2,278,574
CONFECTION MAKING METHOD AND APPARATUS
Filed Dec. 23, 1940   36 Sheets-Sheet 23

Inventors
Carl W. Spohr
Robert F. Bracke
By Williams, Bradbury & Hinkle
Attys.

April 7, 1942.  C. W. SPOHR ET AL  2,278,574
CONFECTION MAKING METHOD AND APPARATUS
Filed Dec. 23, 1940    36 Sheets-Sheet 24
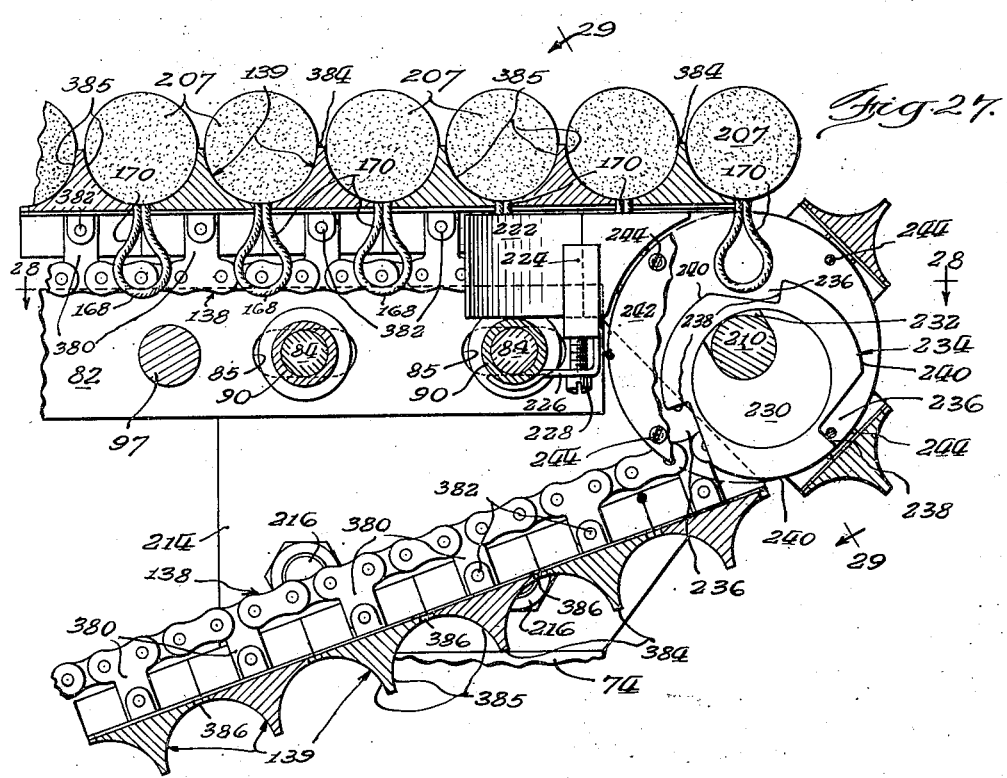
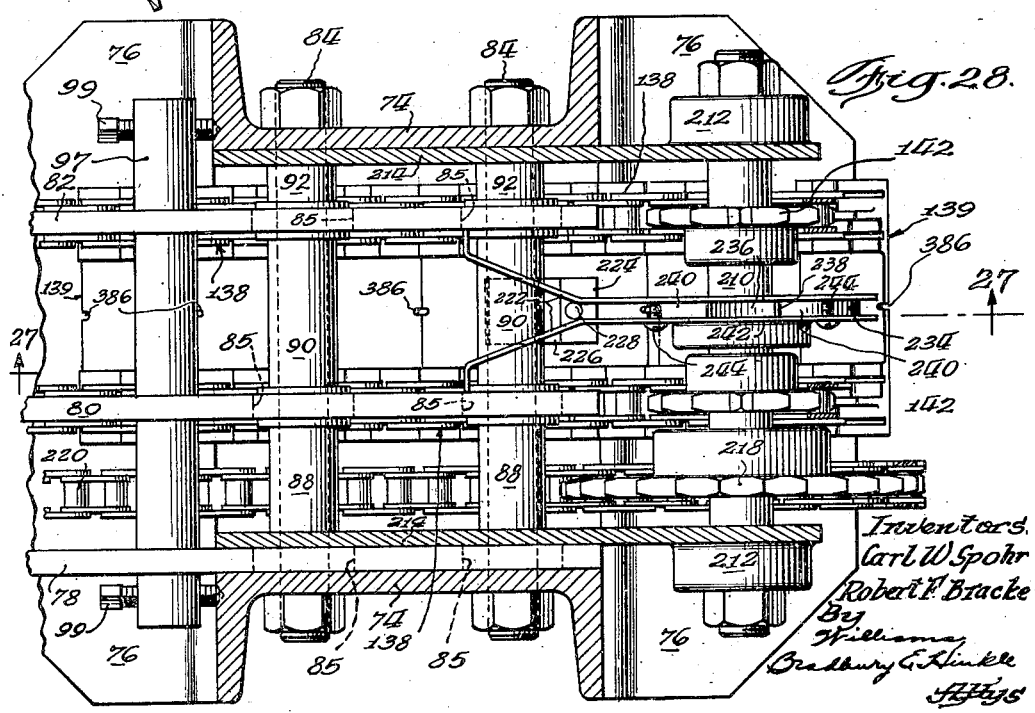

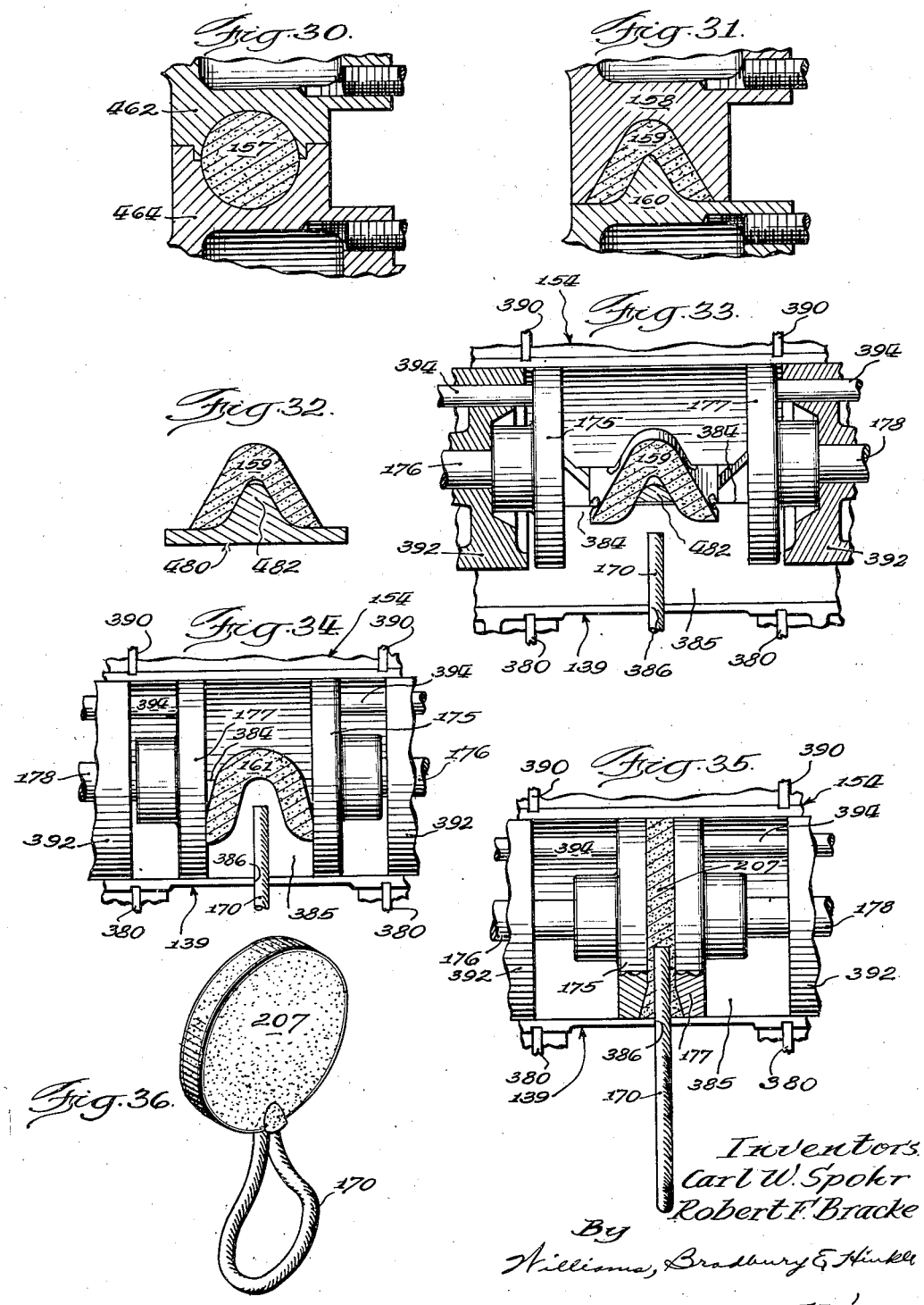

April 7, 1942.  C. W. SPOHR ET AL  2,278,574
CONFECTION MAKING METHOD AND APPARATUS
Filed Dec. 23, 1940   36 Sheets-Sheet 26
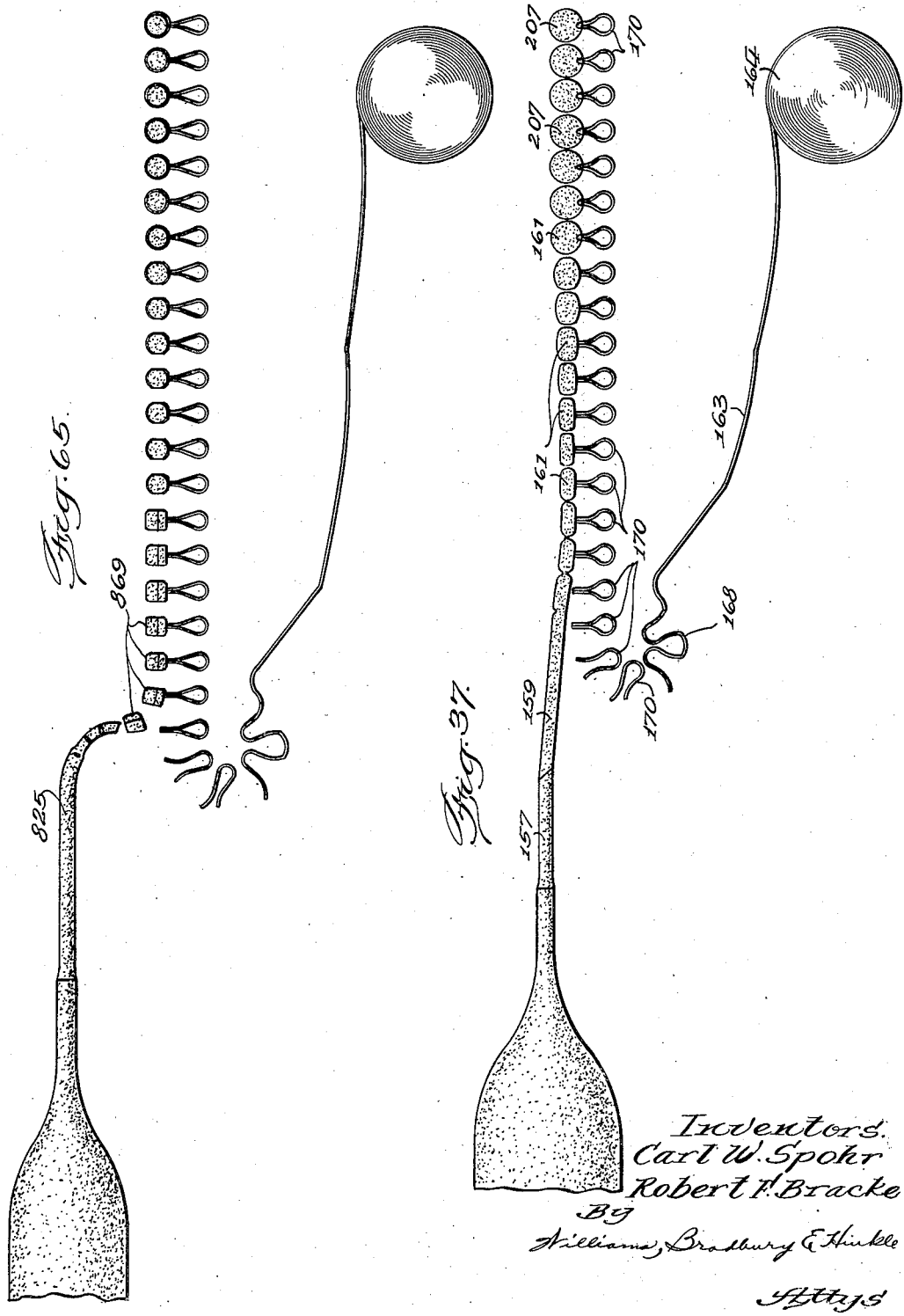
Inventors.
Carl W. Spohr
Robert F. Bracke
By
Williams, Bradbury & Hinkle
Attys April 7, 1942.   C. W. SPOHR ET AL   2,278,574
CONFECTION MAKING METHOD AND APPARATUS
Filed Dec. 23, 1940   36 Sheets-Sheet 27
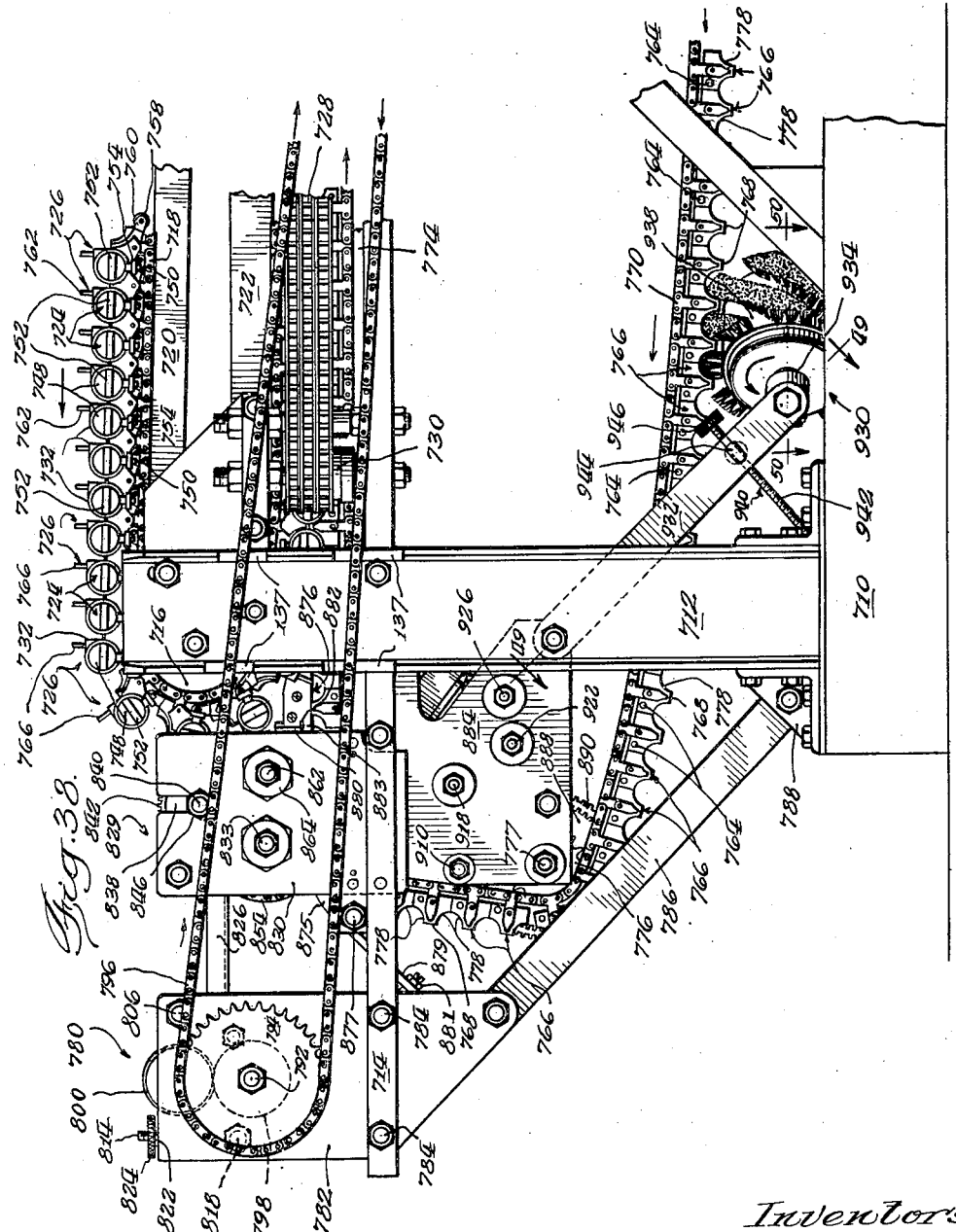
Inventors.
Carl W. Spohr
Robert F. Bracke
By
Williams, Bradbury & Hinkle
Attys.

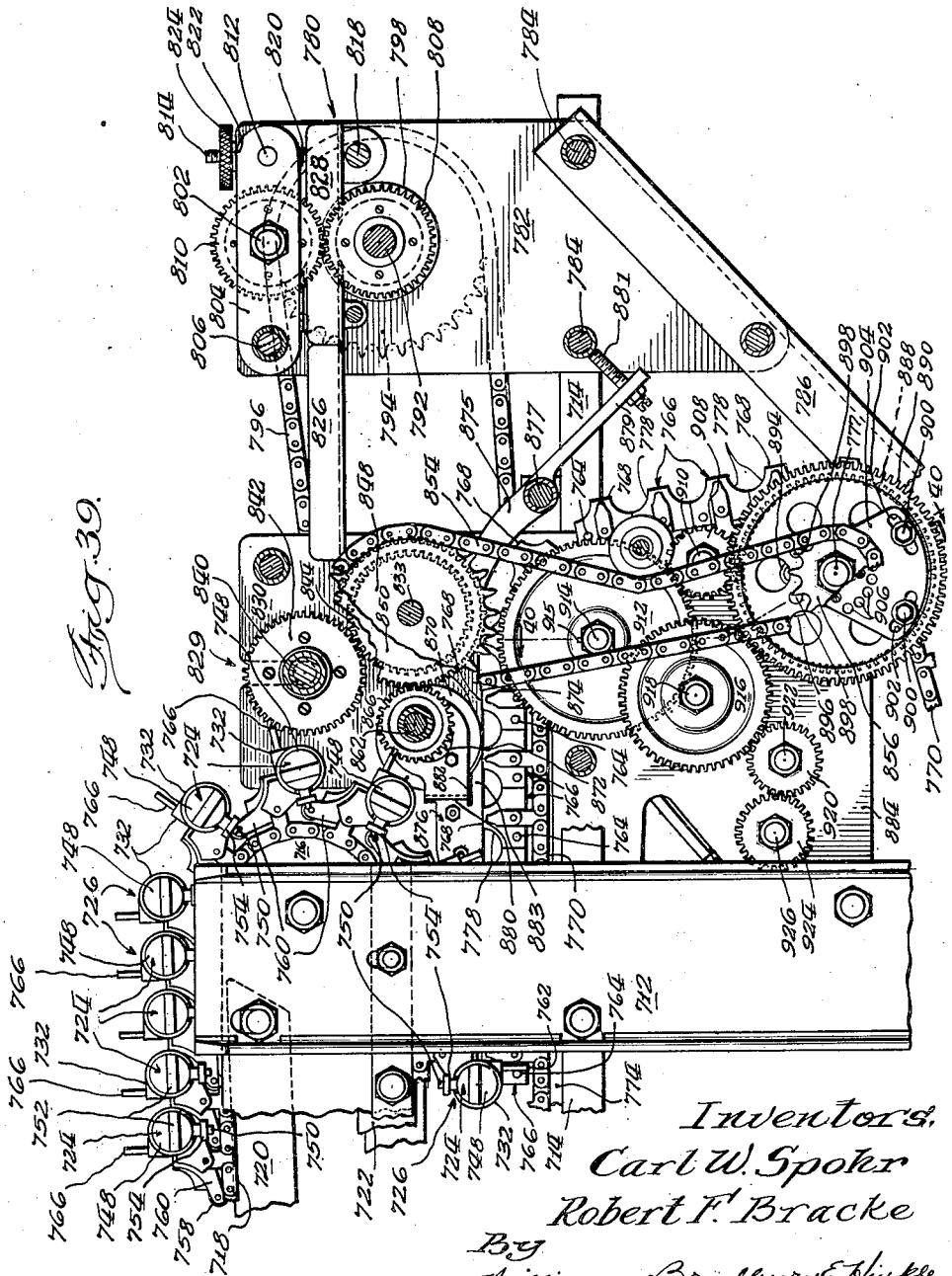

April 7, 1942.  C. W. SPOHR ET AL  2,278,574
CONFECTION MAKING METHOD AND APPARATUS
Filed Dec. 23, 1940  36 Sheets-Sheet 29
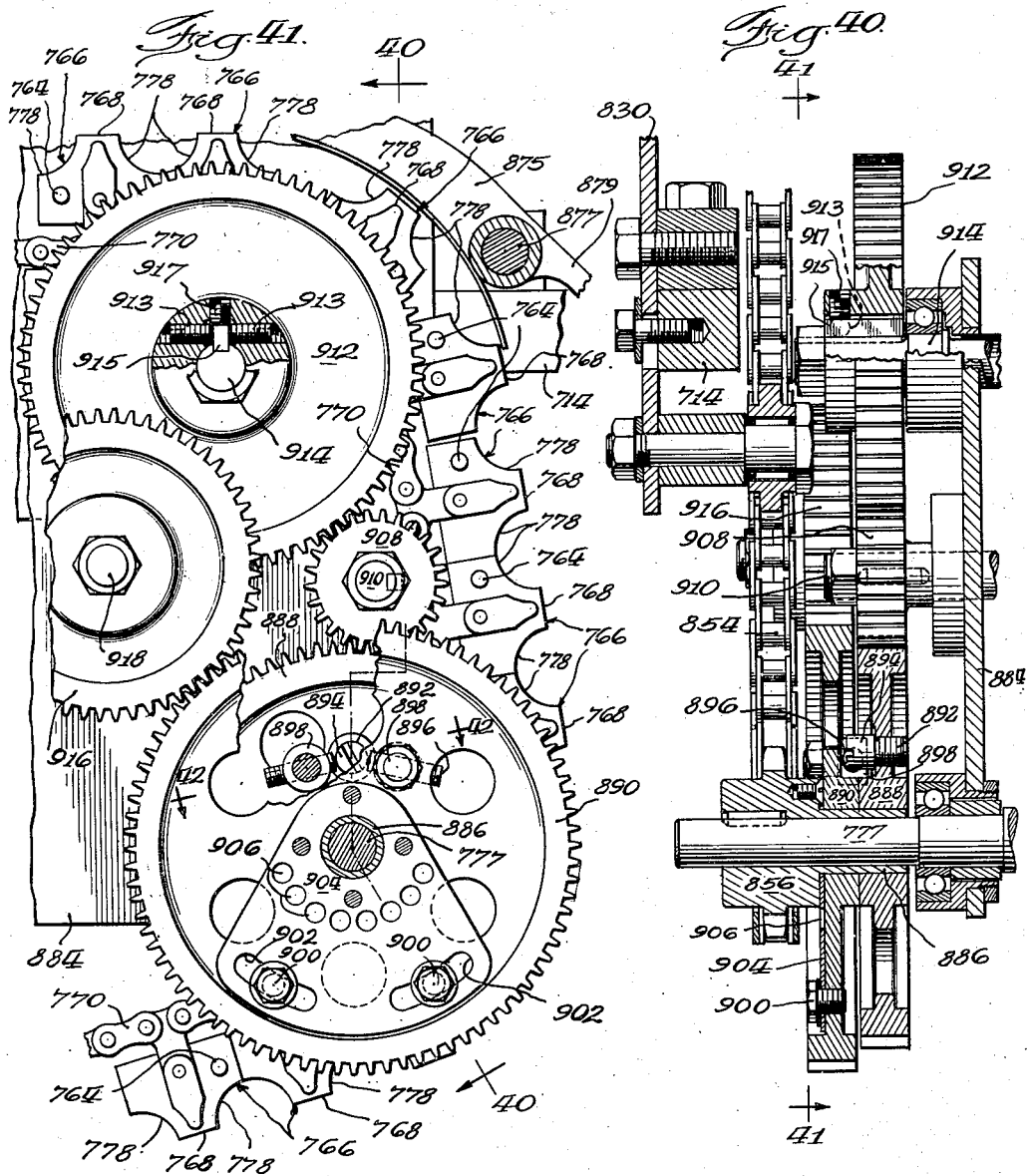
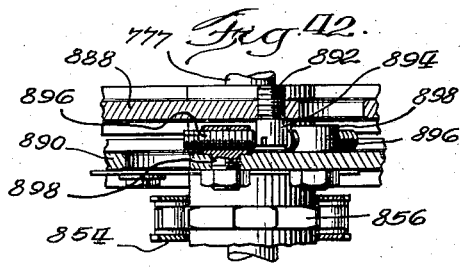
Inventors.
Carl W. Spohr
Robert F. Bracke
By
Williams, Bradbury & Hinkle
Attys

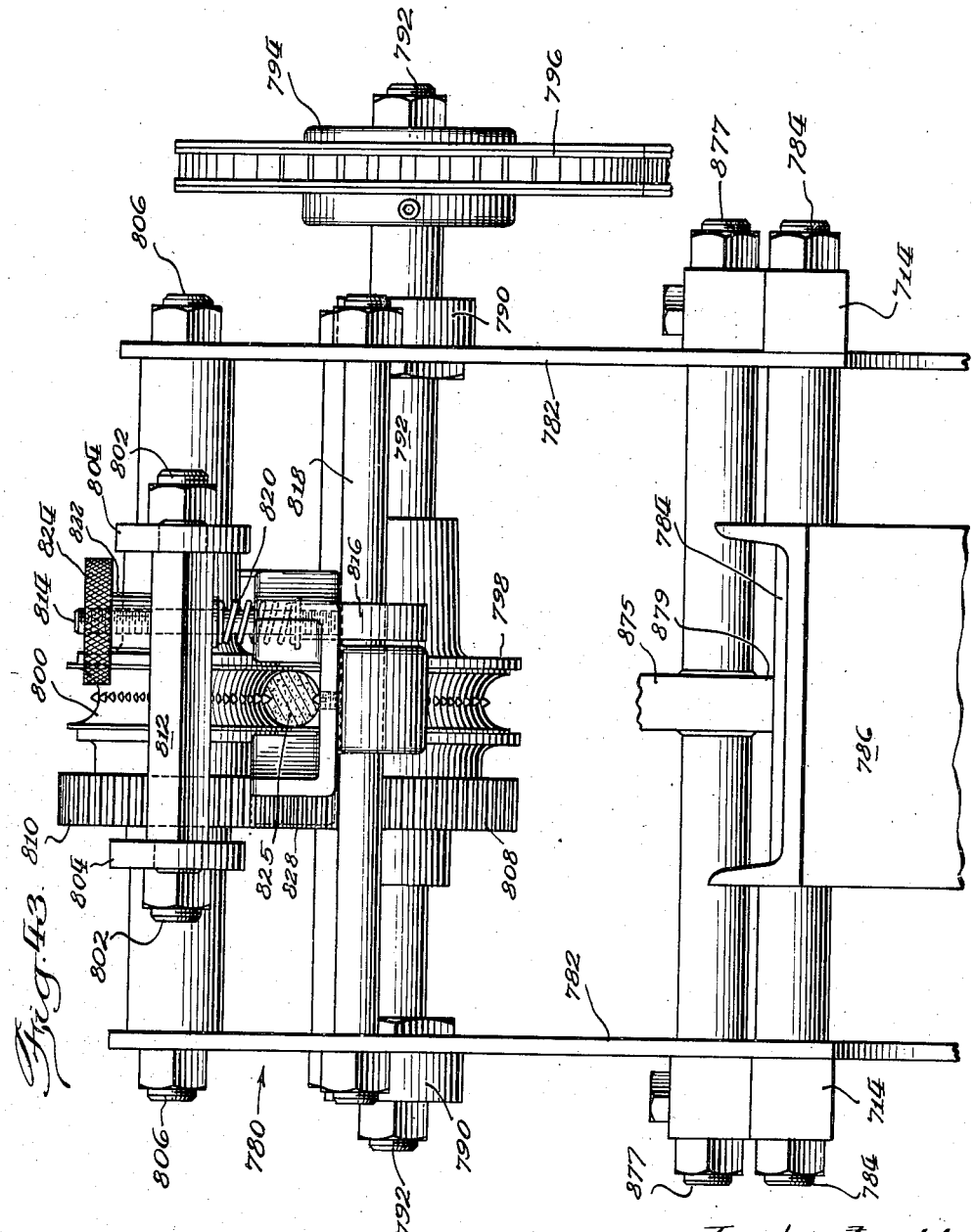

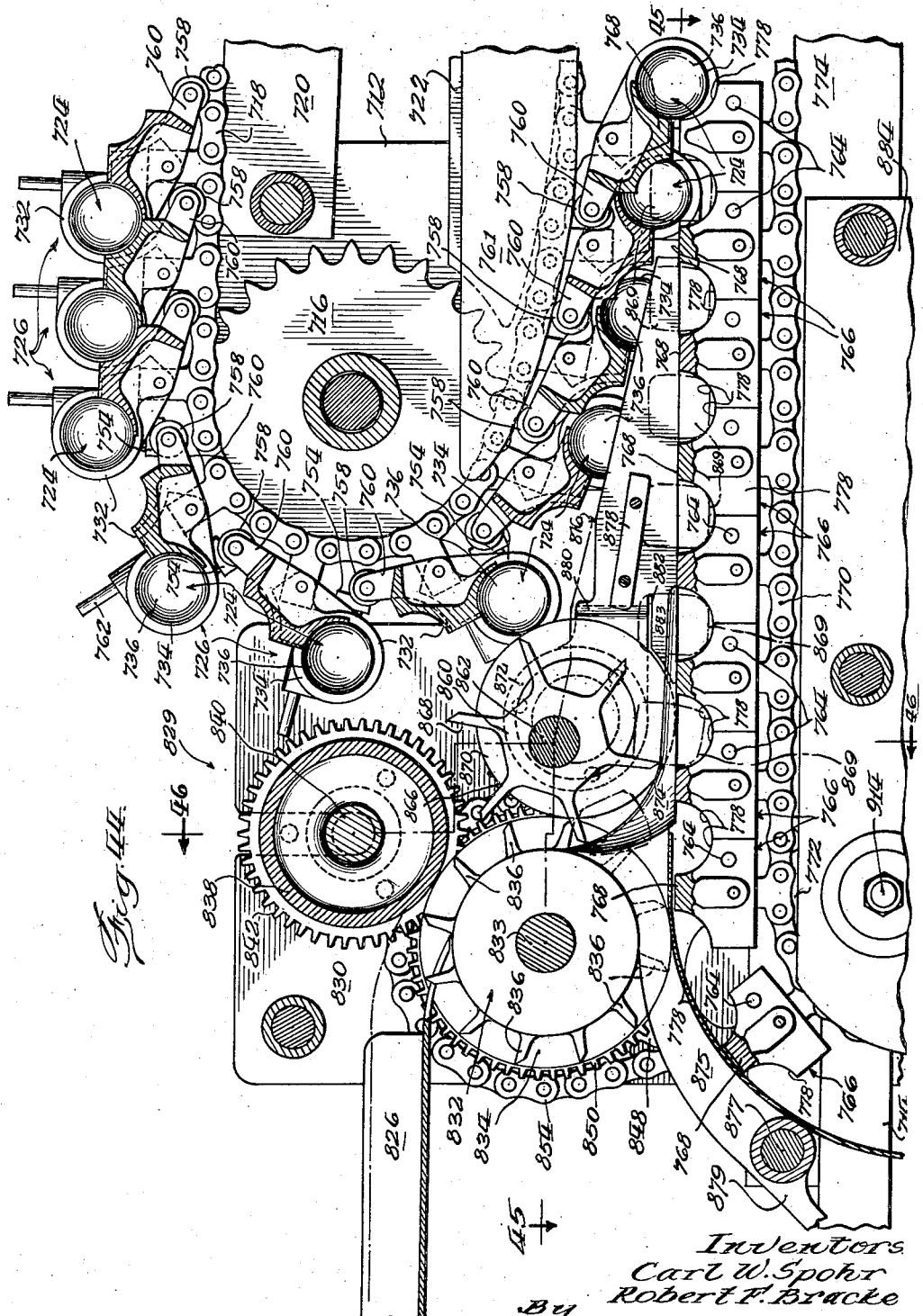

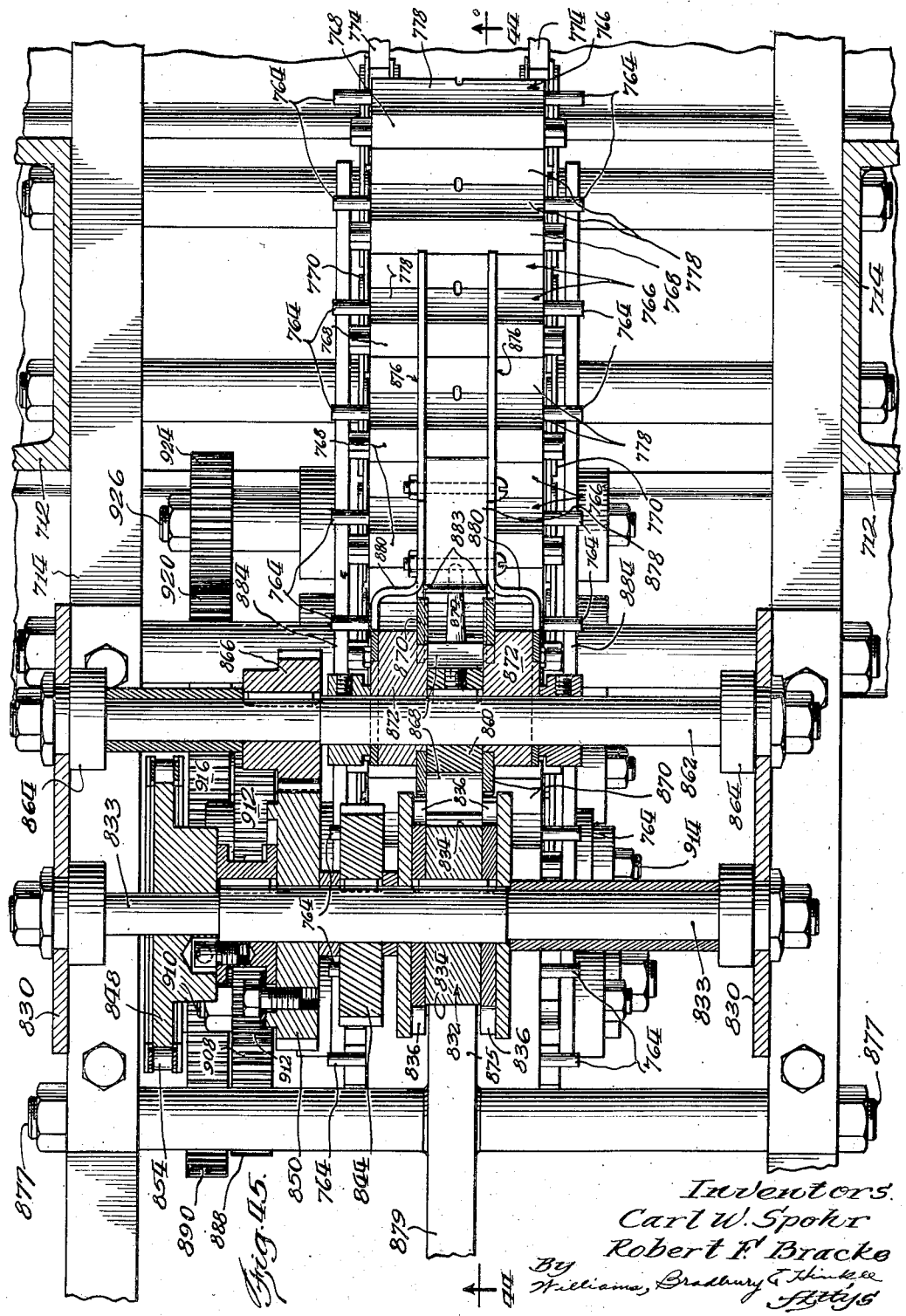

April 7, 1942.  C. W. SPOHR ET AL  2,278,574
CONFECTION MAKING METHOD AND APPARATUS
Filed Dec. 23, 1940    36 Sheets-Sheet 33

Fig. 46.

Inventors.
Carl W. Spohr
Robert F. Bracke
By Williams, Bradbury & Hinkle
Attys.

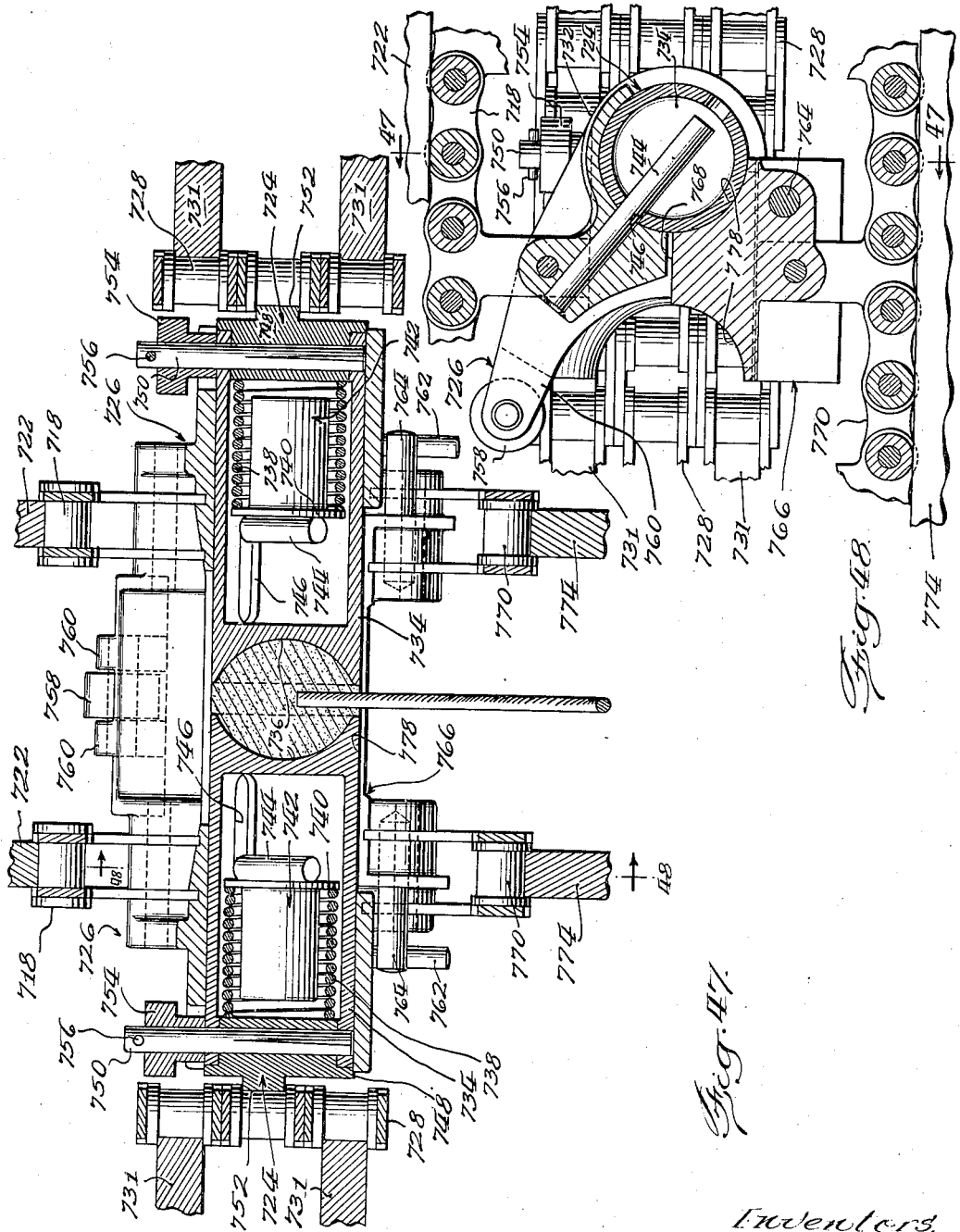

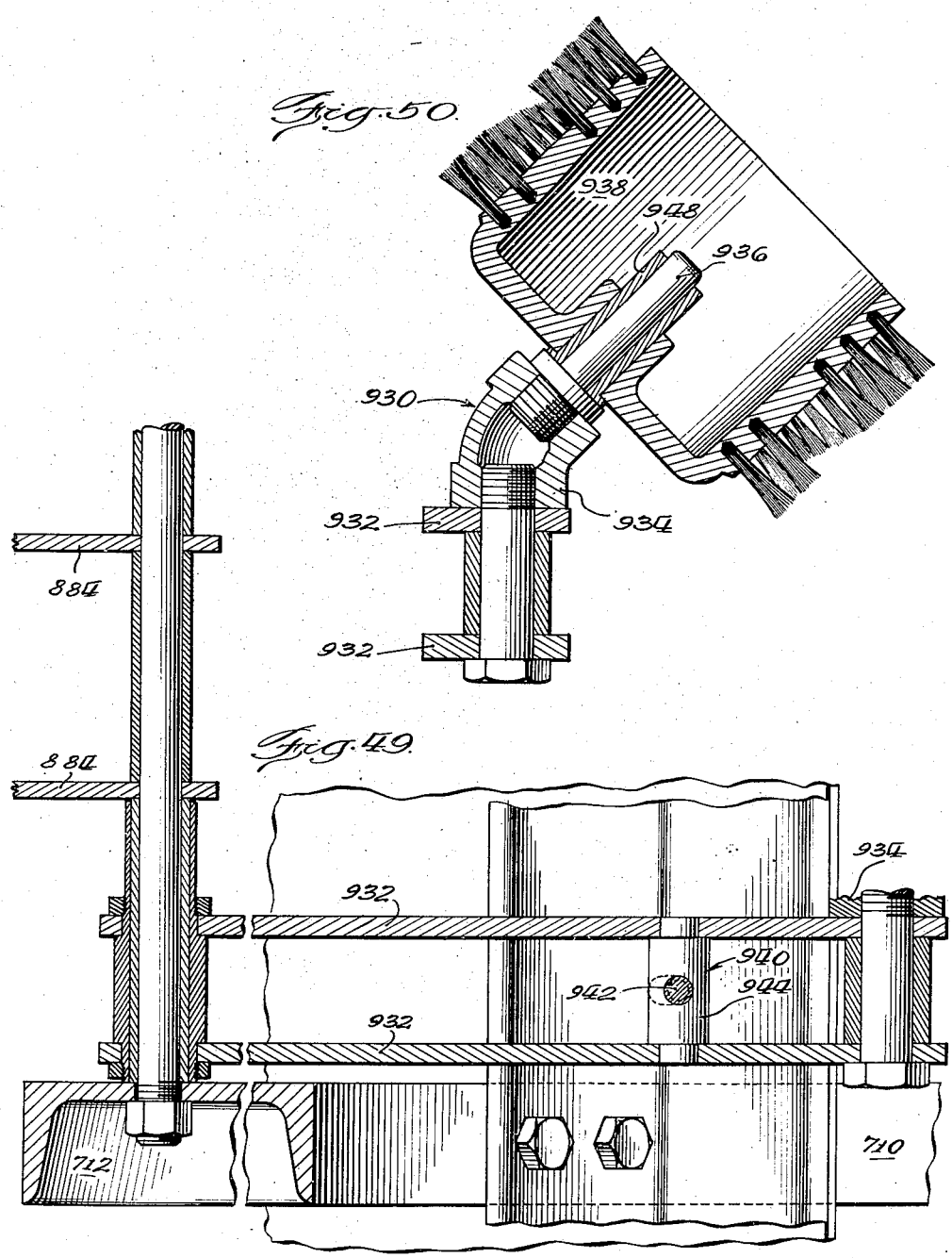

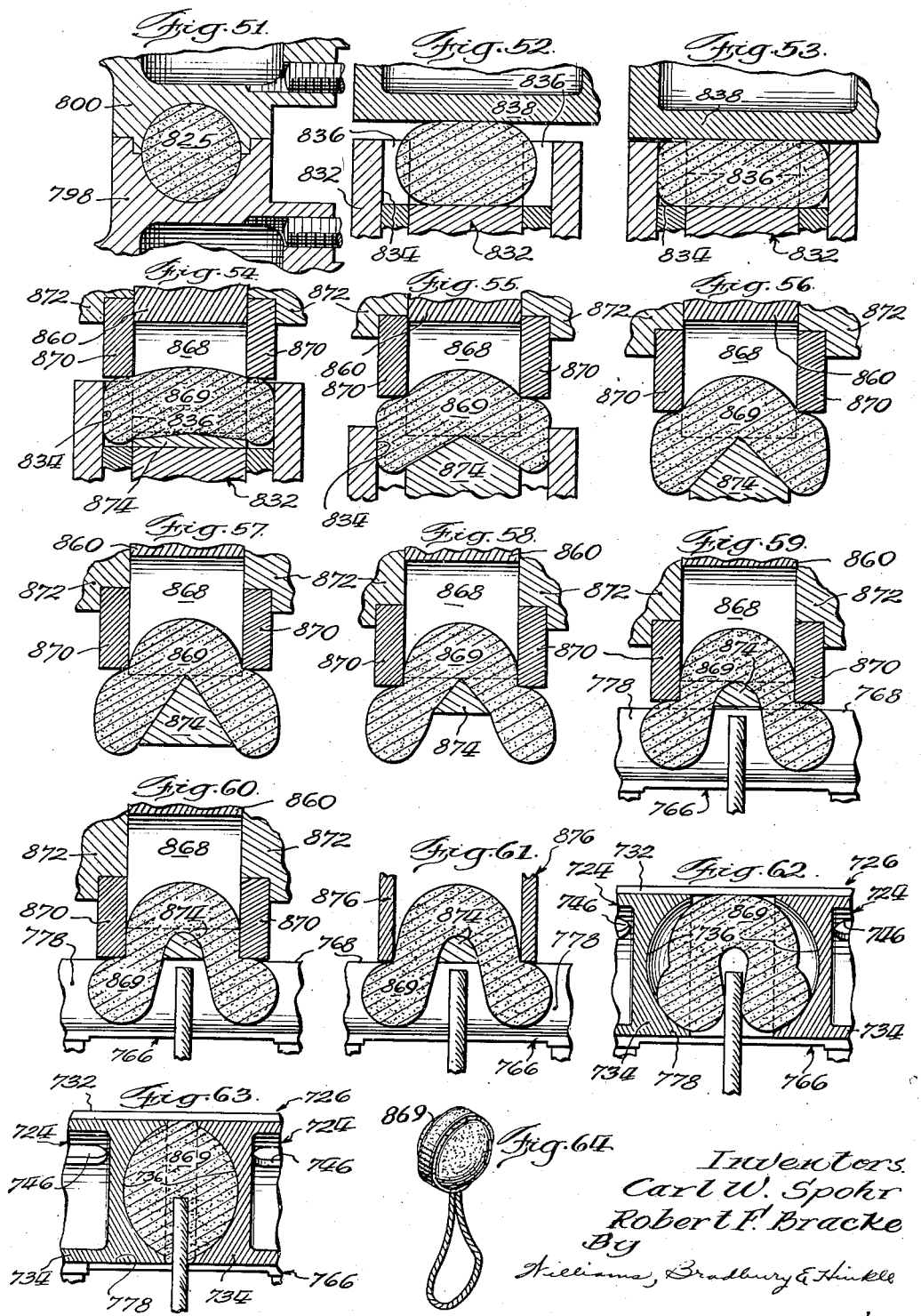

Patented Apr. 7, 1942

2,278,574

UNITED STATES PATENT OFFICE 2,278,574

CONFECTION MAKING METHOD AND APPARATUS

Carl W. Spohr, Chicago, and Robert F. Bracke, Arlington Heights, Ill., assignors to Saf-T-Pop Corporation, Dubuque, Iowa, a corporation of Delaware Application December 23, 1940, Serial No. 371,336

35 Claims. (Cl. 107—8)

This invention relates to a confection making machine, and has as its principal object the provision of a novel and improved machine for making confections of the type commonly known as lollipops or suckers.

The novel machine of the present invention is adapted to separate a mass or roll of plastic confection into pieces of the proper size, and to form these pieces about one end of a handle adapted to support the confection.

More particularly, the machine of our invention forms individual loop shaped handles from a roll of cord-like handle material and securely bonds one end of each of these handles to a piece of confection while forming the confection into a desired shape. The handles thus formed and bonded to the confection pieces are preferably of sufficient rigidity to support the confection in a position to be consumed, but have enough flexibility to enable the handle to be bent upon an application of endwise pressure. This arrangement eliminates the danger inherent in lollipops having handles formed of wooden sticks or other comparatively rigid materials which in certain instances are known to have caused injuries.

An additional object is to provide a novel machine that automatically and rapidly manufactures lollipops from a mass of plastic confection and a roll of handle material with no attention other than that required to feed the plastic confection to the machine and to substitute periodically a roll of handle material in place of a consumed roll.

More specific objects are the provision of an improved lollipop machine having novel elements for manufacturing lollipops and in which:

(A) A roll of plastic confection fed to the machine is given a special shape and is moved forwardly continuously while being divided into pieces of the proper size to form lollipops;

(B) The pieces are placed in individual molds to be formed and attached to handles;

(C) Handle forming cord is fed into the machine from a roll continuously;

(D) The cord is formed into cut loops, the free ends of which are brought together into substantial parallelism, these ends subsequently being inserted into the individual molds;

(E) Movable elements within the molds cause the plastic confection to flow around the ends of the handles within the molds and simultaneously cause the confection to assume the final desired shape.

(F) The molds are opened and the lollipops removed therefrom.

(G) The machine is adapted to accomplish the above functions by continuous motion of the molds, handle forming means and plastic roll feeding means rather than by intermittent motion of these parts;

(H) A portion of each piece of confection while being formed to lollipop shape is pressed around a handle end from one side while a similar portion is being pressed against the handle end from the opposite side;

(I) The molding of the piece of confection around the end of the flexible handle is accomplished without subjecting the handle to bending stresses.

Other objects and advantages of the present invention will become apparent from the following description and accompanying drawings in which similar reference characters refer to similar parts throughout the several views.

In the drawings:

Figures 1 and 1a are side elevations, respectively, of the front portion and rear portion of a machine embodying the present invention;

Figures 2 and 2a are plan views, respectively, of the front portion and rear portion of the machine shown in side elevation in Figs. 1 and 1a;

Figure 3 is an end view showing the front of the machine;

Figure 4 is a vertical longitudinal sectional view of a fraction of the front portion of the machine showing the candy feeding and pre-forming mechanism, and may be considered as taken in the direction of the arrows along the line 4—4 of Fig. 2;

Figure 5 is a vertical transverse sectional view taken in the direction of the arrows along the line 5—5 of Fig. 1;

Figure 11 is a transverse oblique sectional view taken in the direction of the arrows along the line 11—11 of Fig. 6 and may be considered as an enlargement of the lower central portion of Fig. 10;

Figure 12 is a horizontal sectional view taken substantially along the line 12—12 of Fig. 6 looking downwardly as indicated by the arrows. In this view the lower mold track has been broken away to disclose the construction therebeneath;

Figure 13 is a horizontal sectional view taken downwardly as indicated by the arrows substantially along the line 13—13 of Fig. 6, and may be considered as an enlargement of the central portion of Fig. 12 with some of the parts shown therein broken away;

Figure 14 is a fractional view of the mechanism shown in Fig. 9, illustrating the position assumed by a portion of the mechanism at the moment the continuous length of handle material is cut into individual handle lengths;

Figure 15 is a fractional sectional view taken in the direction of the arrows along the line 15—15 of Fig. 7;

Figure 16 is a perspective view of one of the elements of the mechanism for forming individual handles from a continuous length of handle material;

Figure 17 is a perspective view of a fraction of the handle material feeding wheel showing the configuration of the periphery thereof;

Figure 18 is an oblique transverse sectional view showing the handle material feeding mechanism and is taken in the direction indicated by the arrows along the line 18—18 of Fig. 6;

Figure 19 is an oblique transverse sectional view taken in the direction of the arrows along the line 19—19 of Fig. 6 showing a detail of the handle material feeding mechanism;

Figure 20 is a horizontal sectional view of a detail of the construction taken along the line 20—20 of Fig. 1 and looking downwardly as indicated by the arrows;

Figure 21 is a transverse sectional view taken as indicated by the arrows along the line 21—21 of Fig. 20;

Figure 22 is a longitudinal sectional view taken in the direction of the arrows along the line 22—22 of Fig. 2 and shows the machine at the point where the lollipop molds are opened;

Figure 23 is a longitudinal sectional view taken in the direction of the arrows along the line 23—23 of Fig. 2, showing the machine driving means and associated elements;

Figure 24 is a horizontal sectional view taken in the direction of the arrows substantially along the line 24—24 of Fig. 23;

Figure 25 is a transverse sectional view taken in the direction indicated by the arrows along the line 25—25 of Fig. 22, showing the lollipop forming mold and associated mechanism;

Figure 27 is a longitudinal sectional view taken in the direction indicated by the arrows along the line 27—27 of Fig. 2a, showing the rearward end of the machine where the finished lollipops are discharged;

Figure 28 is a horizontal sectional view taken along the line 28—28 of Fig. 27 looking downwardly as indicated by the arrows;

Figure 29 is an oblique transverse sectional view taken in the direction of the arrows along the line 29—29 of Fig. 27;

Figures 30 to 35 are vertical transverse sectional views through the machine, showing several successive stages in the formation of the lollipop head from the roll of plastic material;

Figure 36 is a perspective view of a finished lollipop manufactured in the machine of the present invention;

Figure 37 is a flow sheet showing the formation of lollipops according to the present invention;

Figure 38 is a side elevation of the front portion of a machine made as an alternative embodiment of our invention;

Figure 39 is a view similar to Figure 38 showing the other side of the machine. In this view a portion of the frame has been removed better to disclose the structural detail;

Figure 40 is a transverse sectional view taken in the direction of the arrows along the line 40—40 of Figure 39. This section line is also shown on Figure 41;

Figure 41 is a vertical longitudinal sectional view taken in the direction of the arrows along the line 41—41 of Figure 40;

Figure 42 is a sectional view taken in the direction indicated by the arrows along the line 42—42 of Figure 41, showing a detail of the construction;

Figure 43 is a front view of the confection material feeding mechanism;

Figure 44 is a vertical longitudinal sectional view taken as indicated by the arrows along the line 44—44 of Figure 45;

Figure 45 is a horizontal sectional view taken downwardly as indicated by the arrows along the line 45—45 of Figure 44;

Figure 46 is a vertical transverse sectional view taken in the direction indicated by the arrows along the line 46—46 of Figure 44;

Figure 47 is a sectional view taken transversely of the machine through one of the molds. It may be considered as taken in the direction indicated by the arrows along the line 47—47 of Figure 48;

Figure 48 is a longitudinal sectional view taken as indicated by the arrows along the line 48—48 of Figure 47;

Figure 49 is an oblique sectional view taken as indicated by the arrows along the line 49—49 of Figure 38;

Figure 50 is a horizontal sectional view taken downwardly as indicated by the arrows along the line 50—50 of Figure 38;

Figures 51 to 63 are transverse sectional views showing successive stages in the formation of a lollipop by the alternative machine of our invention;

Figure 64 is a perspective view of a completed lollipop as manufactured by the alternative machine of our invention; and Figure 65 is a flow sheet similar to Figure 37, but showing the formation of lollipops by the alternative machine.

Brief general description

Figure 6:
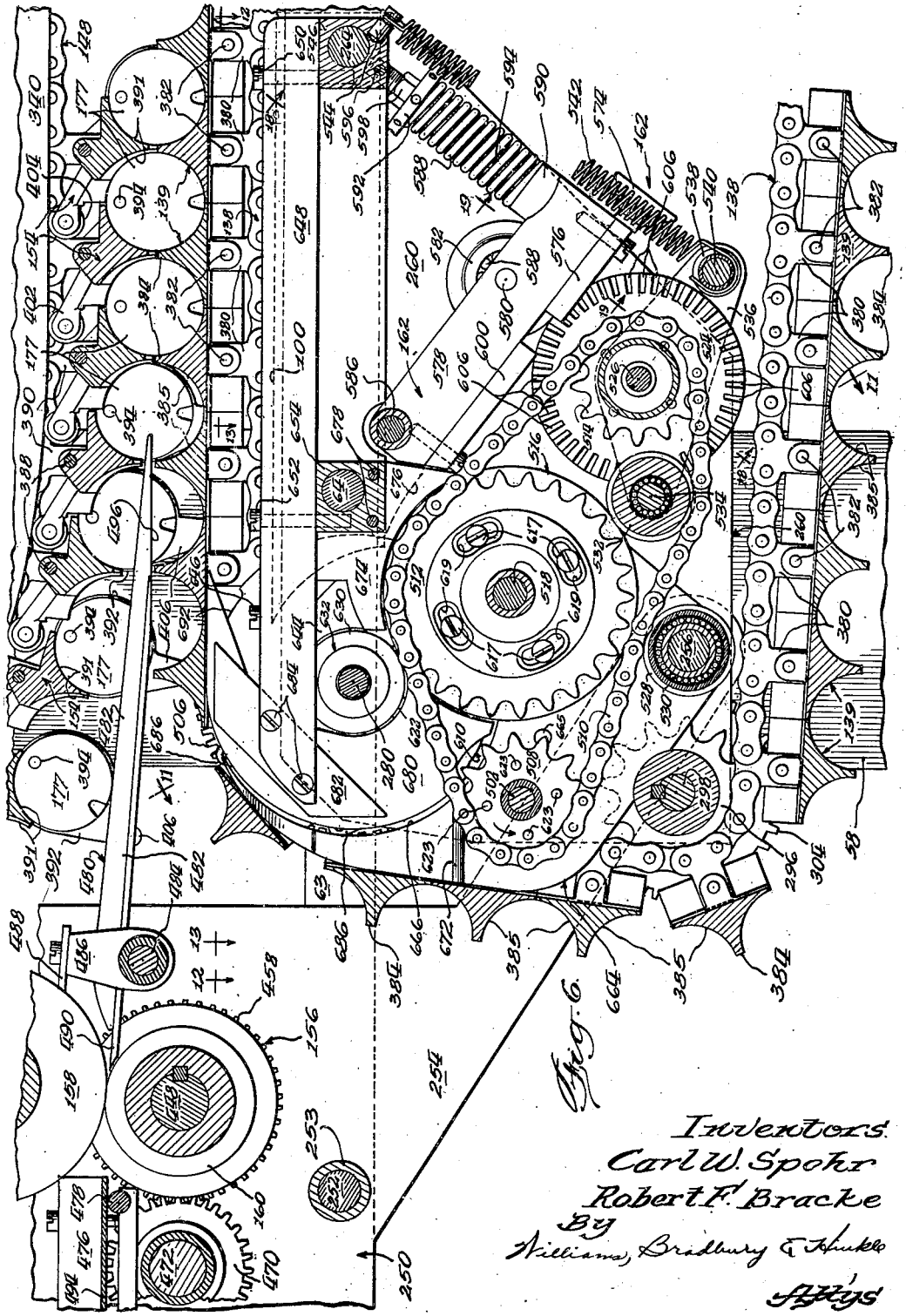
Figure 6 is a vertical longitudinal sectional view of a portion of the machine showing the drive for the handle forming mechanism, and may be considered as taken in the direction of the arrows along the line 6—6 of Fig. 2.

In general, the machine of the present invention comprises a plurality of permanent cylindrical molds which are automatically formed by progressively bringing together separate mold elements into assembled relationship. Before each of the molds is closed by bringing together the several mold elements, a piece of plastic confection is deposited therein. Each mold when closed forms a cylindrical cavity having a volume considerably larger than that of the piece of plastic confection, but as the molds move through the machine, a piar of dies within each mold cavity progressively approach each other and squeeze the pieces of confection into the desired final shape. Before each of the molds is closed, a portion of the end of a handle is inserted into the mold so that the approaching movement of the dies will bond the confection to the handle as the lollipop head is formed. After the dies have formed the lollipop, they are retracted toward the ends of the mold cavity, the mold elements are separated, and the lollipop is removed from the machine. The mold elements are then conveyed to the starting point of the cycle to be refined.

The handles are formed from a continuous length of cord or other suitable material preferably formed of twisted paper, or the like. This continuous length of handle material is fed into the machine continuously and is there formed into individual cut loops, the free ends of which are brought adjacent to each other and are inserted between a pair of mold elements at the point in the cycle where these mold elements are brought together to form closed molds. Thus, each closed mold is provided with the end of a handle projecting thereinto about which the piece of plastic confection can be formed.

Since the handle is formed of flexible material, the end projecting into the mold would be bent to one side if the flow of plastic material around the handle during the formation of the lollipop were not controlled to prevent this. The machine, therefore, has a preforming mechanism which so shapes the pieces of confection before they are introduced into the molds that they straddle the handle ends. The subsequent action of the dies, therefore, presses the two halves of the plastic piece toward each other, thus causing the plastic material to flow evenly around the handle end without subjecting the handle to bending stresses. The finished lollipop, therefore, is provided with an accurately centered handle projecting normal to the edge of the lollipop head.

The two embodiments of the invention shown and described are generally similar machine excepting that in certain instances different mechanical expedients are employed to accomplish similar functions. The principal difference between the machines is that in the first embodiment, the individual pieces of plastic material placed in the individual molds are separated from the roll fed to the machine by the action of the mold elements coming together to form the closed molds, while in the second embodiment, individual pieces are separated from the roll by special means provided for that purpose and these pieces are later introduced into the individual molds. The second of these two expedients requires additional mechanism, but generally is to be preferred and especially so when lollipops of certain shapes are to be produced, as will appear more fully subsequently.

The machine frame

The several elements and sub-assemblies comprising the machine of the present invention are supported in proper operative relationship by a frame denoted generally by the numeral 50. Referring to Figs. 1, 2 and 3, the portion of the frame 50 toward the front of the machine is comprised of a rectangular base 52 built up of parallel channel iron side rails 54 intended to rest on edge upon the floor of the building within which the machine is housed. These rails carry a flat transversely extending plate 56 at their front ends and this plate in turn supports a pair of vertically extending channel iron columns 58 bolted to the vertical faces of a pair of angle iron cross members 60. These angle iron members 60 rest upon the plate 56 and are secured thereto and to the rails 54 by means of bolts 61 extending through aligned openings in the angle iron members 60, plate 56 and the upper flanges of the rails 54. Similar channel iron columns 62 extend vertically along the outer sides of the rear ends of the rails 54 and are secured thereto by means of bolts passed through aligned openings in these structural members. Since the lower ends of the columns 58 rest upon the top of the plate 56 and are spaced inwardly between the rails 54, while the similar columns 62 are positioned outside the side rails and are bolted thereto in face-to-face contact, the horizontal spacing between the columns 62 is somewhat greater than that between the columns 58. This may best be seen in Fig. 3.

A pair of parallel square bars 63 extend horizontally between the columns 58 and 62 and project toward the front of the machine some distance beyond the columns 58. These bars 63 are secured in face-to-face contact with the webs of the channels 58 by a round rod 64 which extends transversely therethrough and through the channels 58, as may best be seen in Fig. 12. The ends of the rod 64 are threaded to receive nuts 65, while the portion of the rod between the bars 63 extends through tubular spacers 66 and other spacing elements to be described more fully later, so that the whole may be drawn rigidly together by tightening the nuts 65.

The opposite ends of the square bars 63 are similarly secured to the columns 62 by a threaded transverse rod 68, best seen in Figs. 24 and 25. This rod 68 extends successively through aligned openings in the web of one of the columns 62, the flanges of an oblique channel iron bracing member 70, one of the bars 63, a plurality of additional spacing members to be described more fully later, the other bar 63, a second oblique channel iron bracing member 70 and, finally, the other column 62.

The channel iron bracing members 70 extend obliquely downwardly from the point at which they are secured to the columns 62 and are attached at their lower ends to the rails 54 by means of suitable brackets 72. These bracing members 70 add rigidity to the frame, as well as serving as spacers to locate the ends of the bars 63 inwardly from the columns 62.

The rearward portion of the frame, which in the present embodiment is approximately twice as long as the forward portion just described, is best shown in Figs. 1a, 2a and 3 and portions thereof in greater detail in Figs. 27 and 28. It comprises a pair of vertical channel iron columns 74 secured at their lower ends to angle iron cross-members 76 which serve as feet and are intended to be secured to the floor which supports the machine. The upper ends of these columns 74 are secured together and to three horizontal stringers 78, 80 and 82 by means of threaded bars 84 extending between the columns 74 and through horizontal slots 85 in the ends of the stringers. One of these stringers 78 is secured in face-to-face contact with the right-hand column 74, while the two other stringers 80 and 82 are spaced from the columns and from each other by spacing means including tubular spacers 88, 90 and 92. The forward ends of the horizontal stringers 78, 80 and 82 are attached to a transverse bar 93 extending through a pair of ears 94 and 95 formed integrally with a pair of castings to be described.

Since the rear columns carry a shaft and sprockets to be described presently, these columns are made adjustable relative to the forward end of the machine. This adjustment mechanism comprises a bar 97 passed through the stringers 78, 80 and 82 just in front of the columns 74. A pair of adjustment screws 99 are threaded horizontally through the ends of this bar and bear with their ends against the front flanges of the columns 74 so that by loosening the bolts 84 and turning the screws 99, the columns 74 can be moved rearwardly or forwardly relative to the ends of the stringers 78, 80 and 82 within the limits determined by the lengths of the slots 85 in the horizontal stringers.

The stringer 78 located in face-to-face contact with the right-hand column 74 serves merely as a frame member and is largely for the purpose of resisting tensionally applied forces tending to pull the columns 74 toward the columns 62. The two other stringers, 80 and 82, serve a similar purpose and additionally act as tracks to carry mold conveyor chains. For this reason, the two stringers 80 and 82 are arranged in end abutting relation with two similar stringers 98 and 100, respectively, which extend the track into the region of the front columns 58. This feature of the construction can best be seen in Figs. 22 and 24. At the point where stringers 80 and 98, and 82 and 100 are respectively brought together in end abutting relationship, the joints of these abutting members are lapped by flat reinforcing plates 102 and 104, attached to the stringers 98 and 100 by bolts 105.

The whole track structure is rigidly supported at this point by the rod 93 which extends through the stringers 80 and 82 and through one end each of the reinforcing plates 102 and 104, and by the rod 68 which extends through the stringers 98 and 100 and the other ends of the reinforcing plates 102 and 104. The stringers 80 and 82 are properly spaced laterally by tubular spacers of appropriate length 106, 108 and 110, through which the rod 93 extends, as best seen in Fig. 24. Near the front of the machine the forward ends of the stringers 98 and 100 are similarly supported by the previously mentioned transverse rod 64 passing through openings therein. This constructional detail can best be seen in Figs. 12 and 13.

Figure 26:
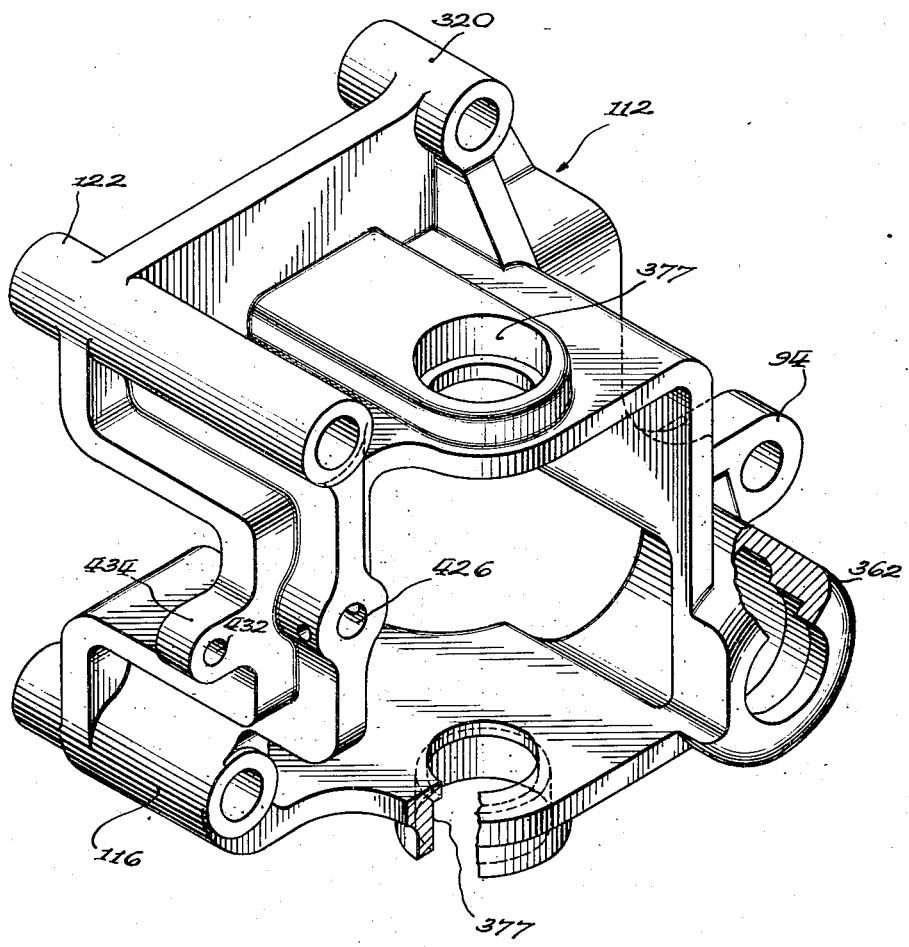
Figure 26 is an isometric view of a casting included in the machine of the present invention.

The columns 62 support a pair of castings 112, Figs. 26, and 114, one of which is substantially the reverse complement of the other. These castings are positioned in the machine between the columns 62 with the casting 112, see Fig. 25, adjacent the right-hand column and the casting 114 toward the left-hand column. Because of the several functions performed by these castings and their rather intricate shape, their several features and elements will be described along with the cooperating sub-assemblies. They are in part supported by horizontal tubular spacing elements 116 and 118 formed integrally with the castings 112 and 114, respectively. In positioning the castings within the frame, the tubular element 116 of casting 112 is located between the right-hand rectangular bar 63 and the longitudinal stringer 98, while the similar tubular element 118 of casting 114 is located between the left-hand rectangular bar 63 and the longiudinal stringer 100, see Fig. 25. The transverse rod 68 previously mentioned passes through these tubular elements and aids in supporting the castings 112 and 114, while the tubular elements serve as spacers to locate the stringers 98 and 100, the space between the stringers being filled by the reinforcing plates 102 and 104 mentioned previously, and a tubular spacer 120.

The opposite sides of the castings 112 and 114 are formed to provide the ears 94 and 95 previously mention as supporting the rod 93.

At their uppers ends and directly above the tubular elements 116 and 118, the castings are provided with additional similarly shaped tubular mounting elements 122 and 124, respectively, see Figs. 26, 25 and 23. A cylindrical rod 126 passes through these mounting elements and extends through the columns 62 to provide additional support for the castings. Between the outward ends of the tubular elements 122 and 124 and the inner faces of the columns 62, the rod 126 passes through tubular spacers 128. The adjacent ends of the tubular mounting elements 122 and 124 bear against the outer faces of a pair of upper mold chain tracks 130 and 132, respectively, through which the rod 126 is passed. The holes in the tracks 130 and 132 through which the rod 126 passes are somewhat larger than this rod and are fitted to annular portions 134 of reduced diameter formed at the ends of a hexagonal spacer 136. This hexagonal spacer has a hole extending longitudinally therethrough which is fitted to the rod 126 and which is eccentric to the annular surfaces 134, as is best seen in Figs. 22 and 25. Thus, this hexagonal member not only serves to space the tracks 130 and 132 apart, but also provides for their adjustment upwardly and downwardly, this adjustment being accomplished by manual rotation of the member 136 by means of a wrench or other suitable tool.

In several instances, portions of the flanges and webs of the frame members are cut away to provide slots to permit passage of one of the several chains forming operative elements of the machine. These several slots will not be individually described, but are denoted on the drawings by the numeral 137.

*Location and general description of the sub-assemblies*

The machine frame just described supports the several sub-assemblies in proper operative relationship with the location of these sub-assemblies being generally as follows: A lower continuous chain 138, carrying lower mold elements 139 extends over front and rear sprockets 140 and 142, respectively, mounted to rotate about transverse axes. Actually a pair of lower parallel mold chains 138 and a pair of similarly arranged upper mold chains 148 are used, but in the interest of simplicity these pairs are referred to in this description simply as a lower mold chain 138 and an upper mold chain 148 unless otherwise indicated. These mold elements 139 travel from end to end of the machine upon the lower track formed by the horizontal stringers 98 and 100 and their continuations 80 and 82. At the rear end of the machine the lower mold chain 138 passes downwardly over the rear sprockets 142, and then forwardly to the front of the machine where it passes upwardly over the forward sprockets 140 and again upon the lower mold track.

This lower mold chain 138 cooperates with a considerably shorter upper mold chain 148 which likewise passes over front and rear sprockets 150 and 152 and provides a means for bringing upper mold elements 154 into contact with the lower mold elements 139 to form closed molds. These closed molds pass substantially throughout the distance between the columns 58 and 62. The forward sprockets 150, over which the upper mold chain 148 passes, are located directly above the similar, lower mold chain forward sprockets 140, while the rearward upper mold chain sprockets 152 are positioned a short distance behind the columns 62. Thus, during operation of the machine, the upper mold chain 148 moves from the forward end of the machine toward the rear end with its mold elements 154 in contact with the lower mold elements 139 until it reaches a point slightly ahead of the rear upper mold chain sprockets 152. From here the upper mold elements 154 pass upwardly, around the upper sprockets 152 and forwardly to the front end of the machine, where they are again brought into contact with the lower mold elements 139 after passing downwardly around the forward upper sprockets 150.

The confection roll feeding and preforming mechanism, indicated generally at 156, is located directly ahead of the point at which the upper and lower mold elements are brought together and is outrigged upon the rectangular bars 63. In this mechanism a roll of plastic confection 157 is fed to and forced between preforming rollers 158 and 160 which form the roll into a chevron-shaped ribbon 159. After passing through the preforming rollers, the length of chevron-shaped confection is continuously fed to the point where the upper and lower mold elements 154 and 139 are brought together, so that the act of bringing these elements together with the confection therebetween will squeeze off individual pieces 161 of confection, one of which will be deposited in each of the molds.

The handle forming mechanism, indicated generally at 162, is located between the columns 58 and beneath the track formed by the stringers 98 and 100. Handle forming material 163 is continuously fed to this handle forming sub-assembly from a roll 164 of this material mounted to rotate upon an axle 166 projecting outwardly from the right-hand column 62. In general, the handle forming mechanism 162 draws in the handle forming material 163 continuously and forms this material into loops 168 each of which is cut at a predetermined point to form an individual handle portion 170. The two ends of the individual handle portions are then brought together into substantial parallelism and are extended through the space between each pair of lower mold forming elements 139 just before these elements are brought together to form the lower halves of individual molds. Each pair of adjacent lower mold elements 139 when brought together acts as a clamp to prevent the handle 170 therebetween from being withdrawn from the mold and thus each handle is carried from end to end of the machine along with a piece of plastic confection 161 placed in the mold shortly after each pair of adjacent lower mold elements is brought together.

Each of the upper mold elements 154 carries right and left normally retracted dies 175 and 177 mounted upon slidable plungers 176 and 178, respectively. These plungers and dies are forced toward each other as the molds pass through the machine by right and left continuous forming chains 180 and 182 arranged one upon each side of the machine in a position such that they intersect the plane of travel of the closed molds. The right-hand forming chain 180 is looped around front and rear sprockets 184 and 186 carried upon vertical shafts 188 and 190 and is urged against the outward ends of the plungers 176 by a pair of upper and lower cam plates 192 and 194 adjustably supported within the loop of the forming chain. The left-hand forming chain 182 is similarly passed around front and rear sprockets 196 and 198 carried upon vertical shafts 200 and 202 and is urged inwardly against the plungers 178 by upper and lower cam plates 204 and 206. Thus, as the closed molds pass through the machine, the forming chains 180 and 182, together with their cam plates, urge the plungers 176 and 178 and dies 175 and 177 inwardly to form lollipop heads 207. Before the molds have reached the point where the upper mold elements 154 are separated from the lower mold elements 139, the plungers 176 and 178 and attached dies are retracted to their initial positions.

After the plungers and dies have been retracted and the upper mold elements separated from the lower mold elements, the lower mold elements continue along the machine, through a cooling tunnel 208 formed of sheet metal and secured to the machine frame and eventually to the rear lower mold chain sprockets 142. As the mold chain 138 passes over the sprockets 142, the individual lower mold elements 139 are separated, thus releasing the handles 170 and permitting the finished lollipops to be removed from the vicinity of the machine by any suitable mechanism, such for instance as a conveyor belt, not shown.

*The lower mold chain rear sprocket mounting and lollipop ejecting mechanism*

Referring particularly to Figures 1a, 2a, 27, 28 and 29, the rear lower mold chain sprockets 142 are in alignment with the horizontal stringers 80 and 82 and are keyed to a cross shaft 210. The ends of this shaft are carried in anti-friction bearings contained within bearing boxes 212 outrigged beyond the columns 74 upon plates 214. The plates 214 are supported by the rods 84 extending therethrough with the right-hand plate 214 in face to face contact with the inner face of the horizontal stringer 78 and the left-hand plate 214 in contact with the inner face of the left-hand column 74. Beneath the rods 84 the plates 214 are additionally secured by means of screw bolts 216 extending through these plates and the columns 74. Because the right-hand plate 214 is spaced inwardly from the column 74 a distance equal to the thickness of the stringer 78, a spacer of similar thickness is placed between this plate and the column 74 at the points where the screw bolts 216 pass therethrough.

Between the right-hand mold chain sprocket 142 and the right-hand plate 214 the shaft 210 carries a mold chain drive sprocket 218 driven by a drive chain 220. Thus, as the drive chain 220 rotates the sprocket 218, the mold chain sprockets 142 rotate therewith and cause the mold chain 138 to move toward the rear of the machine.

As the lower mold elements 139 with the lollipops therein approach the rear of the machine, the lollipop handles pass between a pair of vertical converging plates 222. At their point of greatest convergence, the plates define an opening slightly wider than the thickness of the lollipop handles and from this point rearwardly the plates 222 are extended in parallel relationship. At approximately the point of their greatest convergence, the two plates 22 are secured together by a U-shaped yoke 224 which is secured to the outer faces of the plates and depends therebeneath. The lower edges of the front portion of the plates rest upon the rear tubular spacer 90 and are held downwardly thereagainst by a clamp 226 urged against the lower surface of the spacer 90 by a screw 228 passed upwardly therethrough and threaded into the central portion of the yoke 224.

The rearward portion of the left hand plate 222 has its inner surface secured to a crescent shaped disc 230 of approximately the same thickness as the distance between the inner faces of the parallel portions of the plates 222. The reentrant portion 232 in the edge of this crescent shaped disc 230 embraces the shaft 210 and serves as additional support for the plates 222.

With the shaft 210 thus embraced by the crescent shaped disc 230, the outer cylindrical face of this disc serves to journal a three-lobed cam 234 about a center eccentric to the shaft 210. This three-lobed cam 234 may be considered as being formed of a circular disc by cutting radially inwardly for a short distance at three equally circumferentially spaced points and intersecting these cuts with cuts at right angles thereto that extend from the first cuts in a counter-clockwise direction when the disc is seen from the right. The cam plate as thus cut may be considered as having reentrant portions 236, radial faces 238 and lobes 240. The right-hand plate 222 is considerably shorter than the left hand plate and permits a circular rotatable cam drive plate 242 keyed to the shaft 210 to be placed in alignment therewith. This plate 242 is provided with four circumferentially equally spaced screws 244 extending therethrough toward the left hand plate 22 and arranged adjacent the periphery of the plate 242.

The purpose of this plate 242 and screws 244 is to rotate the cam 234 at a speed four-thirds times that of the shaft 210. As may best be seen in Figure 27, this is accomplished by one of the screws 244 impinging against one of the radially extending faces 238 of the cam 234 and revolving the cam therewith until the next successive screw 244 impinges against the next successive radial face. That is, the plate 242 drives the cam 234 much in the manner that a spur gear is driven by an internal gear. The reentrant portions 236 in the cam are so timed relative to the mold elements 139 that the handle of a lollipop will slide into one of these re-entrant portions 236 at about the moment the mold elements 139 are separating. Immediately thereafter, the rotation of the cam 234 will cause a lobe 240 thereon to impinge against the lollipop handle and push the completed lollipop from the mold.

*The mold conveying and operating mechanism*

At the forward end of the machine, a pair of parallel vertical side plates 250 support the confection feeding and preforming mechanism and are secured in contact with the inner faces of the forwardly projecting portions of the rectangular bars 63 by means of a pair of transversely extending threaded rods 252. These rods extend through the bars 63, plates 250 and tubular spacers 253 which separate the plates. The side plates 250 are generally rectangular, but each has a downwardly and rearwardly directed bracing extension 254 anchored to a threaded rod 256 extending transversely through the columns 58. As will be seen in Fig. 8, the rod 256 passes through tubular spacers 258 placed between the columns 58 and the plates 250, while several spacing elements surround that portion of the rod 256 which is between the plates 250.

Spaced inwardly of and behind the plates 250 which support the confection feeding and preforming mechanism, are a second pair of parallel vertical plates 260. These plates 260 support the handle forming sub-assembly and front mold chain sprockets 140. They are secured in place at their lower portions by the transverse bar 256 which extends therethrough and are spaced inwardly from the rearwad extensions 254 of the plates 250 by a pair of tubular spacers 262, Figure 8. The upper edges of these plates 260 extend horizontally along the sides of the lower mold chain 138, their upper portions being held in place by the transverse rod 64, previously mentioned, and by another threaded rod 264 passed through the rearward ends of the plates 260 and through the rectangular bars 63. Tubular spacers 266 surround the rod 264 and space the plates 260 inwardly from the rectangular bars 63 while a plurality of spacing elements including the stringers 98 and 100 and short tubular spacers 268 separate the plates. Similar tubular spacers 270 separate the plates 260 from the stringers at the point where the rod 64 passes through these elements.

Figure 8:
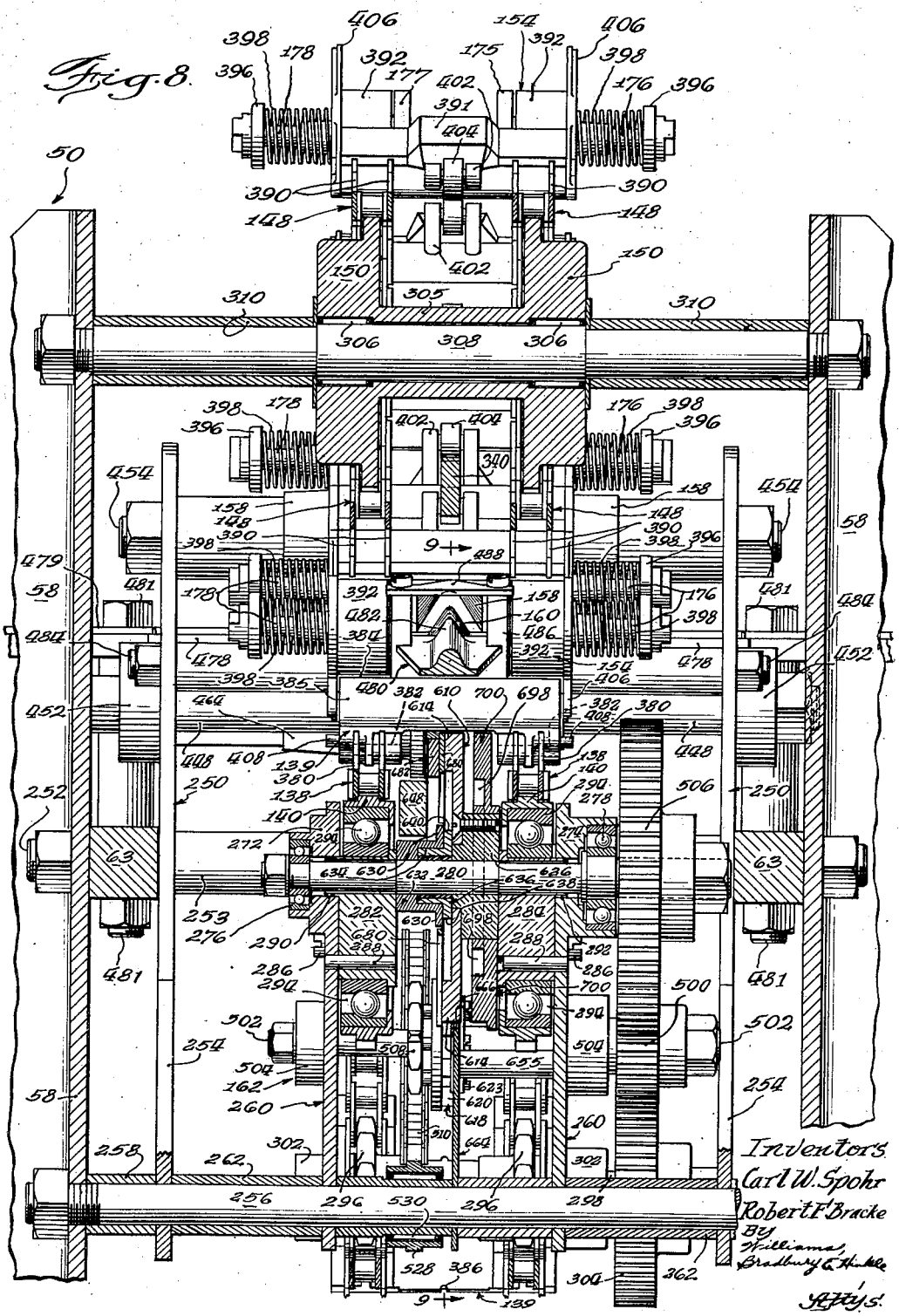
Figure 8 is a vertical transverse sectional view taken in the direction of the arrows along the line 8—8 of Fig. 1. This view illustrates, principally, the handle forming mechanism and its association with the mold elements and the candy preforming means.
Figure 10:
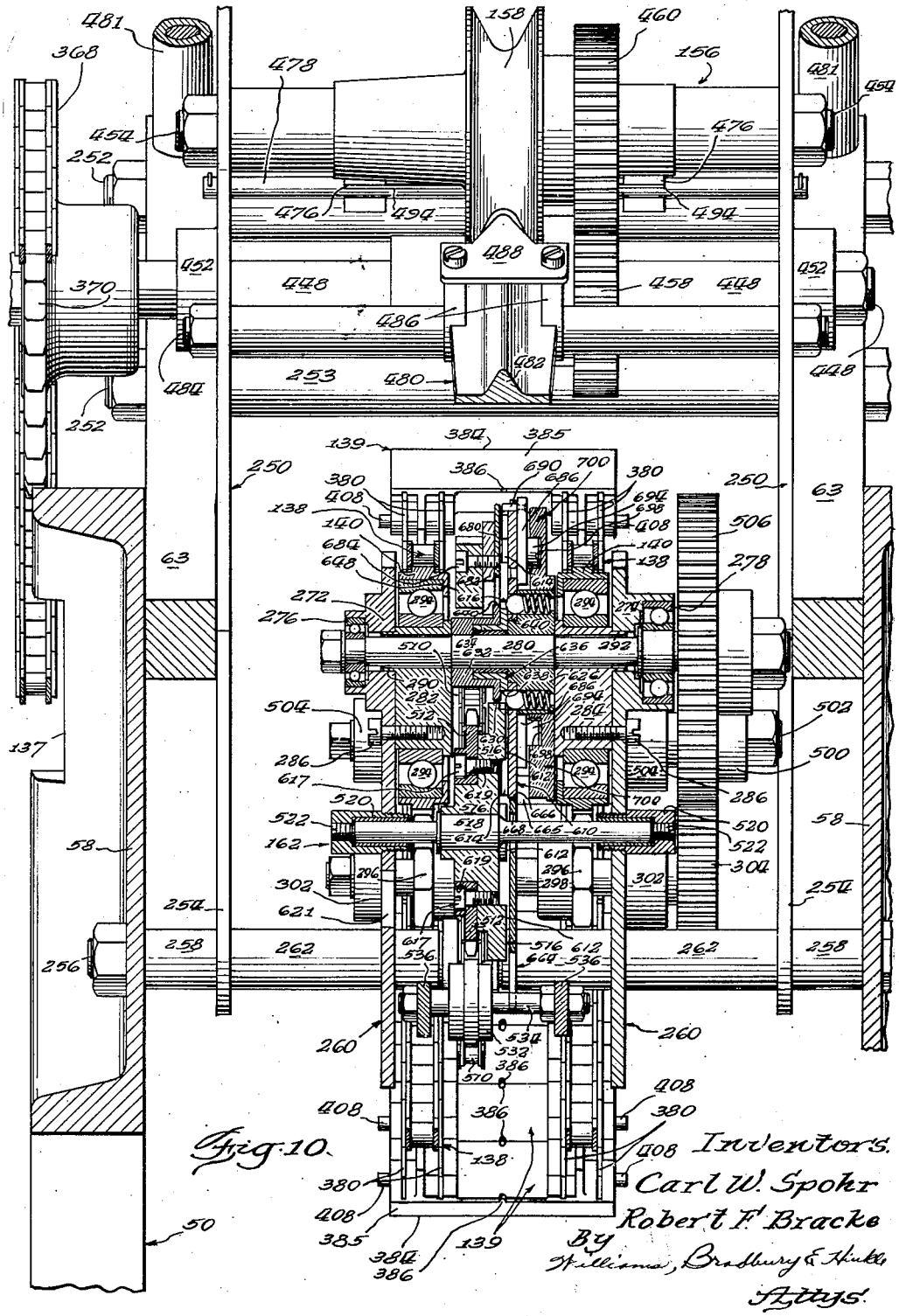
Figure 10 is a tranverse oblique sectional view taken through the centers of the principal handle forming elements showing the construction of this mechanism and its orientation with respect to other closely cooperating machine elements and may be considered as taken in the direction of the arrows along the line 10—10 of Fig. 1.

As best shown in Figures 8, 10 and 11, the plates 260 are provided with ball bearing boxes 272 and 274, respectively, near their forward upper corners. These boxes carry ball bearings 276 and 278, respectively, which serve to journal a transverse spindle 280 forming an element of the handle that forms mechanism 162.

At their inside faces, the plates 260 carry right and left blocks 282 and 284 secured thereto by means of screw bolts 286 and located by pins 288. These blocks have cylindrical openings therethrough to permit passage of the spindle 280, the openings being maintained in alignment with the spindle openings in the plates 260 by means of nipples 290 and 292 which surround the spindle openings in the blocks 282 and 284 and project into the openings in the plates.

The peripheral faces of the blocks 282 and 284 are cylindrical and eccentric to the spindle openings and carry the inner races of ball bearings 294 which journal the front lower mold chain sprockets 140. Thus, these sprockets 140 revolve freely as the mold chain is pulled thereover by the previously described rear lower mold chain sprockets 142.

The lower mold chain also passes over a pair of sprockets 296 keyed to a transverse shaft 298 journaled in anti-friction bearings 300 provided in bearing boxes 302 at the lower forward corners of the plates 260. At its left end, the shaft 298 projects beyond the plate and carries a gear 304 that drives the handle forming mechanism. Thus, the handle forming mechanism is synchronized with the lower mold elements 139, so that handles are formed and introduced between the mold elements at the proper point in the cycle.

The upper mold chain front sprockets 150 are carried on a quill shaft 305 journaled upon anti-friction bearings 306 fitted to a transverse rod 308 supported at its ends in the columns 58 as best shown in Fig. 8. Tubular spacers 310 of appropriate length surround the portions of the rod 308 between the columns 58 and sprockets 150 and maintain these sprockets in alignment with the lower mold chain sprockets 140.

The rear upper mold chain sprockets 152 are similarly journaled upon a rod 312 supported at the outward ends of a pair of rearwardly and upwardly projecting arms 314 secured to the rearward ends of the upper mold chain tracks 130 and 132 by screw bolts 315 as may be seen in Fig. 22.

These upper tracks 130 and 132 as has been mentioned previously are adjustably supported upon the rod 126 by an eccentric adjustment sleeve 136. A similar eccentric sleeve 316 adjustably mounts the rear ends of these tracks upon a transverse rod 318 extending through tubular mounting elements 320 formed integrally with the castings 112. This duplicate mount for the rear ends of the tracks gives the tracks added rigidity and prevents vibration from disturbing their adjustment.

The front ends of the upper tracks 130 and 132 are connected by a pair of transverse rods 332 secured at their ends to a pair of horizontal, longitudinally extending rectangular bars 334 that lie substantially parallel to and above the rectangular bars 63. These bars 334 are supported upon vertical posts 336 bolted to the bars 63. The upper end of these posts 336 are threaded and carry a pair of nuts 338 between which the rectangular bars 334 are clamped so that the rectangular bars 334, together with the tracks 130 and 132 carried thereby, may be adjusted upwardly or downwardly by loosening the nuts 338 to permit movement of the bars 334 to a different position in which they may be again secured by tightening the nuts 338. To give added rigidity to the structure while permitting this vertical adjustment, the forward ends of these bars are secured to the columns 58 by screw bolts passed through the bars and through slotted holes in the columns.

Directly above the tracks 130 and 132 are positioned another set of similar tracks 339 which prevent the reversely moving portion of the chain 148 from sagging. These latter tracks are bolted a short distance behind their centers to downwardly extending plates 341, the opposite ends of which are similarly bolted to the tracks 130 and 132. At their front ends, the tracks 339 are secured to a transversely extending rod 343 extending through the columns 58, thus permitting slight pivotal movement of the tracks 339 about their support points when the tracks 130 and 132 are adjusted upwardly or downwardly.

The under surfaces of the tracks 130 and 132 are properly spaced from the lower mold chain tracks so that with the chains running over these tracks, the upper and lower halves of the mold will be brought together and will be maintained tightly closed until the upper mold elements have reached a point just ahead of the rear upper mold chain sprockets 152. At this point the upper tracks are curved upwardly to permit the upper mold elements to be separated from the lower mold elements prior to the passage of the upper mold chain around the sprockets 152 and 154.

At their forward ends, the tracks 130 and 132 are similarly curved upwardly to guide the upper mold elements downwardly against the lower mold elements.

Near the forward end of the machine, a short upper mold control track 340 is secured between the tracks 130 and 132 by means of the transverse rods 332 that secure the upper mold track to the rectangular bars 334. Proper lateral spacing of the control track is maintained by tubular spacers 342 surrounding the transverse rods and positioned with their opposite ends against the mold tracks 130 and 132 and the control track 340. The purpose of this control track 340 is to deflect the upper mold elements out of the normal path they would follow in being brought downwardly into position against the lower mold elements. That is this track, together with mechanism to be described and which is attached to the upper mold elements, causes the upper mold elements to move downwardly against the lower mold elements in a vertical direction, rather than being swept downwardly through an arcuate path.

*Continuation of the description of the mold operating mechanism and the drive mechanism*

The drive mechanism for the machine consists of an electric motor 344 connected to a main drive pulley 346 by means of a plurality of V belts 348. The pulley 346 is keyed to the outward end of a rotatable shaft 350 journaled in pillow blocks 352 secured to the rear flanges of the columns 62. The shaft 350 carries a pinion 354 meshed with a larger gear 356. This larger gear is keyed to the left end of a shaft 358 journaled in anti-friction bearings 360 and 361 provided in bearing boxes 362 and 363 formed as portions of the castings 112 and 114. Because of the greater radial load on the bearings at the end of the shaft carrying the gear 356, the bearing 361 and bearing box 363 are somewhat larger than the bearing 360 and box 362. (See Fig. 24.) In alignment with the mold chain drive sprocket 218, the shaft 358 carries a primary drive sprocket 364, these two sprockets being connected by the chain 220 previously mentioned, so that rotation of the shaft 358 will cause the lower mold elements to move rearwardly of the machine.

At its right end the shaft 358 is keyed to a similar sprocket 366 connected by a chain 368 with a confection feeding mechanism drive sprocket 370 at the forward end of the machine. Slightly inside the bearings 360 and 361 the shaft 358 carries a pair of worm gears 372. These worm gears are meshed with a pair of gears 374 keyed to the vertical spindles 190 and 202 upon which the forming chain sprockets 186 and 198 are mounted. The spindles 190 and 202 are carried at their ends in anti-friction bearings 375 secured in bearing boxes 377 formed at the upper and lower ends of the castings 112 and 114, the boxes in the ends of the castings being closed by caps 379. Thus, as the drive shaft 358 revolves, the forming chain sprockets 186 and 198 are rotated, thereby causing the adjacent faces of the two forming chains 180 and 182 to be moved rearwardly at the same speed and the gear ratio is such that this speed is the same as that at which the mold chains 138 and 148 are moved. This is done so that no relative motion will take place between the forming chains and the ends of the plungers 176 and 178 urged inwardly by these chains.

As may best be seen in Figs. 21 and 23, the forming chains 180 and 182 are of considerable width and may be considered as being formed of three ordinary bicycle type roller chains placed side by side with the links 376 connected together by pins 378 of sufficient length to pass through all three of the chains. The two outer sets of rollers comprising these chains roll over the inner faces of the cam plates 192, 194, 204 and 206, while the intermediate set of rollers impinges against the ends of the plungers 176 and 178 and urges these plungers inwardly as the chains 180 and 182 move rearwardly.

The mold elements

Each of the lower mold elements 139 is independently secured to individual links of the lower mold chain 138 by means of upward projections 380 formed integrally with every third link of the chain. These upward projections 380 extend into slots formed in the lower surface of the individual lower mold elements 139 and are secured therein by means of pins 382 which extend transversely of the mold elements through holes in the upper ends of the upwardly projecting members 380. The individual lower mold elements are of such a width that when the chain is stretched out horizontally in the position it assumes when upon the upper surface of the lower mold chain track, the edges of contiguous mold elements will be brought tightly together in abutting relationship. Each mold element has an upwardly projecting rib 384 at its center and from the top of this rib, the upper surface of the mold element curves away in both directions longitudinally of the machine to form a quarter cylindrical surface 385. Thus, when two of these elements are brought together in edge abutting relationship, the adjacent halves of the two mold elements will form a semi-cylindrical depression into which individual pieces of confection can be placed.

Each of the mold elements is provided with notches in its edges along the center line, so that when two of these elements are brought together, the two notches will form an opening 386 in the bottom of the mold through which the upper portion of the handle can project into the mold. This feature is best seen in Figs. 3, 10, 11 and 27. As the lower mold chain 138 passes upwardly and around the lower mold chain front sprocket 140, adjacent mold elements are separated because the radial distance from the molds to the center of the sprockets 140 is greater than the radial distance from the center of the sprockets to the mold chain 138. At this point in the cycle, the upper portion of the handles 170 are extended into the mold cavities between the individual mold elements, and are maintained in this position until the mold elements have moved upon the straight portion of the lower mold chain track at which point the contiguous edges of the adjacent mold elements are brought together, thus gripping the handle tightly. From this point onward, the handle is carried clamped between adjacent mold elements until it reaches the rearward lower mold chain sprockets 142. At this point, the passage of the mold chain around the sprockets separates the mold elements in the same manner that they were separated as they were brought around the forward sprockets, thereby releasing the handle and permitting the finished lollipop to be removed from the machine as has been described previously.

The upper mold elements 154 are similarly attached to the upper mold chain 148 by means of pins 388 which extend transversely of the upper mold elements through an opening at the upper end of a projection 390 formed integrally with every third link of the chain. Each of these upper mold elements provides a pair of quarter cylindrical surfaces 391 so that adjacent mold elements form the upper semi-cylindrical surface of a closed mold. Each of these upper mold elements has a pair of cylindrical mold end pieces 392 through which the plungers 176 and 178 are adapted to slide. As has been mentioned, these plungers carry dies 175 and 177 at their inner ends which form the individual lollipops when urged inwardly by the forming chains 180 and 182. To prevent rotation of the dies and plungers with respect to the mold, each of the dies is provided with a pin 394 which is secured to the rearward surface of the die in a position eccentric to the plunger and which is slidable in a generally complementary hole through the adjacent mold end piece 392.

The outward ends of the plungers 176 are of proper width to engage the center rollers only of the forming chains 180 and 182 and are of a length greater than the distance between the rollers, so that at least one roller of the chain will always be engaged by one of the plunger ends during the confection forming portion of the cycle.

In order to prevent the dies and plungers from moving inwardly before being pushed by the forming chains, the plungers are provided near their outward ends with spring retainers 396. These spring retainers confine the outward ends of coil springs 398, the inner ends of which press against the outer face of the mold end pieces 392. Since under some conditions it is conceivable that the confection piece may stick to the dies sufficiently to prevent their retraction by the springs 398, a pair of tapered cam plates 400, Fig. 24, are secured to the castings 112 and 114 in a position slightly to the rear of the forming chain cam plates 192, 194, 204 and 206. These cam plates 400 engage behind the spring retainers 396 and wedge the plungers outwardly in the event that they have not already been retracted by the springs 398.

Upon its upper surface, each of the upper mold elements is provided with an outwardly and rearwardly extending arm 402. At its end each of these arms is bifurcated and carries a roller 404 which rolls upon the upper mold control track 340 and causes the upper mold elements to be tilted toward the back of the machine as these mold elements are brought downwardly against the lower mold elements. This slight tilting of the upper mold elements causes these elements to approach the lower mold elements in a vertical direction, with the result that the cylindrical mold end pieces 392 on each of the upper mold elements are fitted into the semi-cylindrical depression formed by adjacent lower mold elements, and simultaneously downwardly projecting fingers 406 formed at the ends of the upper mold end pieces slide past the ends of the lower mold elements and behind pins 408 extending outwardly from the ends of the lower mold elements. By referring to Fig. 22, it will be seen that these fingers and pins cause the upper mold elements to move straight upwardly away from the lower mold elements for a considerable distance as the mold elements are being separated, since the fingers impinging against the pins prevent the upper mold elements from moving faster than the lower mold elements. In Fig. 22 this is apparent by the slight kink in the upper mold chain 148 at the point where the molds are separating. The molds are preferably separated in this manner, since otherwise each upper mold element would for an instant be traveling faster than the corresponding lower mold element at the point where it is swung upwardly toward the sprocket 152, with the result that the advancing edge of the upper mold element would dig into the rearward edge of the lollipop and form an unsightly indentation therein.

The forming chains and cam plates

The front sprockets 184 and 196 that carry the forming chains 180 and 182 are journaled by means of anti-friction bearings 410 upon the outer surfaces of quill shafts 188 and 200. These quill shafts, in turn, are rotatably mounted upon the forward vertical rods 336 about a center eccentric to their outer surfaces. Arms 412 are secured to the lower ends of the quill shafts and extend inwardly toward the center of the machine. At their inner ends these arms 412 are connected to one end each of a pair of coil springs 414 which extend rearwardly and are attached at their opposite ends to the rectangular bars 63. These springs tend to pull the inward ends of the arms 412 rearwardly and, as best shown in Figs. 20 and 21, cause the eccentric quill shafts 188 to rotate slightly and move the sprockets 184 and 196 toward the front end of the machine to take up the slack in the forming chains.

The front ends of the forming chain cam plates 192, 194, and 204 and 206 are spaced apart and from the horizontal bars 63 by means of tubular spacers 416 which surround the rearward rods 336 passed through the cam plates and are positioned between the upper and lower cam plates and beneath the lower cam plates. To give the cam plates added rigidity, three sets of longitudinally spaced bolts 418 extend through each set of cam plates and are provided at their lower ends with nuts 420, by means of which the cam plates are clamped tightly against the ends of tubular cam plate separators 422. This may best be seen in Fig. 23.

The rearward ends of the cam plates are supported by pins 424 that project horizontally inwardly between the cam plates and are secured at their outward ends in cylindrical openings 426 formed in the castings 112 and 114. This support enables the rearward ends of the cam plates to be freely moved inwardly and outwardly, but restrains them against movement in a vertical direction.

The mechanism for urging the cam plates inwardly

Just in front of the pins 424, each set of cam plates is connected to a vertically extending crosshead 428 passed therethrough. Between the plates, each of the crossheads 428 is provided with a threaded opening which receives the threaded shank of a cap screw 430. The shank of this cap screw extends outwardly through an opening 432 provided in a wing 434 formed integrally with each of the castings 112 and 114. The heads of these cap screws abut against the outward faces of the wings 434 and limit the maximum inward movement of the cam plates.

Ordinarily during operation of the machine, the inward movement of the cam plates, which is brought about by resilient means to be described presently, is limited by the confection pieces in the molds, the stops formed by the wings 434 and cap screws 430 being supplied merely to limit the movement of the cam plates when the molds are empty.

Above and below the left cam plates 204 and 206, the upper and lower ends of the left-hand crosshead 428 are bolted to the ends of upper and lower horizontally inwardly extending spring cylinders 436. The opposite ends of these spring cylinders are closed by plugs or cylinder heads 438 which serve as spring keepers and bear against one end each of a pair of coil springs 440 positioned within these cylinders. The opposite ends of these springs bear against pistons 442 threaded to the ends of relatively long bolts 444.

These bolts extend through openings in the cylinder heads 438 and through openings in the right-hand crosshead 428 so that their heads bear against the outer face of this crosshead. To prevent rotation of the pistons 442 relative to the cylinders 436, rods 446 extend from end to end of the cylinders and through openings in the pistons 442 in a position eccentric to the bolts 444. Thus, the pistons 442 are free to slide lengthwise of the cylinders, but are restrained against rotating therein. In the above described arrangement, the springs 440 press with their opposite ends against the cylinder heads 438 and the pistons 442 and tend to urge these members apart, thus tending to urge the crossheads and the cam tracks secured thereto toward each other. Adjustment of the compressive force upon the cam tracks is obtained by manually rotating the bolts 444 to increase or decrease the distance between the pistons 442 and the bolt heads.

The size of the springs 440 can best be determined by trial since the compressive force these springs must exert depends upon the consistency of the confection being molded and to some extent upon the shape the finished lollipop is to assume. In any event, the compressive force should be sufficient to completely compress the confection piece to remove all air voids therefrom and to give a sharp impression of the dies 175 and 177.

The confection feeding and preforming mechanism

The confection feeding mechanism, which is outrigged at the front end of the machine between the plates 250, is driven, as has been previously mentioned, by the chain 368 linked over the confection feeding mechanism drive sprocket 370. This sprocket is mounted on the right-hand end of a spindle 448 which extends transversely of the machine and is journaled upon anti-friction bearings 450 carried in bearing boxes 452 formed in the plates 250. At its center this spindle 448 is keyed to the lower forming roll 160. Above the spindle 448 a rod 454 is secured at its ends to the plates 250 and carries the upper forming roll 158 thereon on anti-friction bearings 456 arranged between the ends of appropriate spacing members. As may best be seen in Fig. 5, these rolls cooperate to form the plastic candy into a ribbon of chevron-shaped cross section. As shown in this figure, the lower roll carries a gear 458 which drives a similar gear 460 mounted upon the upper forming roll 158 so that the rolls always rotate together.

The candy is introduced between these forming rolls by upper and lower feed rolls 462 and 464, respectively. These latter rolls are journaled upon transverse rods 466 and 468 in the manner that the upper forming roll 158 is journaled upon the rod 454. In a similar manner, also, the two feed rolls carry mutually meshing gears 469, so that the two rolls revolve together. These feed rolls are driven by an intermediate gear 470 positioned between spacers and journaled upon a transverse rod 472, this latter gear being meshed with the lower of the gears 469 and with the gear 458 driven by the sprocket 378.

Just in front of the feed rolls 462 and 464, the machine is provided with a funnel-like structure 474 which aids the operator in guiding the confection to these rolls, while a trough 476 placed between the feed rolls and the preforming rolls serves to guide the plastic confection to these latter rolls. This trough is clamped to a pair of transverse rods 478 secured at their ends to the parallel plates 250, while the funnel 474 is secured to a table 479 supported from the bars 63 upon posts 481. Rearwardly of the preforming rolls, a track 480 serves to convey the chevron-shaped candy ribbon from the preforming rolls into the region where the upper mold elements are approaching the lower mold elements. To preserve the shape of the candy ribbon from the time it leaves the preforming rolls until it reaches the molds, the track 480 is provided with a longitudinally extending raised triangular ridge 482 along which the candy slides. This track 480 is secured near its forward end to a transverse rod 484 extending through the side plates 250.

Just above the transverse rod 484, the track 480 is provided with a pair of posts 486 which carry a scraper element 488 that extends forwardly and conforms closely to the shape of the upper forming roll 158, and serves to scrape the roll free of any candy that may adhere thereto. A similar scraper 490 extends forwardly from the end of the track 480 and serves to scrape the lower roll 160. Likewise, the trough 476 carries a pair of similar upper and lower scrapers 492 and 494 to clean the feed rolls 462 and 464.

At its rearward end the lower surface of the track 480 is tapered at an oblique angle at 496 so that the track will not interfere with the approaching upper and lower mold elements. Because the track 480 extends at its rearward end almost to the point where the mold elements come together and is at this point of a thickness only slightly less than the distance between the mold elements, this end of the track is restrained against upward or downward movements by the mold elements themselves. Consequently, the single point of support for the track at the pin 484 is sufficient to maintain the track in proper alignment.

In operation, the roughly formed plastic candy roll is guided into the funnel 474 by the operator. From the rearward end of the funnel the candy roll passes between the feeding rolls 462 and 464, along the track 476, and between the forming rolls 158 and 160. These rolls preform the candy into the chevron shape previously described, and pass this preformed candy ribbon out upon the track 480. The candy slides down the track 480 and between the approaching upper and lower mold elements. These mold elements squeeze the preformed candy ribbon into individual pieces, one of which remains in each of the closed molds where it is subsequently formed by the dies into a lollipop head in the manner previously described.

The handle forming mechanism

The handle forming mechanism, as has been mentioned previously, is driven by the lower mold chains 138 that pass over the sprockets 296. The gear 304, keyed to the same shaft as these sprockets, is meshed with an intermediate gear 500 mounted upon a spindle 502 directly above the spindle 298. This spindle 502 is journaled in anti-friction bearings confined within bearing boxes 504 formed in the plates 260. The intermediate gear 500 is in turn meshed with a third gear 506 keyed to the end of the previously mentioned spindle 280 which is spaced above and rearwardly of the spindle 502.

The sprockets 296 are of such a size that they revolve one-quarter revolution each time one of the lower mold elements 139 passes this point, while the above mentioned gear train is of such ratio that shaft 298 revolves at one-half the rate of spindle 502, and the upper spindle 280 revolves one-third as fast as the intermediate spindle 502.

The intermediate spindle 502 is provided near its central portion with a sprocket 508 which drives a chain 510. This chain 510 is linked over and drives two other sprockets 512 and 514. Of these two, sprocket 512 is secured by screws in face-to-face contact with a loop-forming disc 516 mounted upon a spindle 518 positioned below and rearwardly of the spindle 280. The ends of this spindle project into bearing cups 520 threaded into the plates 260. Adjustment screws 522 are threaded through the end walls of these cups and serve to adjust the end play of the spindle 518 and to properly locate the disc 516 laterally relative to other elements cooperating therewith. The second sprocket, 514, is secured in face-to-face contact with a cord-feeding wheel 524 journaled by anti-friction bearings 525 upon a rod 526 secured at its ends to the plates 260. This wheel 524 is located rearwardly of and below the loop-forming disc 516.

An idler roller 528 is mounted on anti-friction bearings 530 upon the rod 256 in a position below the slack portion of the chain 510 to prevent the chain from interfering with other machine elements in its vicinity. A similar idler roller 532 is rotatably carried upon a rod 534 secured between the ends of a pair of parallel arms 536. These arms are pivoted about their mid-points upon the rod 526, while their opposite ends are connected by a spacer 538.

The roller 532 rests upon the upper side of the slack portion of the chain 510 and is urged downwardly by a coil spring 542 to take up this slack. One end of this spring is hooked around the spacer 538 while its opposite end is connected to a pin 544 driven into a block 546, which is positioned between the stringers 98 and 100 and is secured in place by the rod 264 which passes through a hole in this block.

The relative sizes of the sprockets 508, 512 and 514 are such that the driving sprocket 508 revolves at the same rate as the cord-feeding sprocket 514 and twice as fast as sprocket 512 which drives the loop-forming disc 516.

The cord 163 from which the handles are made is wound upon the reel 164 mounted to rotate upon a spindle 166 at the right side of the machine. In installing such a reel in position, an end cover plate 550 is rotated slightly by hand relative to the spindle 166 to unlock a bayonet type coupling 552 used to secure the front plate to an arbor, not shown, upon which the reel is slid. The reel of cord is then slid over the arbor and against a backing plate 554 which is resiliently urged outwardly by a coil spring 556. Sufficient force is then brought to bear against the reel in an endwise direction to compress the spring 556 sufficiently to permit the front cover plate to be attached to the arbor by the bayonet coupler. The spring 556 then clamps the reel tightly between the two plates where it is securely held until the cord thereon has been made into handles, at which time a new reel of cord must be installed in its place.

A length of the cord is then pulled from the reel and the end inserted through an eye 568 formed at the upper end of a rod 570, the lower end of which is secured to a bar 572 extending outwardly from and attached to the frame member 70. From the eye 568, the end of the cord is carried inwardly by hand beneath the bed of the machine and inserted into the flaring mouth 574 of a cord guiding tube 575 that guides the cord to the cord feeding wheel 524.

Figure 7:
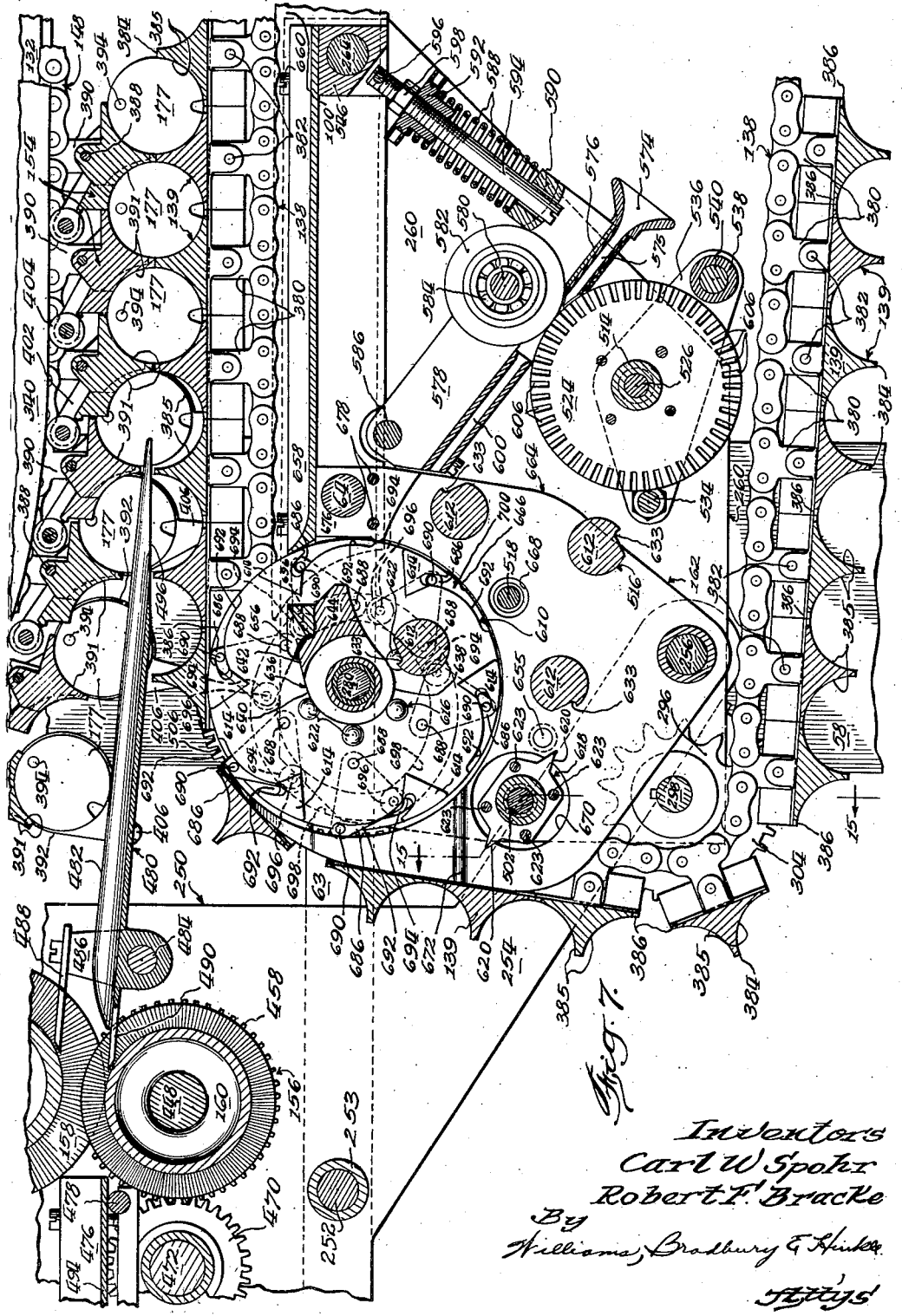
Figure 7 is a vertical sectional view taken in a plane parallel to that of Fig. 6 but spaced inwardly toward the center of the machine, and may be considered as taken substantially along the line 7—7 of Fig. 2.

As best shown in Figs. 7, 18 and 19, this guide member 574 is secured to a block 576 which in turn is attached to a pair of obliquely downwardly and rearwardly extending arms 578. These arms also carry a short cross shaft 580 upon which a roller 582 is journaled in a position just ahead of the forward end of the guide tube 575 by means of anti-friction bearings 584.

The upper forward ends of the arms 578 are pivoted to a rod 586 extending transversely of the machine and anchored at its ends to the plates 260. In the normally downwardly inclined position of the arms 578, the roller 582 rests against the cord-feeding wheel 524 so as to press the cord being fed tightly into engagement with this wheel. These arms are urged into this downward position by means of a coil spring 588. The lower end of this spring bears against a lower spring keeper 590 while the upper end is confined by an upper spring keeper 592. This upper spring keeper 592 is threaded upon a rod 594 pivoted upon a pin 596 which extends transversely across a slot formed in the block 546. The lower spring keeper 590 slides freely upon the rod 594 and has its lower end shaped to a convex spherical configuration. This spherical surface rests in a complementary concave spherical surface formed at the ends of the arms 578 so that as this spring keeper is urged downwardly, it will press against the ends of these arms, thus pressing the roller 582 against the wheel 524.

Adjustment of the spring pressure is obtained by revolving the upper spring keeper 592 upon the threaded shaft until the desired compression is obtained. This upper keeper is then secured in its adjusted position by means of a lock nut 598 threaded upon the rod 594.

The ball and socket connection between the spring keeper 590 and the lower ends of the arms 578 provided by the spherical surfaces at the point of mutual engagement of these elements, provides a means for quickly separating the roller 582 from the wheel 524 if this should become necessary. This is accomplished by pushing the keeper 590 upwardly until its lower surface is above the upper surface of the socket in the ends of the arms 578. The rod 594 is then pivoted rearwardly to clear the ends of the arms 578. These arms and the roller 582 carried thereby may then be easily pivoted upwardly about the rod 586.

A second cord-guiding tube 600 is secured to the arms 578 in axial alignment with the guide tube 575 in a position ahead of the wheel 524. This tube serves to guide the cord from the cord-feeding wheel to the cord looping mechanism to be described presently.

Both the wheel 524 and the roller 582 are provided with peripheral grooves 602 and 604. These grooves are approximately semi-circular in cross section so that the two grooves form a circular section at the plane through the center line of the wheel and roller that is of somewhat smaller diameter than that of the cord and thus the cord will be tightly gripped and thus positively fed. To aid in the engagement of the cord by the wheel 524, the edge of this wheel is provided with saw cuts 606 along radial lines which extend inwardly in staggered relationship from opposite edges of the wheel periphery. This formation of the wheel periphery is best shown in Fig. 17 and from this figure it will be seen that these cuts provide a plurality of equally spaced ridges 608 to engage the cord while at the same time providing maximum support for these ridges. The arrangement of the saw cuts also permits free passage away from the wheel periphery of any coating or sizing removed from the cord, and thus aids in preventing the wheel from becoming clogged.

The essential parts of the loop forming mechanism comprise a looping disc 516 mounted upon the spindle 518 and a loop retaining disc 610 carried by the spindle 280. The looping disc 516 is provided with four equally circumferentially spaced knobs 612 which project outwardly from its left-hand face a distance substantially equal to the thickness of the cord 163 from which the handles 170 are formed. The relative lateral spacing between the left-hand face of the disc 516 and the exit end of the guide tube 600 are such that the cord moves from this tube along this face of the looping disc. Thus, as the disc revolves, the cord is fed in along its face where the cylindrical surfaces of the knobs are brought against the cord and tend to push the cord upwardly and inwardly.

The loop retaining disc 610 secured to the shaft 280 revolves in a plane parallel to the plane of the disc 516 and is spaced laterally relative thereto so that the right-hand face of the disc 610 just clears the outer faces of the knobs 612. This loop retaining disc also carries a plurality of equally circumferentially spaced outwardly projecting knobs 614 which are of approximately the same height as the knobs 612 and thus their outer faces almost touch the left-hand face of the disc 516. There are, however, six of the knobs 614 and these knobs are generally triangular in shape with the apexes of the triangles toward the center of the disc 610. Since the disc 610 makes two revolutions while the disc 516 is making three revolutions, and since the disc 610 carries six knobs while the disc 516 is provided with four, the ratio of movement of these knobs is such that as the discs revolve, one of the knobs 612 will move inwardly between two of the knobs 614.

Figure 9:
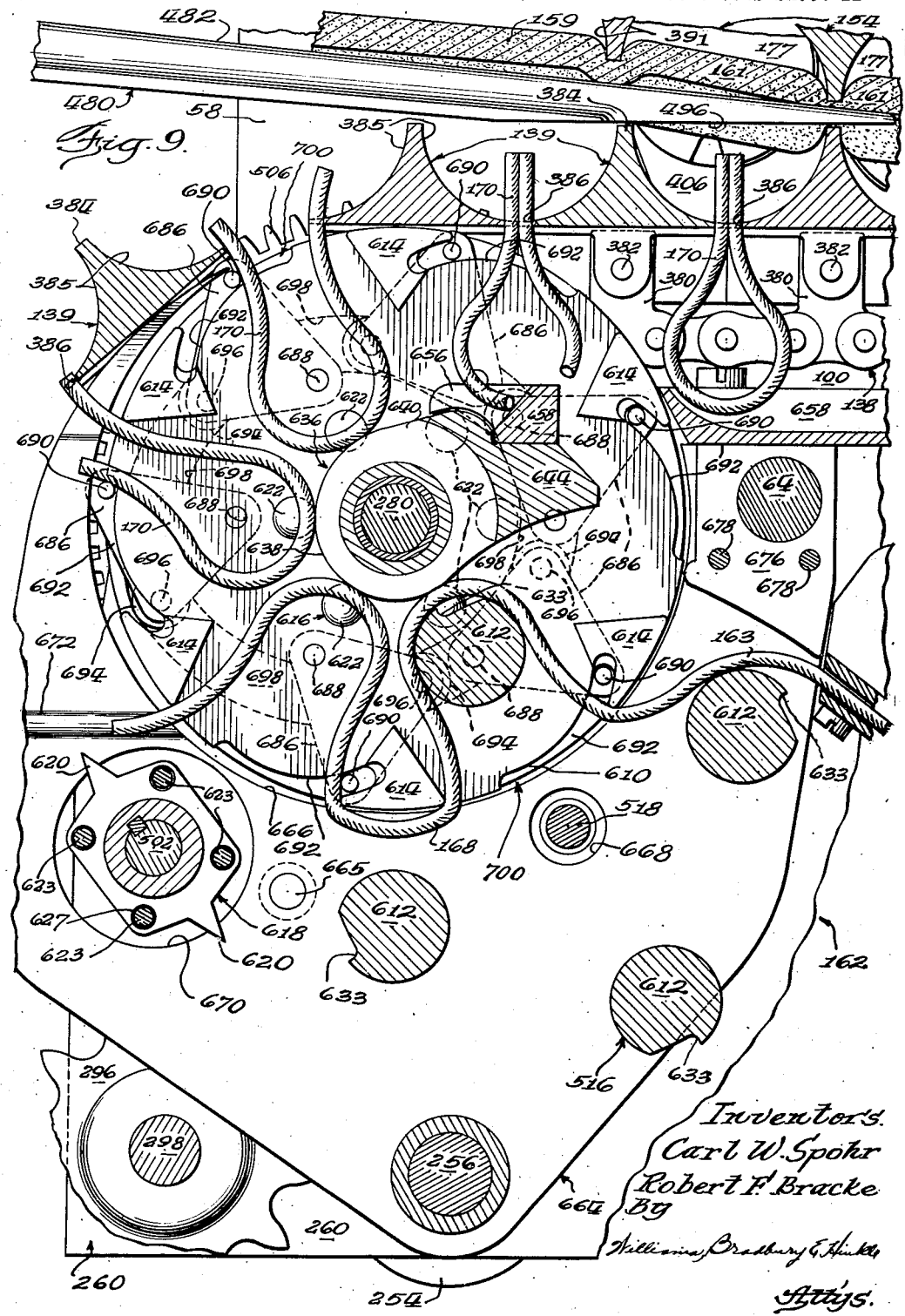
Figure 9 is a fractional longitudinal sectional view taken in the direction of the arrows along the line 9—9 of Fig. 8 and shows details of the handle forming mechanism.

Although the disc carrying the knobs 612 revolves more rapidly than the disc carrying the knobs 614, the spacing of the knobs 612 from their axis of rotation about the spindle 518 is considerably less than the similar spacing between the knobs 614 and their axis of rotation about the spindle 280. Thus, the linear speed of travel of the knobs 614 and 612 is approximately the same. The knob 612, having moved inwardly between two of the knobs 614, approaches the spindle 280 until it reaches its closest point, which is the position it assumes when it intersects the plane passing through the spindles 280 and 518. After passing this point, the knob 612 recedes from the spindle 280 and passes outwardly between the same two knobs 614 it passed in moving inwardly. It will be seen, therefore, that the cord fed in between the discs will pass over the top of a knob 612 and be carried inwardly by this knob until the knob reaches its point of maximum approach toward the spindle 280. At this point the loop formed in the cord by the knob 612 is caught behind a retaining means 616 so that it cannot move outwardly as the knob 612 recedes from the spindle 280. The next successive knob 612 will similarly impinge against the cord and carry a loop of this cord around the outer surface of the next successive knob 614. This second loop is similarly carried inwardly by the knob 612 and locked behind the next successive retaining means 616. Thus, as the two discs revolve, they continuously form the cord into a sinuous configuration which is best illustrated in Figure 9.

It will be appreciated that the relative positions of the discs 610 and 516 on the spindles 280 and 518 is somewhat critical as it is necessary for the knobs 612 to pass inwardly and outwardly between the triangular knobs 614 without touching them. To facilitate the relative adjustment of these parts, see Figure 11, the disc 516 is secured to its sprocket 512 by a plurality of screws 617 that pass through arcuate slots 619 in the sprocket. By loosening these screws, the disc 516 can be rotated relative to the sprocket to effect adjustment of this disc relative to the disc 610. An opening 621 is provided in the right-hand plate 260 through which a screw-driver may be extended to loosen or tighten the screws 617.

As the disc 610 revolves to a further position, the triangular knobs 614 will intersect the plane passing between the spindles 280 and 502. The spindle 502 carries a rotating double-ended knife element 618 secured to the sprocket 508 by four screws 623 passed through holes in the knife. This knife revolves at the times the speed of the disc 610 and is so positioned on the shaft 502 that as the centers of each of the knobs 614 intersect the plane between the spindles 280 and 502, the knife will have been revolved into such a position that one of its cutting edges 620 will most closely approach the outer edge of the knob. In this position the cutting edge just touches the knob 614. Since the knife element 618 is double-ended and since the spindle 502 revolves at a speed three times that of the spindle 280, it will be apparent that either one or the other of the cutting edges 620 will approach and finally just touch each of the knobs 614. It will be seen also that since the cord is looped around the knob 614, this cord will be severed by one of the cutting edges 620 so that, as shown in Fig. 9, the disc 610 from this point onward will carry a plurality of separate loops of cord. These loops are arranged with the bight held in the retaining means 616 at the central portion of the disc with the free ends of the loop projecting outwardly between the knobs 614.

The retaining means 616 for the loops comprises six equally circumferentially spaced steel balls 622. These balls fit within cylindrical recess 624 that extend through the disc 610 and into a collar 626 secured to the rear face of the disc at its central portion. Within each of these recesses 624 a coil spring 628 bearing against the bottom of the recess urges the ball 622 outwardly.

The balls are prevented from being expelled from the recesses 624 by an overhanging flange 630 of a collar 632. This overhanging flange 630 is spaced axially away from the face of the disc 610 a distance approximately equal to the thickness of the cord so that as the cord is pushed under this flange by one of the knobs 612, one of the balls 622 will be forced into its recess. After the cord has passed over the face of the ball 622, the ball will again move outwardly under the influence of the spring 628 and will wedge the cord outwardly against the flange 630.

Since the receding knob 612 if truly cylindrical might hold the ball 622 down long enough to permit the loop to slip outwardly over the face of the ball, the knobs are provided with cut away portions 633 on their receding sides to permit the balls to snap outwardly while the cord bight is maintained in its innermost position. The right-hand end of the collar 632 bears against the inner face of the block 282 and is thus prevented from moving to the right, while the left-hand portion of this collar is provided with a relatively deep recess 634 into which is fitted a complementarily formed end of a loop expelling member 636. This loop expelling member 636 is fitted to and journals the shaft 280 and is provided at its left-hand end with an outwardly extending flange 638. The major portion of this flange is concentric with the shaft 280 and is of such a diameter that its outer edge is approximately tangential to the inner edges of the recesses 624. A portion of this flange is of a somewhat greater diameter and acts as a cam face 640 to free the handles by pushing the handle loops outwardly across the tops of the balls 622 when the loop has reached such a point that its ends have been inserted between a pair of the lower mold elements and thus must be released from the loop forming mechanism. This camming portion 640 of the flange 638 is located nearest the top of the machine at the point where the lower mold elements are brought around the sprockets 140 and on to the stringers 98 and 100.

At the point where the camming portion 640 forces the cord outwardly over the face of the ball 622, the fitting 636 is provided with an outwardly projecting scraper-like element 642 which projects across the face of the flange 630 of the collar 632 and acts to insure the bight of the cord being separated from the loop forming mechanism. This fitting 636 is supported by a rearwardly extending portion 644 which is attached by means of a screw 646 to the under surface of a longitudinally extending rail 648 secured in turn by a screw 650 to the top surface of the block 546 and by a similar screw 652 to the upper face of a block 654 through which the rod 64 extends.

With the above arrangement, it will be seen that the sinuously shaped cord after having been severed into separate loops by the rotating knife element 618, will present a plurality of separate handle portions retained at approximately their midlength by the balls 622. As the disc 610 carries these loops around toward the top of the machine, the free ends of the loops will be inserted between adjacent lower mold elements and the bights of the loops will be pushed outwardly across the tops of the balls and released from the loop forming mechanism by the camming surface 640 formed as a portion of the fitting 636.

As these completed handles are carried rearwardly of the machine by the lower mold elements 139, the bights of the loop are deflected to the right by a stationary camming portion 656 formed at the forward end of a second rail 658 which extends rearwardly parallel to the beforementioned rail 648. This second rail 658 is similarly secured to the block 546 by a screw 660 and to another block 662 through which the rod 64 passes. The purpose of this camming surface 656 is merely to push the handle to the right sufficiently to clear the outer ends of the triangular knobs 614 attached to the rotating disc 610. This arrangement is best seen in Fig. 13 and it will appear from this figure that after the handle has been carried rearwardly beyond the range of the knobs 614, the camming portion 656 ends and permits the handle to snap back to the left into a perpendicular position. From this point each of the handles is carried rearwardly by the lower mold elements into the zone where the lollipop heads are formed.

In Fig. 12, it will be seen that the two rails 648 and 658 extend rearwardly a considerable distance beyond the rearward end of the camming portion 656. Although these rails are of considerable length and might, therefore, be assumed to be intended to provide a guide for the handles, it has been found that no such guide is necessary, the length of these rails being chosen merely to enable the rails easily to be supported at two different points. That is, the rails are supported by the rods 64 and 264, the spacing of which is determined by other elements supported by these rods As the cord passes inwardly to the loop forming mechanism, it is necessary to confine the portion of the rope not yet carried inwardly of the disc 610 and hooked over the balls 622 against lateral movement. That is, the portion of the rope impinged by the knob 612 should be prevented from moving to the left as otherwise it might slip over the ends of these knobs and thus not be pushed inwardly to be formed into a sinuous configuration. For a similar reason, the portion of the loop bent around the outer faces of the knobs 614 must be similarly confined against lateral movement to insure this portion of the cord being cut by the knife blade 620. These functions are accomplished by a plate 664 supported so that its right-hand face is in approximately the same plane as the right-hand face of the disc 610. The plate has an upwardly extending portion secured to the rod 64 and a lower extension similarly secured to the rod 256. In order to prevent the plate from vibrating, a pin 665 is riveted to the plate and bears with its opposite end against the side plate 260. The plate 664, which is best shown in Fig. 9, has a cylindrical cut-out portion 666 closely conforming to the shape of the disc 610 and has openings 668 and 670 therethrough for the free passage of the shafts 518 and 502.

Just beyond the point where the cord loops are cut by the knife edges 620, the plate is bent to the left a slight amount at 672 to permit the free ends of the loops to spring apart as otherwise the ends of the loops might be trailed along, because of their frictional engagement with the face of the plate.

For a similar purpose, that is, to prevent lateral movement of the cord, a second plate 674 is secured to the rod 64. This second plate lies in a plane parallel to that of the plate 664 and is spaced from the plate 664 to the right a distance approximately equal to the thickness of the cord being formed into handles so that the cord will enter the loop forming mechanism in the space between these two plates. Since the second plate is spaced to the right from the plate 664 a distance slightly greater than the thickness of the cord, this second plate will be in the plane of the looping disc 516 and thus has a reentrant cylindrical surface closely conforming to but not quite touching the disc 512. These two plates 664 and 674 are spaced apart by a third plate 676 through which the rod 64 extends and which is slightly thicker than the thickness of the cord so as properly to space the plates 664 and 674. In order to prevent movement of the plates 676 and 674 around their single point of support at the rod 64, these two plates are secured to the third plate 664 by a pair of screws 678 passed therethrough. This structure is best shown in Fig. 9, which shows the plate 664 and the spacing plate 676, and in Fig. 6, which, because of the different position of the section line, better shows the plate 674.

An additional plate 680 is positioned in the same plane as plate 674 in the region where the cord loops are cut and extends from this point upwardly just out of contact with the triangular knobs 614. This upward extension of the plate 680, together with the similar portion of plate 664 serves to prevent lateral movement of the cord ends while they are being inserted between the lower mold elements 139. The plate 680 is secured to the inner face of the forward end of the rail 648 with a reinforcing plate 682 therebetween by means of screws 684, see Figures 6 and 11.

The ends of the cord, after being cut by the mechanism described above, have a tendency to spring apart to such an extent that the space between the free ends is greater than the distance between adjacent mold elements 139. For this reason mechanism is necessary to bring these free ends together at the point in the cycle where they are inserted between the lower mold elements so as to insure their not impinging against the mold elements and thus becoming tangled. The mechanism which accomplishes this can best be seen in Figs. 8, 9, 10, 11, 13 and 14 and comprises six triangular metal plates 686 pivoted at one corner each at the left-hand side of the disc 610 about pins 688 that extend into and are affixed to this disc. Each of these pins 688 is positioned near the center of the disc upon a radial line extending inwardly of the disc from a point approximately midway between each of the triangular knobs 614. Another corner of each of the triangular plates 686 carries a pin 690 extending across the plane of the disc and projecting beyond its righthand face a distance approximately equal to the thickness of the cord from which the handles are formed. The disc 610 is provided with six arcuate slots 692 extending inwardly from its periphery to permit free movement of these pins from retracted positions within the knobs 614 to extended positions which quite closely approach the next adjacent knobs 614 in the direction of rotation of the disc.

Thus, as any one of these triangular plates is pivoted from its retracted position to its extended position, its pin 690 will swing from a position against one of the knobs 614 to a position closer to the next adjacent knob 614. This movement of the pin 690 carries along with it the receding free end of the cord loop and thus brings the two ends of the cord together and insures that these ends will be inserted between adjacent mold elements 139.

The movement of the plates 686 from their retracted to their extended positions at the proper point in the cycle of the disc 610 is accomplished by a cam roller 694 journaled upon a pin 696 secured to the third corner of each of these plates. These rollers follow an endless cam groove 698 formed in the face of a stationary cam plate 700. The cam plate 700 is positioned between the disc 610 and the block 284 and is secured to the latter by means of countersunk screws not shown.

The cam groove, the profile of which is shown in dotted lines in Figs. 7 and 9, is so shaped that any particular pin 690 is in its retracted position during the portion of the cycle in which the particular knob against which the pin is retracted is moving from its uppermost position to its lowermost position. Shortly thereafter and at approximately the point in the cycle where the cord is cut by the knife 618, the cam track forces the roller outwardly, thus moving the pin 690 toward its extended position so that soon after the cord is cut, the trailing end of the loop will be brought against the advancing end and be maintained in this position until the ends have been inserted between adjacent mold elements.

Shortly thereafter, the cam track recedes toward the center of rotation and permits the pin 690 to recede toward its retracted position in preparation for another cycle. The position of the parts at the moment the cord is being cut by the knife 618 is illustrated in Fig. 14, while in Fig. 9 the positions of the parts are shown in the relationship they assume at other points in the cycle.

Operation

Before starting the machine, all of the subassemblies should be properly adjusted in the manner described in detail in connection with the description of these units. A reel of cord to be made into handles is placed upon its arbor and the cover plate 550 locked in place by means of the bayonet coupling 552. One end of a roll 157 of plastic confection is drawn out to a diameter slightly greater than that between the confection feeding rolls 462 and 464. The machine motor 344 is then started, the end of the roll of candy is inserted into the funnel 474 while the end of the cord 163 is led through the eye 568 and into the flared opening 574 leading to the handle forming mechanism.

The roll of plastic confection is shaped to a predetermined diameter by the feed rolls and passed along the trough 476 to the preforming rolls 158 and 160. These rolls shape the confection into a chevron-shaped ribbon 159 and pass this ribbon out upon the track 480. The ribbon passes along this track into a position between the approaching upper and lower mold elements 154 and 139, respectively, where it is squeezed into individual pieces 161 by the approaching mold elements so that each of these separate pieces remains in one of successive molds formed by the upper and lower mold elements as they come together. Slightly before the confection has reached this point, the cord 163 will have been fed by the rotating cord feeding wheel 524 to the handle forming mechanism where the knobs 612 form the cord into a sinuous configuration around the knobs 614 and the loop retaining balls 622. These loops 168 are then cut into separate lengths 170 by the rotating knife 618, the severed ends brought together, and these free ends inserted between adjacent lower mold elements 139 as these lower mold elements pass upwardly around the sprockets 140 and on to the track formed by the stringers 98 and 100. As the lower mold elements pass upon the stringers 98 and 100, they come together and grip the handle 170 formed of the loop of cord and simultaneously the bight of this loop is detached from behind the retaining ball 622 so that the handles are free to move with the lower mold elements toward the rear end of the machine.

As the molds carrying the handles 170 and the individual pieces of plastic confection 161 move toward the rearward end of the machine, the dies 175 and 177 are urged inwardly by the forming chains 180 and 182 which in turn are backed up by the cam plates 192, 194, 204 and 206, these cam plates being resiliently urged inwardly by the springs 440. After the lollipop heads 207 have been formed, the dies are retracted and the upper mold elements separated from the lower mold elements as the upper mold chains 148 pass upwardly around the sprockets 152 and return toward the front of the machine.

The lower mold elements carrying the lollipops move rearwardly and pass into the cooling tunnel 208. Cool air is circulated through this tunnel by any appropriate means so that the lollipops are cooled sufficiently to prevent their sticking together or becoming misshapen when taken from the machine. Soon after leaving the rearward end of the tunnel 208, the lower mold chains 138 pass over the rearward sprockets 142 and return toward the front of the machine. As these mold elements move around the sprockets 142, the lollipops are ejected by mechanism described in detail elsewhere and fall from the machine upon a conveyor belt not shown, or upon or into any other suitable means adapted to remove the lollipops from the vicinity of the machine.

When a roll of plastic material to be formed into lollipops has become exhausted, another roll is drawn down to proper size and the end inserted into the funnel 474 immediately after the disappearing end of the previous roll. Likewise as a reel of cord 164 approaches exhaustion, the few remaining feet left upon the reel are pulled therefrom and a second reel substituted in its place. The end of the cord on this second reel is led through the eye 568 and pushed into the flared opening 574 immediately after the trailing end of the previous reel. Thus, the changing of a reel of handle material or the changing of a roll of plastic candy material may be accomplished without stopping the machine and without spoiling more than one or two lollipops at the most. If desired, two identical reels of cord can be mounted upon the machine, so that the machine is alternatively supplied from one or the other of these reels. The use of two such reels expedites changing from a consumed reel to a new reel, but is not necessary for the carrying out of the machine function.

A flow sheet showing the movement of the handle material 163 and the movement of the plastic material 157 and the formation of these two materials into individual lollipops 207 is shown in Fig. 37. In Figs. 30 to 35, transverse sectional views through the machine at various points show the formation of a lollipop.

Of these sectional views, Fig. 30 is taken through the centers of the feed rolls and shows these rolls embracing the cylinder of plastic material. Fig. 31, taken through the centers of the pre-forming rolls, shows the formation of the cylindrical plastic roll shown in Fig. 30 into the chevron shaped ribbon 159 that passes out upon the track 480. A section through the chevron shaped material and the track 480 at a point slightly beyond the pre-forming rolls is shown in Fig. 32. In Fig. 33 the chevron shaped ribbon 159 of plastic material is shown being squeezed into individual pieces 161 by the approaching lower mold elements 139 and upper mold elements 154. The dies 175 and 177 are shown approaching each other and squeezing the chevron shaped candy piece into lollipop form around the handle 170 in Fig. 34. Fig. 35 shows these dies at their maximum inward position with the completely formed lollipop therebetween, while the completed lollipop is shown in perspective in Fig. 36.

An alternative embodiment of the invention

An alternative embodiment of our invention comprises the machine shown in Figs. 38 to 65. This machine is, in general, similar to the one previously described and excepting for the forward portion may be considered as identical thereto. In the present machine, however, the mold elements are adapted to form a generally spherically shaped lollipop of the type shown in Fig. 64, rather than one of disc shape, as illustrated in Fig. 36. As will appear more fully later, the formation of spherical or ball-shaped lollipops in a machine of the general type comprising our invention makes it advisable to pre-form the roll of candy fed into the machine and then cut this pre-formed roll into individual pieces, one each of these individual pieces being placed in individual lollipop molds.

Thus, the principal difference between the two machines is that, first, the molds differ in shape in order that they may form differently shaped lollipops. Second, in the first machine the mutually approaching mold elements squeeze off individual pieces of candy, while in the second machine the roll of candy is separated into individual pieces before these pieces reach the vicinity of the mutually approaching mold elements. In addition, the mechanical expedients used in the two embodiments of our invention differ in some particulars in the portion of the machine wherein the continuous length of handle-forming material is shaped to form individual handles. The changes in this portion of the machine are intended to give somewhat greater adjustability to the mechanism forming this subassembly. In addition, the handle forming subassembly has been designed to make a more extensive use of gear trains in place of the sprockets and roller chains found in the embodiment described earlier.

Referring to Fig. 38, which illustrates the forward portion of the machine forming the present embodiment of our invention, it being understood that the rearward portion is a duplication of that described in the first embodiment excepting for the mold elements which, of course, are the same as those shown at the forward portion of the machine, it will be seen that the machine is generally similar to that shown in Fig. 1.

In the machine shown in Fig. 38, frame elements 710, 712 and 714 may be considered as being the same as the base 54, vertical columns 58, and rectangular bars 63, as shown respectively in Fig. 1. This frame supports a pair of rotatable upper mold chain forward sprockets 716. A pair of upper mold conveyor chains 718 pass around these sprockets with the upper loops of the chains resting upon tracks 720, while the lower loops are urged downwardly by a pair of lower tracks 722 to bring the upper mold elements against the lower mold elements and maintain them in this position during the lollipop head-forming operation. Plungers 124 carried by the upper mold elements 726 are urged inwardly by a pair of forming chains 728 passed around forward sprockets 730 and rearward sprockets, not shown and over the faces of cam plates 731. The above elements will not be described in greater detail inasmuch as these elements may be considered as identical with the similar elements in the previously described embodiment.

Referring to Figs. 47 and 48, it will be seen that the upper mold elements 726 of the machine forming the present embodiment are, in general, similar to the upper mold elements 154 of the previously described machine. Each of these upper mold elements comprises a casting 732 carried by the upper mold chains 718 in the same manner that previously described upper mold elements 154 are carried upon the upper mold chain 148. These castings 732 mount a pair of reciprocable plungers 734, the adjacent ends of which are formed to provide spherical depressions 736 therein for the purpose of shaping the lollipop head. These plungers are hollow and house coil springs 738. The inner end of each of these springs bears against a shoulder 740 of a cylindrical spring follower 742 and urges the spring follower against a pin 744 extending radially inwardly from the casting 736 through a slot 746 in the side wall of the plunger.

The opposite or outwardly positioned end of the spring 738 bears against the inner face of a plug 748 which extends into an opening in the outward end of the plunger and is secured therein by a pin 750 extending transversely through the plunger and plug 748. Thus, the tendency of the spring to expand urges the plunger outwardly inasmuch as the pin 744 is immovable relative to the casting 736.

The outward face of the plug 748 is formed to provide a forming chain following face 752 against which the forming chain 728 bears to carry out its function of urging the plunger inwardly during a lollipop forming operation. The pin 750 passes through the plunger 734 in a vertical direction and extends somewhat above the upper face of this plunger to provide a stub shaft which journals a small roller 754. A pin 756 extending transversely through the upper end of this shaft in a position above the roller 754 prevents the roller from slipping off the end of the shaft. This roller engages the face of a wedge-shaped cam for the purpose of urging the plungers outwardly at the end of the lollipop forming cycle if the springs 738 should not be sufficiently strong to accomplish this. The wedge-shaped cam referred to is not shown, but is identical to the cam 400 of the previously described machine. It will be seen, therefore, that these rollers 754 serve exactly the same purpose as the shoulders at the inner faces of the washers 396 of the previously described device.

The upper mold elements, like those of the previously described embodiment, carry a cam following roller 758 offset from the axis of each of the molds on arms 760. These rollers 758 follow a control track 761 at the point in the cycle where the upper mold elements are approaching the lower mold elements and cause the upper mold elements to move downwardly without tilting in the same manner that the similar rollers 404 follow the control track 340 for a similar purpose.

Similarly, also, the upper mold elements carry a pair of downwardly extending pins 762 at their ends which slide downwardly behind a pair of similar pins 764 that extend horizontally beyond the ends of the lower mold elements 766. These mutually engaging pins insure that the upper mold element will separate from the lower mold element in a vertical direction, rather than being swung upwardly through an arc. This expedient thus serves the same purpose as the pins 408 and fingers 406 employed in the other embodiment of our invention.

These molds form lollipop heads in the same manner as the alternative molds previously described, excepting that the generally spherical mold cavity makes necessary the use of a comparatively thick rib 768 between the quarter cylindrical molding surfaces formed in each of the mold elements, as will be more fully explained later. This may perhaps best be seen by comparing the thickness of this rib 768, as shown in Fig. 48, with the rib 384 shown in Fig. 9, for instance. Since the relatively thick rib 768 does not operate efficiently as a knife to divide the plastic material into individual pieces, this severing operation is separately conducted by mechanism provided for that purpose.

Because the present machine is intended to be used with molds of differing shapes and sizes, the spacing between adjacent mold cavities is dictated by the size of the largest diameter lollipop it is intended to make. For instance, the disc-shaped lollipop shown in Fig. 36 is of considerably greater diameter than the ball-shaped lollipop shown in Fig. 64, even though the quantity of candy in these two lollipops is approximately the same. Thus, the present machine, since it is adapted to make lollipops of the type shown in Fig. 36 when used with a set of molds designed for that purpose, has a spacing between mold elements great enough to accommodate disc-shaped lollipop molds. Therefore, when this same machine is used with ball-shaped lollipop molds as shown, the cavities of which are of less diameter, the result is that the ribs 768 must be relatively thick. It is for this reason, that is, that differently shaped molds intended for use with the same machine will have central ribs of differing thickness, that the present machine, being intended for what may be termed universal operation, is equipped with separate means for dividing the plastic roll into individual pieces which serve as mold charges.

A lower set of mold chains 770 are passed over rear mold chain sprockets, not shown, but identical with those of the first described embodiment, and forward lower mold chain sprockets. As in the other embodiment, there are two sets of lower mold chain forward sprockets. These consist of an upper set 772 from which the mold chain moves rearwardly in a horizontal plane upon lower mold chain tracks 774, and a lower set 776 mounted upon a spindle 777 which, like those in the previously described embodiment, serve to drive the handle forming and feeding mechanism.

The lower mold elements 766 secured to the chains 770 may be considered as identical with the lower mold elements already described, excepting that the quarter cylindrical concave mold surfaces, indicated at 778, are of less radius of curvature and the central rib 768 between these surfaces is thicker than the similar elements of the other machine. These differences occur because of the differences in the form of the lollipop heads the two machines are adapted to make, and are fully explained in connection with the description of the upper mold elements 726.

The feeding mechanism

The plastic feeding mechanism indicated generally at 780 is positioned between a pair of parallel plates 782 secured in vertical position to the outward ends of the rectangular bars 714 by transversely extending rods 784. The lower portions of these plates extend below the bars 714 and aid in the attachment of the upper end of an obliquely downwardly and rearwardly extending channel iron brace member 786, the lower end of which is anchored to the machine base by suitable brackets 788. This brace member aids in the support of the confection feeding and preforming mechanisms and insures these subassemblies being maintained rigidly in alignment.

A pair of aligned bearing boxes 790, secured to the vertical plates 782, contain anti-friction bearings not shown, which journal a transverse shaft 792. At its right-hand end this shaft carries a sprocket 794 which, in turn, is driven through the medium of a roller chain 796 by a sprocket, not shown, but which may be considered as identical with the sprocket 366 of the previously described embodiment. Near its midpoint, the shaft 792 is provided with a plastic candy feeding roll 798 which cooperates with a similar roll 800 mounted directly thereabove to form the mass of plastic candy into a cylindrical form and feed this cylindrical roll to the candy preforming mechanism.

The upper roll 800 is journaled near the midpoint of a shaft 802 carried upon a pair of parallel generally horizontally extending arms 804. Near their rearward ends these arms are pivoted to a rod 806 that extends transversely between the plates 782. Thus, the roller 800 may be raised and lowered somewhat with respect to the roller 798, thus determining the quantity of plastic material fed between the rolls during any particular time interval. A gear 808, secured to the lower roll 798, is meshed with a similar gear 810 carried by the upper roll 800, so that as the sprocket 794 revolves, the two rolls, 798 and 800, will be rotated in opposite directions at identical speeds.

At their forward ends the bars 804 are connected by a hexagonal cross member 812. A stud 814 extends vertically through an opening in this cross member 812 and is secured at its lower end to a collar 816. This collar is pivotally mounted upon a transversely extending rod 818, the ends of which are secured to the vertical plates 782. Between the collar 816 and the cross member 812, the stud 814 is surrounded by a coil spring 820 which tends resiliently to urge the cross piece 812 upwardly, thus acting to separate the roll 800 from the roll 798. Above the cross piece 812, the stud 814 carries a slidable collar 822 and a knurled nut 824, so that rotation of the nut to the right urges the cross piece 812 and roll 800 downwardly toward the roll 798, while left-hand rotation of the nut permits the spring 820 to urge these elements upwardly away from the roll 798.

When in operation, these rolls shape the plastic material to a generally cylindrical form, as shown at 825, and feed the thus formed material in a rearwardly direction along the trough 826 and into the confection preforming and cutting mechanism, while a similar trough 828 aids in guiding the roughly manually shaped candy roll from the plastic mass which serves as a source of supply to the feed rolls 798 and 800. A transverse sectional view through the plastic material and rolls 800 and 798 at the point of tangency of these rolls is shown in Fig. 51.

The preforming and cutting mechanism indicated generally at 829 is positioned between a pair of parallel vertical plates 830. These plates are disposed between the horizontal rectangular bars 714 and are secured thereto in a position approximately midway between the plates 782 and the columns 712. From the trough 826 the candy roll passes over the periphery of a notch-forming wheel 832 carried upon a transverse shaft 833 journaled at its ends in the plates 830, as best seen in Figs. 44 and 45. The periphery of this wheel is provided with a rectangular groove 834 having a cross-sectional area slightly greater than the cross-sectional area of the circle formed at the point of tangency of the rollers 798 and 800. The side walls of this groove carry a plurality of equally circumferentially spaced notching elements 836 spaced apart a distance in a circumferential direction such that they form notches in the candy roll at the points the roll is to be divided to form the individual mold charges. The distance between each pair of notching elements 836 in a transverse direction is slightly greater than the diameter of the candy roll, so that as the candy roll is fed over the surface of the notching wheel, the cylindrical candy roll will be carried out upon the wheel 832 in the channel between the knife elements 836.

Just beyond the point where the plastic candy roll is fed upon the notching wheel 832, this wheel approaches a position tangential to a cylindrical flattening roller 838. This flattening roller is journaled upon a transverse horizontal shaft 840 and is driven by a gear 842 meshed with a similar gear 844 secured to one face of the notching wheel 832. To aid in the assembly and disassembly of the machine, the plates 830 are provided with slots extending downwardly from their top edges to permit the shaft 840 carrying the roller 838 to be lowered into position. This also provides a means for adjusting the spacing between the roller 838 and the wheel 832, since the shaft 840 may be lowered to the desired point and then clamped in place by means of nuts 846 threaded upon the ends of this shaft.

As shown in Fig. 53, which is a transverse sectional view similar to Fig. 52 excepting that it is taken at the point of tangency of the wheel 832 and roller 838, the purpose of this roll is to flatten the candy mass so that it substantially fills the rectangular groove in the face of the wheel 832.

Fig. 52 is taken at a point just ahead of that shown in Fig. 53 and shows the beginning of this flattening operation. In the process of flattening the roll to the form shown in Fig. 53, the roll is squeezed outwardly between the notching elements 836, thus forming the notches previously referred to in the side of the roll.

In addition to the gear 844, the roll 832 carries a sprocket 848 and a second gear 850. The sprocket 848 is connected by a chain 854 to a drive sprocket 856 carried upon the shaft 777 to which the lower mold chain sprockets 776 are secured. It will be seen, therefore, that the notching wheel and flattening roller are driven in synchronism with the lower mold elements.

As the flattened and notched candy roll is carried downwardly around the wheel 832, this wheel passes into a position contiguous to a rotary cutting and translating member 860. This member is mounted upon a transverse shaft 862, the ends of which are journaled in anti-friction bearings carried in bearing boxes 864 secured to the side plates 830. Shaft 862 is driven by a gear 866 meshed with the gear 850 carried by the notching wheel 832, and the ratio of reduction of this gear train is such that the shaft 862 revolves twice as fast as the notching wheel. The rotary cutting and translating member 860 is provided with a plurality, in the present instance six, of radially outwardly extending knife blades 868, while the notching wheel has twelve pairs of notching elements 836. These knife blades 868 are of such a length that as they pass through the plane common to the axes of rotation of the wheel 832 and member 860, they extend inwardly of the wheel almost to the bottom of the rectangular groove 834, while their width is slightly less than the transverse spacing between the notch forming elements 836. The function of these knife elements is to divide the notched candy roll carried by the notching wheel 832 into individual mold charges 869 and convey these mold charges over a preforming member and into the individual mold halves formed by contiguous lower mold elements. Since the knife blades 868 are of less width than the groove 834, a pair of freely rotatable discs 870 are arranged at each side of the cutting and translating member 860 and rotate upon blocks 872 that, in turn, are journaled in an eccentric position upon the shaft 862. These blocks are prevented from rotating by an expedient to be described presently. The discs 870 extend almost into contact with the notching elements 836 and prevent the plastic roll being squeezed out of the groove 834 as it is cut into individual pieces by the knife blades 868.

Just after the candy roll has been severed into individual pieces 869, these pieces are carried downwardly and rearwardly by the cutting and translating member 860 to the upper face of a preforming rail 874. This rail has a radius of curvature approximately equal to the radial distance between the rail and the center of the shaft 862, so that as the individual mold charges are swept downwardly and rearwardly by the blades 868, these mold charges will be slid longitudinally along the upper edge of this preforming rail 874.

The forming rail 874 is supported between the lower mold elements 766 and the rotary candy dividing and translating member 860 by means of a forward extension 875 of the rail that passes outwardly beneath the notch forming wheel 832 and curves downwardly to a point where it is pivoted upon a rod 877 extending transversely of the machine. A further extension 879 beyond the rod 877 carries an adjustment screw 881 which extends therethrough and bears with its end against the rearwardmost of the transversely extending rods 784. Thus, by revolving the adjustment screw 881 to move this screw inwardly or outwardly with respect to the forward extension 879 of the rail 874, this forward extension may be pivoted around the transverse rods 877 to raise or lower the forming rail 874 with respect to its cooperating elements. This adjustment is used to carry the weight of the rail and to position the rail in operating relation to the mold elements and other forming mechanism.

Normally, the effect of the rail 874 would be partially to support the plastic mold charge as the mold charge is conveyed thereover by the cutting and translating member 860, thus preventing substantial deformation of the lower surface of the mold charge. This action is prevented, however, by the eccentric discs 870, the peripheries of which, because of the eccentric mounting of the discs, extend progressively outwardly away from the shaft 862 as the mold charges are swept downwardly and rearwardly by the translating member 860. It will be seen, therefore, that the individual lumps of candy 869 are carried downwardly and rearwardly by blades 868 of the cutting and translating member 860, and that as they move downwardly and rearwardly, the edges of these lumps are urged progressively downwardly around the sides of the rail 874 by the eccentric discs 870.

The last above described action is instituted at about Fig. 54, at which point the upper faces of the rail form a comparatively obtuse angle.

In Figs. 55 and 56 the sides of the mold charge are seen to have been urged progressively downwardly still farther over the faces of the rail, which at these points has progressively assumed a more acute angle. Fig. 57 continues the progressive shaping of the mold charge into what may be referred to as a modified chevron shape.

From this point onwardly, the thickness of the rail 874 diminishes, since this thickness is limited by the spacing of the lower edge of this rail from the upper surfaces of the lower mold elements 766. Figs. 58, 59 and 60 show further progressive steps in the preformation of the individual mold charge as it is urged along between the rail 874 and the eccentric discs 870.

During the latter portion of this movement, that is, from about the position shown in Fig. 59 onwardly, each mold charge is conveyed along by the central rib 768 of one of the lower mold elements, as well as by one of the blades 868 of the cutting and translating member 860. This is because after passing the position illustrated in Fig. 57, the lower portions of the mold charges come progressively beneath the plane of the upper edges of the central ribs of the lower mold elements. Fig. 60 is taken substantially in a vertical plane extending through the axis of the shaft 862. From this position onwardly, the blade 868 recedes from the individual mold charge and the mold charge is carried onwardly exclusively by the central rib 768 of one of the lower mold elements until it slides from the end of the rail 874.

After the mold charge 869 passes through the vertical plane extending through the axis of rotation of the eccentric discs 870, the edges of these discs will recede upwardly away from the mold charge. In order to continue the downwardly confining effect of these discs beyond this point, a pair of vertical plates 876 extend rearwardly with their lower edges tangential to the lowermost edges of the discs 870. These plates are in alignment with the discs 870 and extend rearwardly almost to the point where the upper mold elements are brought into contact with the lower mold elements. They are spaced apart from each other by a flat, generally horizontally extending spacing member 878, see Fig. 44, which is positioned between the plates and secured thereto by means of bolts passed through the plates and through this spacing member.

At their rearward ends the upper portions of the plates 876 are bent outwardly at 880 and secured by screws to the outer faces of the blocks 872, while their lower portions 883 are separated from the bent portions by a slit 882, so that these lower portions 883 of the plates may extend along the tops of the lower mold elements into a position closely adjacent to the peripheries of the discs 870. Thus, as each of the mold charges passes beyond the influence of the eccentrically mounted discs 870, their edges slide beneath the plates 876 which prevent the mold charge from moving upwardly out of the lower mold elements. The plates 876 are prevented from moving upwardly or downwardly by the upper and lower mold elements and thereby prevent rotation of the blocks 872. Fig. 61 of the drawings shows a section through one of the mold charges 869 after this mold charge has passed beyond the influence of the discs 870 and is being maintained against upward movement by the plates 876.

Shortly after the individual mold charges have passed beyond the end of the rail 874, the lower mold elements carry these mold charges into the region where the upper mold elements are brought downwardly against the lower mold elements to form closed molds. Beyond this point the pistons 734, mounted to reciprocate in the upper mold elements, are urged inwardly by the forming chains 728 to form lollipop heads. One stage in the inward movement of these pistons is shown in Fig. 62, while in Fig. 63 the pistons are shown in their most inwardly position with a completely formed lollipop head therebetween. These completely formed lollipops are then ejected from the machine in exactly the same manner as the lollipops formed by the machine of the previously described embodiment.

The handle forming mechanism

The handle forming mechanism may be considered as exactly similar to the comparable mechanism of the previous embodiment and, therefore, will not be described in detail. This mechanism differs from that previously described, however, in that the several spindles and shafts are driven by gear trains rather than by sprockets and chains. For this reason a detailed description of this drive mechanism will be included.

The handle forming mechanism is mounted between a pair of parallel vertically disposed plates 884. These plates are positioned generally within the triangle formed by the columns 712, horizontal bars 714, and diagonal bracing members 786. They are suported by means of appropriate threaded rods and tubular spacing members, by means of which these plates are secured to the columns 712 and horizontal bars 714. At their lower forward corners the plates carry the bearing boxes and anti-friction bearings upon which the previously mentioned shaft 777 is journaled.

The shaft 777 is driven, as has been described, by the sprockets 776 over which the lower mold chain 770 passes, and, in turn, drives all of the members of the handle feeding and forming mechanism as well as the preforming mechanism 829. The sprocket 856, which is mounted upon the left-hand end of this shaft and which has been previously described as driving the preforming mechanism 829 through the chain 854, has formed thereon an inwardly extending sleeve 886.

A pair of gears 888 and 890 are mounted upon this sleeve and are free to rotate thereon. The innermore of these gears 888 is provided with a fillister head screw 892 threaded into the web thereof in a position eccentric to the shaft 777. The head 894 of this screw extends toward the outermore gear 890 to provide an abutment against which the ends of a pair of adjustment screws 896 can impinge. These screws 896 are threaded through a pair of posts 898 that, in turn, are secured to the web of the gear 890 in such a position that the contiguous ends of the screws 896 bear against the screw head 894. Thus, by loosening one of the screws 896 and tightening the other, the relative angular positions between the gears 888 and 890 may be shifted slightly, thereby enabling the relative positions of the several spindles driven by each of these gears to be adjusted as a group with respect to each other.

The web of the gear 890 is provided near its periphery with a pair of threaded openings to receive a pair of clamp screws 900. These screws extend through slots 902 extending in an arcuate direction in a thin fan-shaped plate 904, the opposite end of which is secured to the sprocket 856 so that as the sprocket 856 revolves, this plate will be swung around with it and will drive the gear 890, and through the gear 890, the gear 888. The arcuate slots 902, together with the clamp screws 900, enable the two gears 890 and 888 to be adjusted relative to the sprocket 856 and, hence, with respect to the lower mold elements 766 which drive this sprocket.

At a point approximately midway between the arcuate slots 902 and the shaft 777, the plate 904 is perforated with a set closely spaced, arcuately arranged holes 906. These holes act to weaken the plate 904 to such a degree that although the plate retains sufficient strength to drive the handle forming mechanism under normal operating conditions, it is nevertheless the weakest point in the drive system and is intended to fracture along the arcuate line formed by the holes 906 in the event that the handle forming mechanism becomes jammed.

The inner gear 888 is somewhat smaller than the gear 890 and is meshed with a pinion 908 mounted at the end of a spindle 910. This spindle drives the rotary knife which cuts the handle forming material, and although this knife is not shown, its construction and arrangement may be considered as exactly similar to the knife 618 of the previously described embodiment.

The pinion 908, in turn, is meshed with and drives a larger gear 912 carried by a spindle 914 which, in turn, carries a handle loop-retaining disc, not shown but exactly similar to the disc 610 of the previous embodiment. As shown in Fig. 41, the gear 912 is adjustably mounted upon the spindle 914 by means of a pair of set screws 913 threaded into the hub of the gear 912 in such a manner that their contiguous ends bear against opposite sides of a key 915 fitted into a keyway in the spindle 914. A third set screw 917 threaded into the gear hub at right angles to the other two is tightened after adjustment of the angular position of the gear 912 to hold the key 915 tightly in its keyway. By loosening one of the set screws 913 and tightening the other, the angular relationship between the rotary handle material cutting knife and the loop retaining disc may be adjusted.

The outer gear 890 is meshed with and drives a gear 916 keyed to the end of a spindle 918 which carries a loop forming disc, not shown but similar to the disc 516 of the other embodiment. The gear 916 also drives an idler gear 920 carried upon a shaft 922 and through this gear 920 a second gear 924 meshed therewith. The gear 924 is carried upon the end of a shaft 926 which also carries a handle material feeding wheel, not shown but which may be considered as exactly similar to the wheel 524.

As the shaft 777 is revolved by the lower mold elements, this shaft drives the looping disc and handle material feeding wheel through the gear 890, the positions of which may be adjusted relative to the lower mold elements by means of the clamp screws 900 and slotted plate 904. This shaft 777 also drives the rotary knife and loop retaining disc of the handle forming mechanism through the gear 888 which may be adjusted relative to the gear 890 so that the knobs carried by the looping disc may be adjusted relative to the triangular knobs carried by the loop retaining disc, while the rotary knife can be adjusted relative to the loop-retaining disc by turning the set screws 913, all in the manner previously described in greater detail.

*Lower mold elements cleaning device*

We have found that with a machine of the present type, it is necessary that the mold elements be kept clean and free from sugar deposit which normally accumulates. For this reason, we have incorporated a lower mold cleaning device 930 in the machines so that each lower mold element is brushed free of adhering material before being used to form lollipop molds.

This device is shown in Figs. 38, 49 and 50 and comprises a pair of parallel arms 932 pivoted at their upper ends to the transverse rod that anchors the lower ends of the plates 884. These arms extend downwardly and rearwardly of the machine and are bolted to a brush-carrying fitting 934 at their lower ends. This fitting 934 carries a stub shaft 936 positioned in a horizontal plane and which is inclined in a rearward direction at an angle of about 45°. A rotary brush 938 having its bristles arranged in helical rows is journaled upon the stub shaft 936 and is brought into contact with the surfaces of the lower mold elements by an adjustment member 940. This adjustment member consists of a relatively long screw 942 threaded through a short shaft 944 pivoted at its ends in the arms 932. The screw is fitted with a knurled knob 946 at its upper end by means of which the screw may be rotated while its lower end bears against the juncture of the webs of the rearward transverse angle iron member that braces the forward columns 712. By rotating the knob 946, the brush 938 can be raised into contact with the lower mold elements or lowered to a position out of contact with these elements as desired.

The brush 938 is constructed with the rows of bristles spaced apart a distance approximately equal to the spacing of the lower mold elements so that as the brush revolves, the bristles will clean the mold cavities while the central ridges of the mold elements will come between bristle rows. Because of the angular setting of the brush axis, the bristles will sweep transversely across the mold faces, thus giving an efficient scrubbing action. The rotation of this brush is brought about by the movement of the lower mold elements, and may be likened to the manner in which a helical gear can be revolved by the movement across its face of the teeth of a rack or gear.

Since the brush is always urged toward the fitting 934 by the moving mold elements, the brush is provided with a bushing 948 which merely slips over the end of the stub shaft 936 so that the brush may be easily slipped off and removed for cleaning.

This brush also provides an easy method for washing the mold elements which may be accomplished as follows: A pan of running water is placed beneath the brush in such a position that the brush dips into the water. The wet brush thus scrubs the lower mold elements and leaves them wet and it has been found that this water is transferred to the upper mold elements and in a short space of time thoroughly washes these elements also. After the mold elements have been cleaned, the pan is removed, or the water is drained from the pan if a permanent installation of the pan is made, and the mold elements and brush are dried before starting operation of the machine.

*Operation*

The operation of the machine forming the present embodiment of the invention is, in general, similar to the operation of the first embodiment thereof and differs therefrom only in certain details.

After the several adjustments have been made, as described in detail elsewhere, a reel of cord to be made into handles is placed upon its arbor and the machine started. The end of the cord is then lead to the handle material feeding mechanism, all as described in connection with the description of the first embodiment of the present invention. As in the first embodiment, one end of a roll of plastic confection is drawn out and roughly shaped by hand to a diameter slightly greater than that between the confection feeding rolls 798 and 800, and the end of this roll of plastic material is inserted between the feed rolls 798 and 800, where the roll of plastic material is shaped to a predetermined diameter.

From these rolls the plastic material passes along the trough 826 to the notching wheel 832 where, in a manner previously described, the roll is flattened to a generally rectangular cross-section and notches are formed in the side of the roll at spaced intervals. The notched and flattened roll is then cut into individual pieces which serve as mold charges and these pieces are then carried along the forming rail 874 to the cavities provided by the chain of lower mold elements. During the course of its passage along the rail 874, each individual mold charge is gradually shaped into a modified chevron form so that the legs of the chevron-shaped piece will straddle the upper end of the handle to which the lollipop head is to be attached.

While the mold charges are being brought downwardly and rearwardly to the moving lower mold elements, the handle-forming material has been formed into individual handle lengths, each of which is bent to form a loop, the free ends of the loop then being inserted between adjacent lower mold elements, all in the manner as previously described in connection with the operation of the first described embodiment.

The remaining steps in the formation of a completed lollipop from a mass of plastic material and a length of handle-forming material may be considered as identical with those of the other embodiment of the invention and therefore need no additional description here.

A flow sheet showing the movement of the plastic material and handle-forming material through the machine is shown in Fig. 65, while a completed lollipop is shown in perspective in Fig. 64.

Thus, it will be seen that the novel machines of the present invention are adapted to form lollipops from a mass of plastic candy material and flexible handle material. It is also apparent that the flexible handle material may be fed to the machine in long lengths from a reel and that the machine automatically cuts this material into pieces of proper dimensions and bends these pieces to form the individual looped handles and that it brings the free ends of these handles together and inserts them into the mold cavity where a lollipop head is later formed around and attached to these ends. The machines accomplish all of these lollipop-manufacturing functions through the use of mechanisms which move in a continuous uni-directional manner rather than through the use of mechanical expedients necessitating reciprocatory motion, thus enabling the machines to manufacture lollipops rapidly without the danger of machine failures and additionally providing the advantages inherent in processes that shape the plastic material at a comparatively slow rate. That is, although the machine manufactures completed lollipops at an extremely high rate of speed, the plastic material made into lollipop heads is caused to flow at a comparatively slow and substantially uniform rate. This is important since the plastic material of which lollipops are ordinarily made will fail to mold properly if an attempt is made to shape it too rapidly.

While we have illustrated and described two embodiments of our invention which accomplish the objects set out elsewhere in this specification, it is contemplated that many additional modifications may be made without departing from the spirit of our invention, and we do not wish to be limited to the precise details of construction set forth, but desire to avail ourselves of all changes within the scope of the appended claims.

Having thus described our invention, what we claim as new and useful and desire to secure by Letters Patent of the United States is:

1. In a machine for forming lollipops or the like, means to feed flexible handle forming material from a source of supply, an endless chain of molds, means to move said chain of molds, means to form the handle material into a sinuous configuration, means to cut alternate bights formed in the handle material to form individual handle portions, and means to urge the free ends of each handle portion into contiguous relationship and insert these ends into said molds.

2. In a machine for forming lollipops or the like, means to feed flexible handle forming material from a source of supply at a substantially uniform velocity, means in continuous motion to form the uniformly fed handle material into a sinuous configuration, means to cut alternate bights formed in the handle material to form individual handle portions, and means to urge the free ends of each handle portion into contiguous relationship.

3. In a machine for forming lollipops or the like, means to feed flexible handle forming material from a source of supply at a substantially uniform velocity, an endless chain of molds, means to move said chain of molds continuously, means in continuous motion to form the uniformly fed handle material into a sinuous configuration, means to cut alternate bights formed in the handle material to form individual handle portions, and means to insert these ends into said molds while maintaining the molds in continuous motion.

4. In a machine for forming lollipops or the like, means to feed flexible handle forming material from a source of supply at a substantially uniform velocity, an endless chain of molds, means to move said chain of molds continuously, means in continuous motion to form the uniformly fed handle material into a sinuous configuration, means to cut alternate bights formed in the handle material to form individual handle portions, and means to urge the free ends of each handle portion into contiguous relationship and insert these ends into said molds while maintaining the molds in continuous motion.

5. In a machine for forming lollipops or the like, means to feed flexible handle forming material from a source of supply, means to form handle material into a sinuous configuration, means to cut alternate bights formed in the handle material to form individual handle portions, means to urge the free ends of each handle portion into contiguous relationship, a plurality of molds, conveyor means to carry said molds in an endless path, means to insert the free ends of the handle portions into said molds, and means in said molds to form a lollipop head around the handle ends.

6. In a machine for forming lollipops or the like, means to feed flexible handle forming material from a source of supply at a substantially uniform velocity, means in continuous motion to form the uniformly fed handle material into a sinuous configuration, means to cut alternate bights formed in the handle material to form individual handle portions, means to urge the free ends of each handle portion into contiguous relationship, a plurality of molds, conveyor means to carry said molds in an endless path, means to insert the free ends of the handle portions into said molds, and means in said molds to form a lollipop-head around the handle ends.

7. In a machine for forming lollipops or the like, a plurality of mold elements, means to convey one group of said mold elements in an endless path, means to convey a second group of said mold elements in another endless path, means to bring said paths into contiguous relationship to cause mold elements of one group to cooperate with mold elements of the second group temporarily to enclose a plurality of spaces of predetermined volume, means to insert one end of a handle into said spaces, means active thereafter to decrease the volumes of said temporarily enclosed spaces, means to restore said enclosed spaces to their former size, and means to separate said paths.

8. In a lollipop machine, means to feed a plastic candy roll, means to shape said roll to provide a reentrant angle in one side thereof, means to divide said roll into individual pieces, means to place the reentrant angle in each of said pieces around the end of a handle, and means to press said plastic material against opposite sides of the handle simultaneously to shape a lollipop head simultaneously with the attachment of said head to said handle.

9. In a lollipop machine, means to feed a plastic candy roll at a substantially uniform velocity, means to shape said roll to provide a reentrant angle in one side thereof, means to place the reentrant angle in said roll over the ends of a plurality of spaced handles, means to divide said roll into individual pieces by cuts positioned between said handles, and means to press said plastic material against opposite sides of the handles simultaneously to shape lollipop heads simultaneously with the attachment of said heads to said handles.

10. In a lollipop machine, means to feed a plastic candy roll at a substantially uniform velocity, means to shape said roll to provide a chevron-shaped ribbon, means to divide said ribbon into individual chevron-shaped pieces, means to place the reentrant angle in each of said pieces around the end of a handle, and means to press said plastic material against opposite sides of the handle simultaneously to shape a lollipop head simultaneously with the attachment of said head to said handle.

11. In a lollipop machine, means to feed a plastic candy roll at a substantially uniform velocity, means to shape said roll to provide a chevron-shaped ribbon, means to place the reentrant angle in said ribbon over the ends of a plurality of spaced handles, means to divide said ribbon into individual pieces by cuts positioned between said handles, and means to press said plastic material against opposite sides of the handles simultaneously to shape lollipop heads simultaneously with the attachment of these heads to said handles.

12. The method of forming lollipops which comprises, feeding flexible handle forming material at a substantially uniform velocity, separating said handle material into individual handles of substantially uniform length, bringing the free ends of each of said handles together, continuously feeding a roll of plastic candy material, preforming said roll to provide a reentrant face in one side thereof, separating said roll into individual pieces of plastic material, moving each of said pieces relative to one of said handles so as to cause the free ends of said handle to extend into said reentrant face, and pressing each of said plastic pieces from opposite sides to cause the plastic material to flow around the free end portion of the flexible handle from opposite sides simultaneously.

13. The method of forming lollipops which comprises, feeding flexible handle forming material at a substantially uniform velocity, continuously forming said handle material into a sinuous configuration as it is fed, separating said handle material into individual handles by cutting the material at alternate bights, bringing the free ends of each of said handles together, continuously feeding a roll of plastic candy material, preforming said roll to provide a reentrant face in one side thereof, separating said roll into individual pieces of plastic material, moving each of said pieces relative to one of said handles so as to cause the free ends of said handle to extend into said reentrant face, and pressing each of said plastic pieces from opposite sides to cause the plastic material to flow around the free end portion of the flexible handle from opposite sides simultaneously.

14. The method of forming lollipops which comprises, feeding flexible handle forming material at a substantially uniform velocity, continuously forming said handle material into a sinuous configuration as it is fed, separating said handle material into individual handles by cutting the material at alternate bights, bringing the free ends of each of said handles together and arranging said handles in spaced alignment, continuously feeding a roll of plastic candy material, preforming said roll to provide a chevron-shaped ribbon, moving said ribbon relative to said spaced handles so as to cause the free ends of said handles to extend into the reentrant face of said ribbon, dividing said roll into individual pieces by cuts positioned between the spaced handles, and pressing each of said plastic pieces from opposite sides to cause the plastic material to flow around the free end portion of the flexible handle from opposite sides simultaneously.

15. The method of forming lollipops which comprises, feeding flexible handle forming material at a substantially uniform velocity, continuously forming said handle material into a sinuous configuration as it is fed, separating said handle material into individual handles by cutting the material at alternate bights, bringing the free ends of each of said handles together and arranging said handles in spaced alignment, continuously feeding a roll of plastic candy material, moving said roll relative to said handles so as to cause the free ends of said handles to extend into close association with said roll, dividing said roll into individual pieces by cuts positioned between the spaced handles, and pressing each of said plastic pieces from opposite sides to cause the plastic material to flow around the free end portion of the flexible handle from opposite sides simultaneously.

16. A machine for forming lollipops which comprises, means feeding flexible handle forming material at a substantially uniform velocity, means for continuously forming said handle material into a sinuous configuration as it is fed, means for separating said handle material into individual handles by cutting the material at alternate bights, means for bringing the free ends of each of said individual handles together, and means for attaching a quantity of plastic confection to each of said handles.

17. A machine for forming lollipops which comprises, means for feeding flexible handle forming material at a substantially uniform velocity, means for dividing said handle material into individual handles of substantially uniform length while said handle material is in motion, means for bringing the free ends of each of said individual handles together, and means for attaching a quantity of plastic confection to each of said handles.

18. The method of forming lollipops which comprises, continuously feeding a roll of plastic candy material, preforming said roll to provide a chevron-shaped ribbon, separating said ribbon into individual pieces of plastic material, moving each of said pieces relative to a flexible handle member so as to cause an end of the handle member to extend into the reentrant face of said piece, and pressing each of said plastic pieces from opposite sides to cause the plastic material to flow around the end portion of the flexible handle from opposite sides simultaneously.

19. The method of forming lollipops which comprises, continuously feeding a roll of plastic candy material, preforming said roll to provide a reentrant face in one side thereof, moving said roll relative to a plurality of spaced flexible handle members so as to cause an end of each of the handle members to extend into said reentrant face, dividing said roll into individual pieces by cuts spaced between said spaced handles, and pressing each of said individual plastic pieces from opposite sides to cause the plastic material to flow around the end portion of the flexible handle from opposite sides simultaneously.

20. In a confection making machine, a first conveying means, a second conveying means, a plurality of mold elements attached to each conveying means, each of the mold elements secured to the first conveying means adapted to cooperate with an adjacent similar mold element on the same conveying means and with a pair of adjacent mold elements on the second conveying means to form a complete mold, means progressively to assemble molds at a predetermined point from said elements by bringing said elements together and later to disassemble said molds at a different point by separating the mold elements secured to the first conveying means from the mold elements secured to the second conveying means, means to feed lollipop handles successively to a position adjacent the first said point, and means to project an end of one of the handles between two of the mold elements used to form a single mold as the mold is being assembled from said elements.

21. In a confection making machine, a first conveying means, a second conveying means, a plurality of mold elements attached to each conveying means, each of the mold elements secured to the first conveying means adapted to cooperate with an adjacent similar mold element on the same conveying means and with a pair of adjacent mold elements on the second conveying means to form a complete mold having a cavity of predetermined volume, means progressively to assemble molds from said elements by bringing said elements together and later to disassemble said molds by separating the mold elements secured to the first conveying means from the mold elements secured to the second conveying means, means to feed a roll of plastic material, means to divide said roll into individual mold charges, means to preform said mold charges to form a reentrant face therein, means to place one of said mold charges in one of said molds while the mold is being assembled from its elements, and means to decrease the volume of said cavity to form a lollipop head from said mold charge.

22. In a confection making machine, a first conveying means, a second conveying means, a plurality of mold elements attached to each conveying means, each of the mold elements secured to the first conveying means adapted to cooperate with an adjacent similar mold element on the same conveying means and with a pair of adjacent mold elements on the second conveying means to form a complete mold, means progressively to assemble molds at a predetermined point from said elements by bringing said elements together and later to disassemble said molds at a different point by separating the mold elements, means to feed lollipop handles successively to a position adjacent the first said point, means to project an end of one of the handles between two of the mold elements used to form a single mold as the mold is being assembled from said elements, means to feed a roll of plastic material to a position adjacent the first said point, and means to cause the assembly of said mold from its elements to squeeze said plastic roll at spaced points to divide said roll into individual mold charges.

23. In a confection making machine, a first conveying means, a second conveying means, a plurality of mold elements attached to each conveying means, each of the mold elements secured to the first conveying means adapted to cooperate with an adjacent similar mold element on the same conveying means and with a pair of adjacent mold elements on the second conveying means to form a complete mold, means progressively to assemble molds, having cavities of predetermined volumes, at a predetermined point by bringing said elements together and later to disassemble said molds at a different point by separating the mold elements secured to the first conveying means from the mold elements secured to the second conveying means, means to feed lollipop handles successively to a position adjacent the first said point, means to project an end of one of the handles between two of the mold elements used to form a single mold as the mold is being assembled from said elements, means to feed a roll of plastic material to a position adjacent the first said point, means to cause the assembly of said mold from its elements to squeeze said plastic roll at spaced points to divide said roll into individual mold charges, and means active thereafter to decrease the volume of said cavity to form a lollipop head and unite the head to the handle.

24. In a confection making machine, a first conveying means, a second conveying means, a plurality of mold elements attached to each conveying means, each of the mold elements secured to the first conveying means adapted to cooperate with an adjacent similar mold element on the same conveying means and with a pair of adjacent mold elements on the second conveying means to form a complete mold, means progressively to assemble molds at a predetermined point from said elements by bringing said elements together and later to disassemble said molds at a different point by separating the mold elements secured to the first conveying means from the mold elements secured to the second conveying means, means to feed lollipop handles successively to a position adjacent the first said point, means to project an end of one of the handles between two of the mold elements used to form a single mold as the mold is being assembled from said elements, means to feed a roll of plastic material, means to divide said roll into individual mold charges, and means to place one of said charges between said mold elements as the mold is being assembled.

25. In a confection making machine, a first conveying means, a second conveying means, a plurality of mold elements attached to each conveying means, each of the mold elements secured to the first conveying means adapted to cooperate with an adjacent similar mold element on the same conveying means and with a pair of adjacent mold elements on the second conveying means to form a complete mold, means progressively to assemble molds, having cavities of predetermined volumes, at a predetermined point by bringing said elements together and later to disassemble said molds at a different point by separating the mold elements secured to the first conveying means from the mold elements secured to the second conveying means, means to feed lollipop handles successively to a position adjacent the first said point, means to project an end of one of the handles between two of the mold elements used to form a single mold as the mold is being assembled from said elements so that the end of the handle will extend into the cavity of the assembled mold, means to feed a roll of plastic material, means to divide said roll into individual mold charges, means to preform said mold charges to provide reentrant faces therein, means to place one of said charges between the mold elements being assembled to form a mold so that the assembled mold will have said charge in its cavity with the reentrant face of said charge embracing said handle end, and means to squeeze the plastic charge around the handle end to form a lollipop.

26. In a confection making machine, a first conveying means, a second conveying means, a plurality of mold elements attached to each conveying means, each of the mold elements secured to the first conveying means adapted to cooperate with an adjacent similar mold element on the same conveying means and with a pair of adjacent mold elements on the second conveying means to form a complete mold, means progressively to assemble molds at a predetermined point from said elements by bringing the elements on said first conveyor means into contiguous relationship with the elements on said second conveyor means and later to disassemble said molds at a different point by separating the mold elements secured to the first conveying means from the mold elements secured to the second conveying means, and mutually co-operating members on said mold elements operative to prevent tilting of the mold elements secured to the first conveyor means relative to the mold elements secured to the second conveyor means at and adjacent to the point where said mold elements are separated.

27. In a device of the type described, a cord feeding wheel having a notched periphery with ridges extending outwardly between said notches, said notches comprising slots formed in the body of the wheel with alternate slots being arranged on opposite sides thereof in such a manner that alternate slots overlap each other, whereby refuse material cannot collect in the slots and clog the wheel.

28. In a confection machine having a continuous chain of movable mold elements, a helical rotary brush having its bristles in contact with said mold elements, said brush being positioned with its axis of rotation oblique to the direction of movement of the mold elements, whereby the movement of said mold elements will rotate said brush and cause the bristles to sweep across the faces of the mold elements to clean the same.

29. In a machine for manufacturing lollipops or the like, a chain of mold elements, rotatable sprocket means over which said chain passes and changes its direction of movement, whereby said mold elements are separated, driving means rotated together with said sprocket means, cam means journaled to rotate about an axis eccentric to the axis of rotation of said sprocket means, and means on said driving means to rotate said cam means to cause said cam means to eject lollipops from said mold elements.

30. In a machine for manufacturing lollipops or the like, a chain of mold elements, rotatable sprocket means over which said chain passes and changes its direction of movement, whereby said mold elements are separated, driving means rotated together with said sprocket means, cam means journaled to rotate about an axis eccentric to the axis of rotation of said sprocket means, and means on said driving means to rotate said cam means at a greater angular velocity than said driving means.

31. In a machine for manufacturing lollipops or the like, a chain of mold elements, rotatable sprocket means over which said chain passes and changes its direction of movement, whereby said mold elements are separated, a substantially circular driving member having a plurality of circumferentially arranged pins secured thereto, the arcuate spacing between said pins being substantially equal to the arcuate spacing of said mold elements passing around said sprocket means, star-shaped cam ejector means journaled to rotate upon an axis eccentric to the axis of said sprocket means and positioned wholly within the periphery of said driving means, said pins adapted to impinge against elements on said cam means to rotate the latter, the number of the last said elements on said cam means being less than the number of pins on said driving means.

32. In a candy making machine, a plurality of movable mold elements, a rotary plastic confection carrying wheel, a rotary cutting and translating member having circumferentially spaced knife elements cooperating with said wheel to cut individual pieces from the plastic confection passing over said wheel and to convey these individual pieces to the individual mold elements, and the peripheral velocity of said knife blades being greater than the peripheral velocity of said confection carrying wheel, whereby the individual pieces of plastic material travel at a higher velocity than the plastic material passing over said wheel.

33. In a candy forming machine, a plurality of movable mold elements, means to advance a roll of plastic material, rotary means positioned adjacent said advancing means, circumferentially spaced cutting elements secured to said rotary means, said cutting elements acting to cut individual pieces from said plastic roll and convey these individual pieces to said mold elements, the peripheral velocity of said cutting elements being greater than the speed of advancement of said plastic roll.

34. In a machine for forming lollipops or the like, means to feed flexible handle forming material from a source of supply at a substantially uniform velocity, means in continuous motion to form the uniformly fed handle material into a sinuous configuration, means to cut alternate bights formed in the handle material to form individual handle portions, and means to urge together the ends of each handle portion to form lollipop handles.

35. In a machine for forming lollipops and the like, a plurality of mold elements, means to convey one group of said mold elements in an endless path, means to convey a second group of said mold elements in another endless path, means to bring said paths into contiguous relationship to cause mold elements of one group to co-operate with mold elements of the second group temporarily to enclose a plurality of spaces of predetermined volume, means to insert one end of a handle into said spaces, means active thereafter to decrease the volumes of said temporarily enclosed spaces, and means to separate said paths.

CARL W. SPOHR.
ROBERT F. BRACKE.

CERTIFICATE OF CORRECTION.

Patent No. 2,278,574.  April 7, 1942.

CARL W. SPOHR, ET AL.

It is hereby certified that error appears in the printed specification of the above numbered patent requiring correction as follows: Page 3, first column, line 25, for "refined" read --refilled--; page 6, first column, line 13, for "plates 22" read --plates 222--; and second column, lines 48 and 49, for "forming an element of the handle that forms mechanism" read --that forms an element of the handle forming mechanism--; and that the said Letters Patent should be read with this correction therein that the same may conform to the record of the case in the Patent Office.

Signed and sealed this 9th day of June, A. D. 1942.

Henry Van Arsdale,
Acting Commissioner of Patents.

(Seal)